(12) United States Patent
Singh Ahuja et al.

(10) Patent No.: US 7,447,777 B1
(45) Date of Patent: Nov. 4, 2008

(54) SWITCHING SYSTEM

(75) Inventors: Ratinder Paul Singh Ahuja, Saratoga, CA (US); Susan Carrie, Mountain View, CA (US); Chien C. Chou, San Jose, CA (US); Erik De La Iglesia, Mountain View, CA (US); Miguel Gomez, Fremont, CA (US); Liang Liu, San Jose, CA (US); Ricky K. Lowe, Atherton, CA (US); Rahoul Puri, Los Altos, CA (US); Kiet Tran, Saratoga, CA (US); Mark Aaron Wallace, San Jose, CA (US); Wei Wang, San Jose, CA (US); Todd E. Wayne, Santa Cruz, CA (US); Hui Zhang, Cupertino, CA (US)

(73) Assignee: Extreme Networks, Santa Clara, CA (US)

(*) Notice: Subject to any disclaimer, the term of this patent is extended or adjusted under 35 U.S.C. 154(b) by 805 days.

(21) Appl. No.: 10/098,957

(22) Filed: Feb. 11, 2002

(51) Int. Cl.
*G06F 15/16* (2006.01)
(52) U.S. Cl. ................................. 709/227; 709/228
(58) Field of Classification Search ......... 709/227–228, 709/229, 226
See application file for complete search history.

(56) References Cited

U.S. PATENT DOCUMENTS

| | | | |
|---|---|---|---|
| 4,766,534 A * | 8/1988 | DeBenedictis | ............... 709/228 |
| 5,315,708 A | 5/1994 | Eidler et al. | |
| 5,396,490 A | 3/1995 | White et al. | |
| 5,528,761 A | 6/1996 | Ooba et al. | |
| 5,553,242 A * | 9/1996 | Russell et al. | ............... 709/227 |
| 5,561,807 A | 10/1996 | Verplanken et al. | |
| 5,745,694 A * | 4/1998 | Egawa et al. | ................. 709/225 |
| 5,826,082 A * | 10/1998 | Bishop et al. | ............... 718/104 |
| 5,937,169 A | 8/1999 | Connery et al. | |
| 5,974,518 A | 10/1999 | Nogradi | |
| 6,018,516 A | 1/2000 | Packer | ......................... 370/231 |
| 6,034,957 A | 3/2000 | Haddock et al. | |
| 6,044,468 A | 3/2000 | Osmond | ...................... 713/201 |
| 6,091,733 A | 7/2000 | Takagi et al. | ................. 370/401 |

(Continued)

FOREIGN PATENT DOCUMENTS

WO  WO 03/081857  10/2003

OTHER PUBLICATIONS

Dykstra; *Gigabit Ethernet Jumbo Frames: and why you should care*; http://sd.wareonearth.com/~phil/jumbo.html (Dec. 20, 1999).

(Continued)

*Primary Examiner*—Glenton B. Burgess
*Assistant Examiner*—Lashanya R Nash
(74) *Attorney, Agent, or Firm*—Howrey LLP

(57) ABSTRACT

Systems and related methods are described for handling one or more resource requests. A protocol engine receives a resource request in accordance with a prescribed protocol, and a classification engine determines a desired class of service for the request. An analysis engine optionally analyzes the request, and, responsive thereto, determines a desired sub-class of service for the request. A policy engine then allocates a resource to the request responsive to one or both of the desired class of service, and the desired sub-class of service.

41 Claims, 60 Drawing Sheets

U.S. PATENT DOCUMENTS

| | | | |
|---|---|---|---|
| 6,195,703 B1* | 2/2001 | Blumenau et al. | 709/238 |
| 6,208,650 B1 | 3/2001 | Hassell et al. | |
| 6,212,190 B1 | 4/2001 | Mulligan | |
| 6,233,615 B1* | 5/2001 | Van Loo | 709/224 |
| 6,247,060 B1 | 6/2001 | Boucher et al. | 709/238 |
| 6,295,299 B1 | 9/2001 | Haddock et al. | |
| 6,298,380 B1 | 10/2001 | Coile et al. | 709/227 |
| 6,304,906 B1* | 10/2001 | Bhatti et al. | 709/227 |
| 6,327,622 B1* | 12/2001 | Jindal et al. | 709/228 |
| 6,341,129 B1 | 1/2002 | Schroeder et al. | |
| 6,363,421 B2 | 3/2002 | Barker et al. | |
| 6,381,242 B1 | 4/2002 | Maher, III et al. | |
| 6,411,986 B1* | 6/2002 | Susai et al. | 709/203 |
| 6,453,360 B1 | 9/2002 | Muller et al. | |
| 6,480,489 B1 | 11/2002 | Muller et al. | |
| 6,490,281 B1 | 12/2002 | Abler et al. | |
| 6,526,056 B1 | 2/2003 | Rekhter et al. | |
| 6,532,487 B1 | 3/2003 | Perks | |
| 6,549,516 B1 | 4/2003 | Albert et al. | |
| 6,549,961 B1 | 4/2003 | Kloth | |
| 6,606,315 B1 | 8/2003 | Albert et al. | |
| 6,606,316 B1 | 8/2003 | Albert et al. | |
| 6,625,650 B2* | 9/2003 | Stelliga | 709/226 |
| 6,628,654 B1 | 9/2003 | Albert et al. | |
| 6,633,560 B1 | 10/2003 | Albert et al. | |
| 6,650,641 B1 | 11/2003 | Albert et al. | |
| 6,687,222 B1 | 2/2004 | Albert et al. | |
| 6,704,278 B1 | 3/2004 | Albert et al. | |
| 6,714,985 B1 | 3/2004 | Malagrino et al. | |
| 6,724,767 B1 | 4/2004 | Chong et al. | |
| 6,728,748 B1 | 4/2004 | Mangipudi et al. | |
| 6,735,169 B1 | 5/2004 | Albert et al. | |
| 6,742,045 B1 | 5/2004 | Albert et al. | |
| 6,775,692 B1 | 8/2004 | Albert et al. | |
| 6,781,992 B1 | 8/2004 | Rana et al. | |
| 6,788,704 B1 | 9/2004 | Lindsay | |
| 6,836,462 B1 | 12/2004 | Albert et al. | |
| 6,839,811 B2 | 1/2005 | Fujiyama | |
| 6,891,839 B2 | 5/2005 | Albert et al. | |
| 6,914,905 B1 | 7/2005 | Yip | |
| 6,917,617 B2 | 7/2005 | Jin et al. | |
| 6,937,606 B2 | 8/2005 | Basso et al. | |
| 6,957,258 B2 | 10/2005 | Maher, III et al. | |
| 6,973,097 B1 | 12/2005 | Donzis et al. | |
| 6,981,029 B1 | 12/2005 | Mendito et al. | |
| 7,065,086 B2 | 6/2006 | Basso et al. | |
| 7,072,981 B1* | 7/2006 | O'Rourke et al. | 709/245 |
| 7,224,701 B2 | 5/2007 | Ozguner | |
| 2001/0034792 A1 | 10/2001 | Swildens | |
| 2001/0052006 A1 | 12/2001 | Barker et al. | |
| 2001/0055317 A1 | 12/2001 | Kajizaki et al. | |
| 2002/0016856 A1* | 2/2002 | Tallegas et al. | 709/238 |
| 2002/0087694 A1 | 7/2002 | Daoud et al. | |
| 2002/0129127 A1 | 9/2002 | Romero et al. | |
| 2002/0141401 A1 | 10/2002 | Albert et al. | |
| 2003/0009561 A1 | 1/2003 | Sollee | |
| 2003/0014525 A1 | 1/2003 | De Lima et al. | |
| 2003/0046423 A1 | 3/2003 | Narad et al. | |
| 2003/0093496 A1* | 5/2003 | O'Connor et al. | 709/226 |
| 2003/0149690 A1 | 8/2003 | Kudlacik et al. | |
| 2003/0193949 A1 | 10/2003 | Kojima et al. | |
| 2004/0003110 A1 | 1/2004 | Ozguner | |
| 2004/0049582 A1 | 3/2004 | Noel et al. | |
| 2004/0162901 A1* | 8/2004 | Mangipudi et al. | 709/225 |
| 2004/0246981 A1 | 12/2004 | He et al. | |
| 2005/0010754 A1 | 1/2005 | Brendel | |
| 2005/0074009 A1 | 4/2005 | Kanetake | |
| 2006/0080446 A1 | 4/2006 | Bahl | |

OTHER PUBLICATIONS

Hornig, *Network Working Group RFC*: 894; *DARPA Internet Program Protocol Specification* (Apr. 1984).

Information Sciences Institute, University of Southern California, *Internet Protocol RFC*: 791; *DARPA Internet Program Protocol Specification* (Sep, 1981).

Information Sciences Institute, University of Southern California, *Transmission Control Protocol RFC*: 793; *DARPA Internet Program Protocol Specification* (Sep. 1981).

Postel, *Network Working Group RFC*: 879; *DARPA Internet Program Protocol Specification* (Nov. 1983).

Saunders, Stephen et al.; "The Policy Makers"; Data Communications; pp. 34-35 and 36-56(even only).

Postel, "RFC 792—ICMP," 1981, pp. 1-4.

Mogul et al., "RFC 1191—Path MTU Discovery," 1990, pp. 1-3.

Van Ess, D., *A Circular FIFO, PSoC Style*, Cypress Microsystems, Application.

Network Working Group, *RFC 1071—Computing the Internet Checksum*, Sep. 1988, available at: http://www.faqs.org/rfcs/rfc1071.html.

Network Working Group, *RFC 1141—Incremental Updating of the Internet Checksum*, Jan. 1990, available at: http://www.faqs.org/rfcs/rfc1141.html.

Network Working Group, *RFC 1624—Computation of the Internet Checksum via Incremental Update*, May 1994, available at: http://www.faqs.org/rfcs/rfc1624.html.

Netlogic Microsystems, Product Brief NSE5000GLQ, Copyright 2004, available at : http://www.netlogicmicro.com/datasheets/nse5000glq.html.

Zhang, Z., *Recovery of Memory and Process in DSM Systems: HA Issue #1*, Hewlett-Packard Co. HPL-2001-76, Mar. 30, 2001.

* cited by examiner

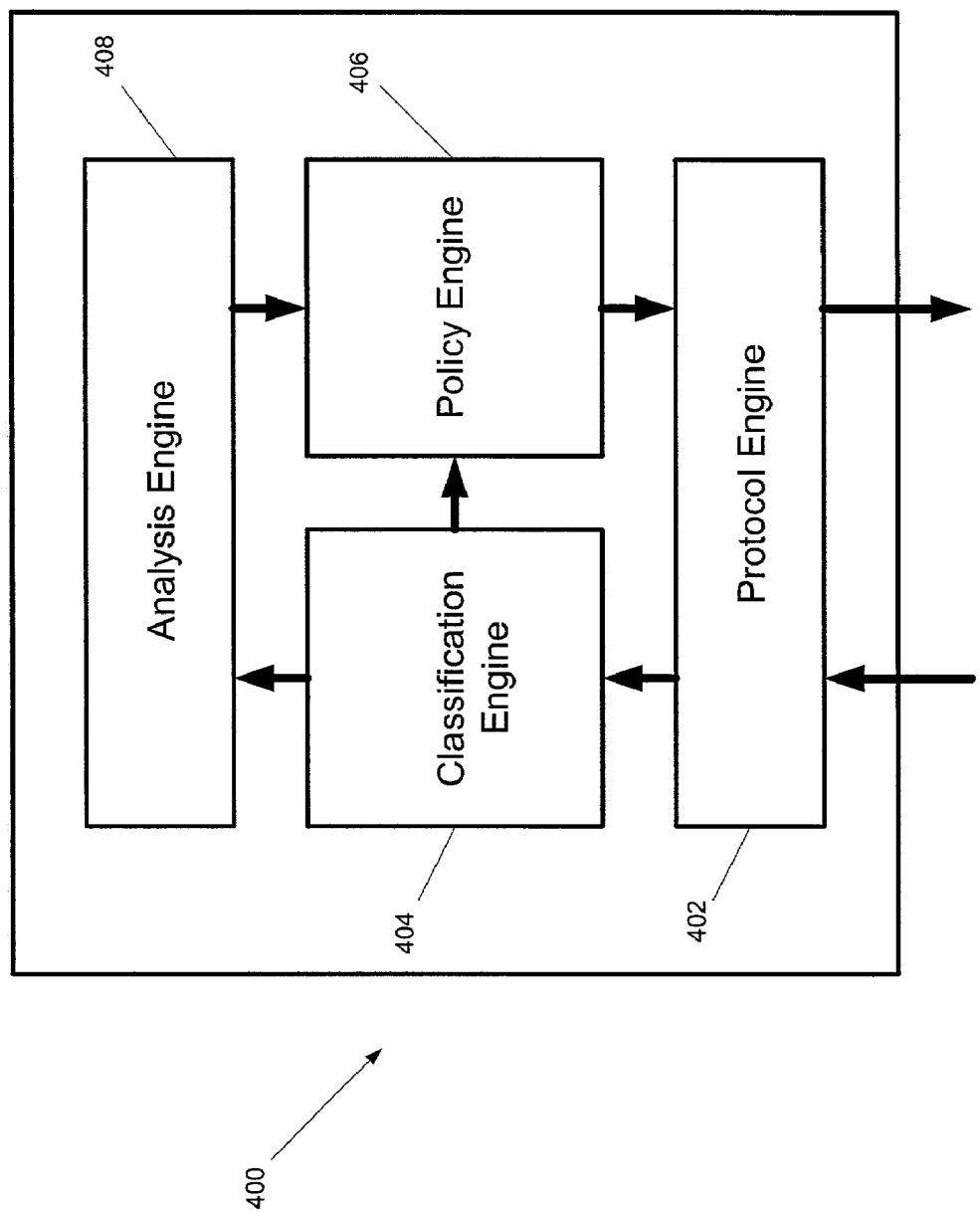

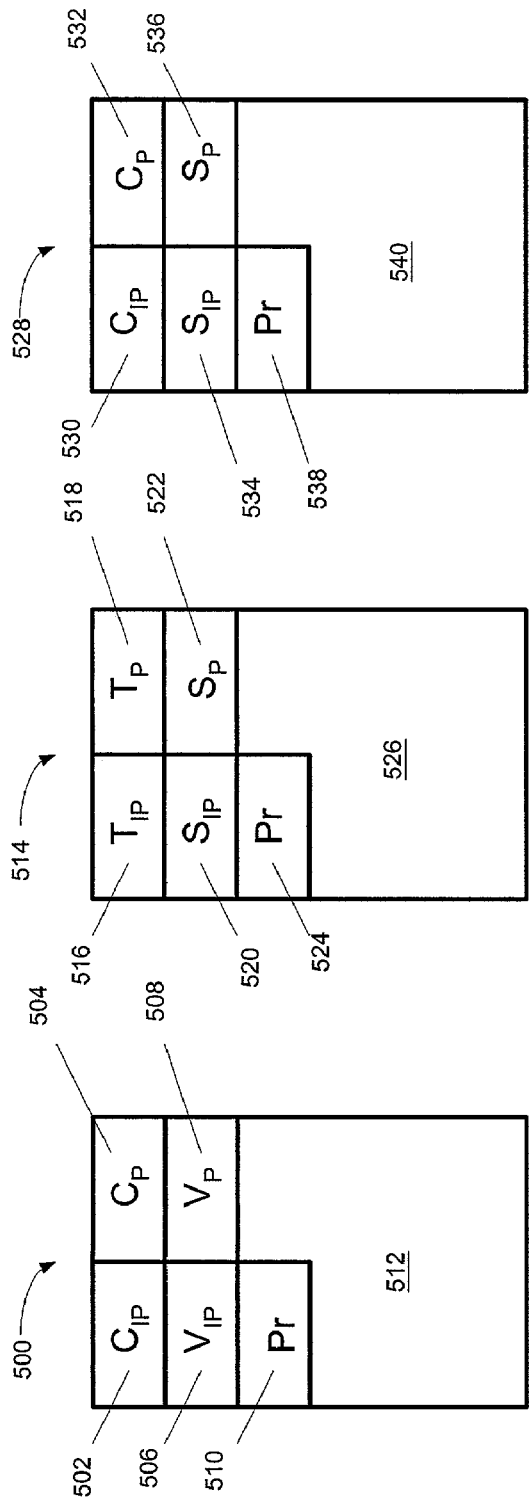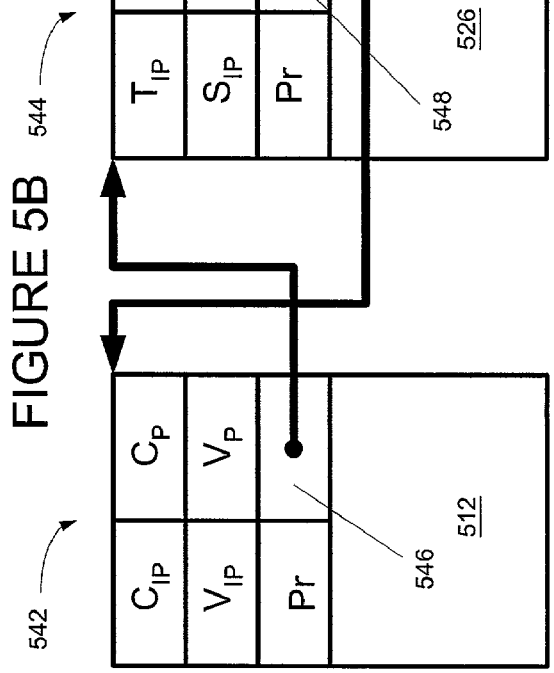
FIGURE 5A
FIGURE 5B
FIGURE 5C
FIGURE 5D

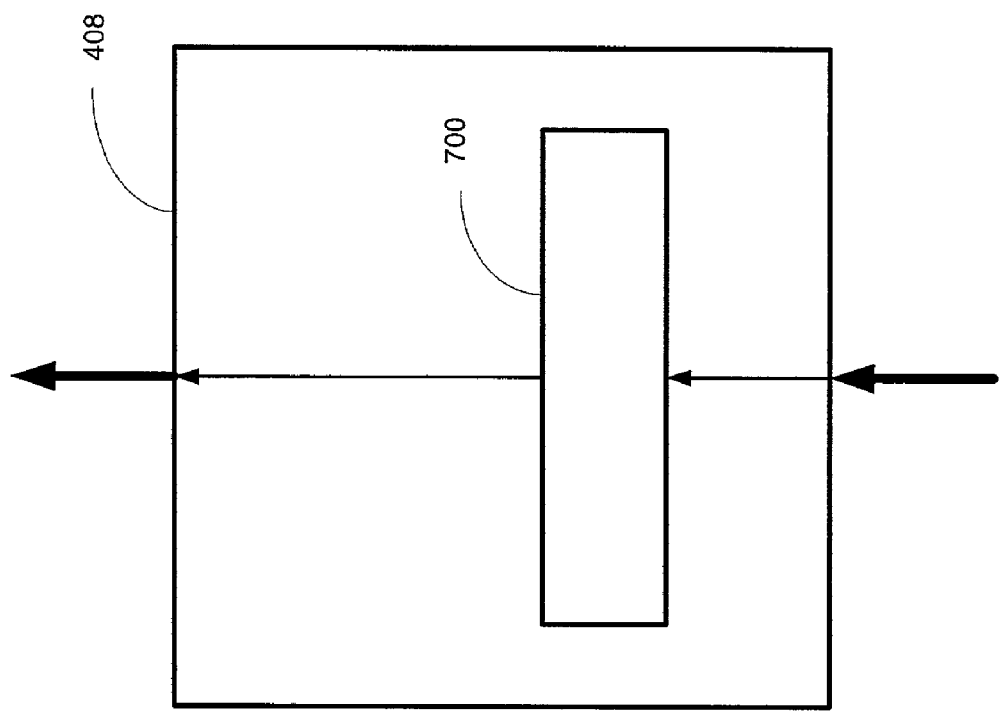

| 2-bit Flags | 22-bit Pointer | Description |
|---|---|---|
| 2'h0 | any | RESERVED – ILLEGAL |
| 2'h1 | any | Server TCB |
| 2'h2 | any | Client TCB |
| 2'h3 | 22'h0 – 22'h3FFFFB | Flow TCB |
| 2'h3 | 22'h3FFFFF | Reset (RST) |
| 2'h3 | 22'h3FFFFE | Drop (DRP) |
| 2'h3 | 22'h3FFFFD | Ignore (IGN) |
| 2'h3 | 22'h3FFFFC | Forward (FWD) |

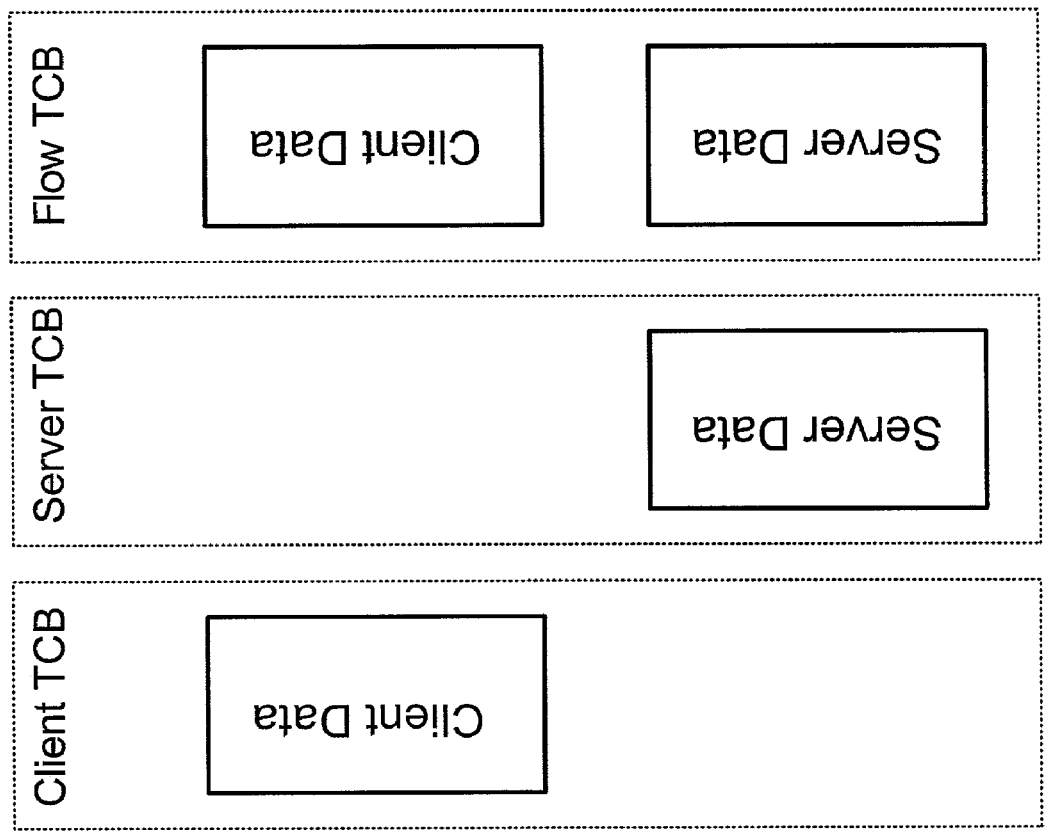

- 1) ClientTCBID: Self-identifying Client Pointer Number
- 2) ClientServerPointer: Pointer to a Linked Server TCB
- 3) ClientGenCount: Client Generation Count
- 4) ClientState: State of Client Connection
- 5) ClientDeferredAck: Type of Ack Processing required by Client
- 6) ClientProtocol: IP Encapsulated Protocol used by Client
- 7) ClientRxBuffer: Size of Proxy Receive Buffer for Client Data
- 8) ClientVLANTag: VLAN Tag from Client Packets
- 9) ClientMacAddr: MAC Address of Client
- 10) ClientIP: IP Address of Client
- 11) VipIP: Virtual IP Requested by Client
- 12) ClientWindow: TCP Window from Proxy to Client
- 13) ClientMTU: TCP MTU Size specified by Client
- 14) ClientPort: TCP or UDP Port Address of Client
- 15) VipPort: Virtual Port Requested by Client
- 16) ClientMSS: TCP Maximum Segment Size from Client
- 17) ClientLastWindow: Last TCP Window received from Client
- 18-22) Sequence Number Tracking  (continued on Figure 14C)

FIGURE 14B

Client Sequence Number Tracking

- 18) ClientProxySequenceNumber: Records the Sequence Number of the end of the Last Data Segment forwarded to a server in the Client's Sequence Space
- 19) ClientInitSequenceNumber: Initially records the Client's Initial Sequence Number. Subsequently, the next Sequence Number from the VIP to the client is recorded.
- 20) ClientLastSequenceNumber: Records the Highest Acknowledgement Sequence Number sent to the Client
- 21) ClientFinSequenceNumber: Records the Sequence Number of a FIN TCP Flag from a Client
- 22) ClientDeltaSequenceNumber: Records the Difference between the Client and Server Sequence Space for an Client and Server TCB Linked Pair.

FIGURE 14C

- 1) ServerTCBID: Self-identifying Client Pointer Number
- 2) ServerClientPointer: Pointer to a Linked Client TCB
- 3) ServerGenCount: Server Generation Count
- 4) ServerState: State of Server Connection
- 5) ServerSSLState: Conditional State Flag
- 6) ServerProtocol: IP Encapsulated Protocol used by Server
- 7) ServerIndex: Load Balancing Index of Server
- 8) ServerVLANTag: VLAN Tag from Server Packets
- 9) ServerMacAddr: MAC Address of Server
- 10) ServerIP: IP Address of Server
- 11) TalismanIP: Ephemeral IP Sent to Server
- 12) ServerWindow: TCP Window from Server to Proxy
- 13) ServerMTU: TCP MTU Size specified by Server
- 14) ServerPort: TCP or UDP Port Address of Server
- 15) TalismanPort: Ephemeral Port Sent to Server
- 16) ServerCSI: TCP Maximum Segment Size from Client
- 17) ServerHistoryPointer: Last TCP Window received from Client
- 18-21) Sequence Number Tracking (continued on Figure 15C)

FIGURE 15B

Server Sequence Number Tracking

- 18) TalismanInitSequenceNumber Initially records the Ephemeral Port's Initial Sequence Number. Subsequently, the highest Acknowledgement number from the Server is recorded.
- 19) ServerLastSequenceNumber. Records the highest Acknowledgement number sent to the Server
- 20) ServerFinSequenceNumber. Records the Sequence Number of a FIN TCP Flag from a Server
- 21) ServerDeltaSequenceNumber. Records the Difference between the Server and Client Acknowledgement Space for an Client and Server TCB Linked Pair.

FIGURE 15C

| | 56/55 | 32/31 | 0 |
|---|---|---|---|
| Policy0 | Super Group Addr0 | Total Service Count | |
| Current Service Count | | Peak Service Count | |

Service Index Table

FIGURE 16A

| 63 | 48/47 | 32/31 | 24/23 | 15/14 | 10/9 | 0 |
|---|---|---|---|---|---|---|
| reserved | Server Port Number | reserved | Current # | reserved | Member # | Base Group Addr1 |
| reserved | Base Group Addr0 | | | | | |

Super Group Table

FIGURE 16B

```
GET /myhome/mysports/myinjuries HTTP/1.1
Accept: */*
Accept-Language: gzip,deflate
User-Agent: Mozilla/4.0 (compatible; MSIE 5.0; Windows 98; DigExt)
Host: www.myhomepage.com
Connection: Keep-Alive
Cookie: registered=no; UID=23456890 mesp_popup=y2k%,3Dyes; TID=265179813458?
KID = 20103234; charttype =HIST; chartview = 1WEEK.
```

FIGURE 20

| Name | Bit fields | Length (bytes) | Description |
|---|---|---|---|
| Key | 15:0 | 2 | The BLT subservice index (BSI) or virtual service index (VSI) — 2102 |
| Association | 239:216 | 3 | CA subservice index (CSI) used for default BSI domain service purpose. In our system, we only use 22-bit as csi. The other bits are reserved — 2108 |
| | 215:200 | 2 | instructions on how to use the cookie value associated with this cookie name. In our system, we only use 2 bits as cookie_name_mode. The other bits are reserved — 2104 |
| | 199:0 | 25 | The cookie name specified by the virtual service index — 2106 |
| | | 30(Total) | |

FIGURE 21

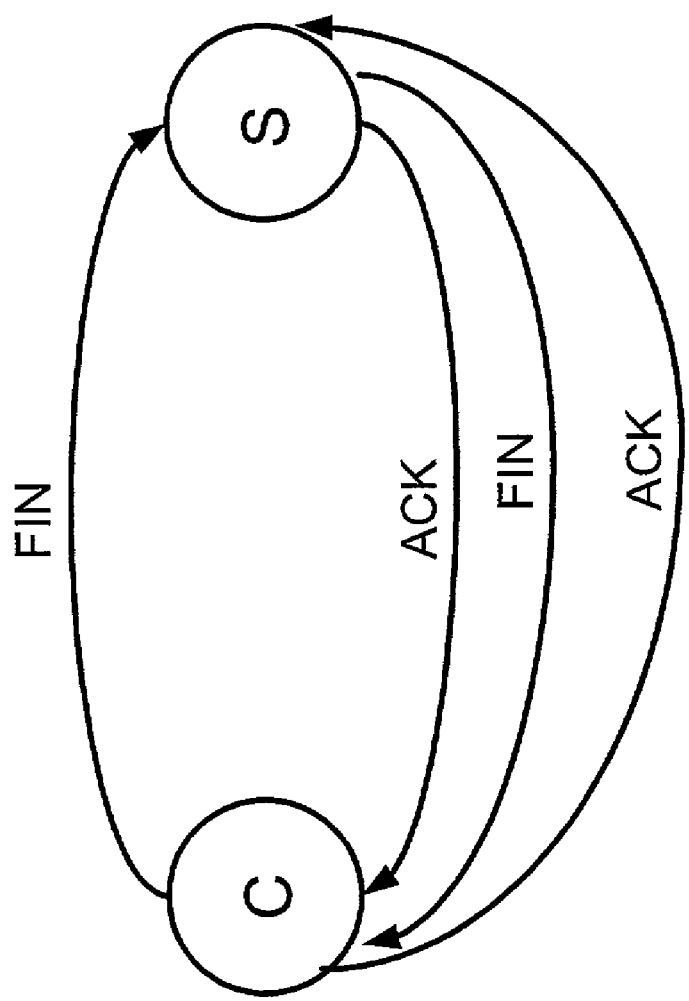

| inputs | | | | valid bits | | | | id field filled | id field value | prt |
|---|---|---|---|---|---|---|---|---|---|---|
| SSL connection | cookie mode enabled | cookie found | SIPSID entry found | sid | cid | cookie_hash | server_id | | | |
| yes | NA | NA | NA | 1 | 0 | 0 | 0 | cookie_id/ session_id | session_id = hash(SSL session ID) | 1 |
| no | any | no | NA | 0 | 1 | 0 | 0 | CSI (? service index) | default_cookie_id | 2 |
| | cookie_learn | yes | NA | 0 | 1 | 0 | 0 | cookie_id cid_valid = 1 | cookie_id = hash(cookie_value) | |
| | directive_hash | yes | NA | 0 | 0 | 1 | 0 | cookie_hash | service_id = hash(cookie_value) | |
| | saf_id | yes | no | 0 | 1 | 0 | 0 | cookie_id/ session_id | cookie_id = default_cookie_id | |
| | | yes | yes | 0 | 0 | 0 | 1 | server_id | server_id = SIPSID[key] where key = hash(cookie_value, BSI) | |
| | none | NA | NA | 0 | 0 | 0 | 0 | none | none (result of header parsing will be used) | 3 |

FIGURE 32

```
RR Algorithm:
first_round_robin_index_address = (unsigned short *) sub_service_group_address;
round_robin_index_address = (unsigned short *) ((unsigned long) sub_service_group_address + sub_service_group_size * 2);
round_robin_index = *previous_round_robin_index_address;

for (i=0; i<2; i++) {
    if (i==0) {
        /* from round_robin_index to server_group_size */
        from = round_robin_index;
        to = sub_service_group_size;
    } else {
        /* from 0 to round_robin_index-1 */
        from = 0;
        to = round_robin_index - 1;
    }
    for (j=from; j<to; j++) {
        next_round_robin_index_address = (first_round_robin_index_address + j);
        server = sub_service_table_address[next_round_robin_index_address];
        if (server.state == UP && server.current_connection < server.max_connection) {
            server.current_connection++;
            if (j == server_group_size) {
                *round_robin_index_address = 0;
            } else {
                *round_robin_index_address = j+1;
            }
            candidate_index = *next_round_robin_index_address;
            find the server entry using candidate_index in server table;
            return ip_address, port, interface;
        }
        continue;
    }
}
return NO_SERVER_AVAILABLE; /* may be indicated by ip=0, port=0 */
```

FIGURE 33A

```
RR Algorithm:
first_round_robin_index_address = (unsigned short *) sub_service_group_address;
previous_round_robin_index_address = (unsigned short *) ((unsigned long) sub_service_group_address +
sub_service_group_size * 2);
previous_round_robin_index = *previous_round_robin_index_address;

for (i=0; i<2; i++) {
    if (i==0) {
        /* from round_robin_index to sub_service_group_size */
        from = previous_round_robin_index + 1;
        to = sub_service_group_size;
    } else {
        /* from 0 to previous_round_robin_index */
        from = 0;
        to = previous_round_robin_index - 1;
    }
    for (j=from; j<to; j++) {
        next_round_robin_index_address = (first_round_robin_index_address+j);
        server = sub_service_table_address[next_round_robin_index_address];
        if (server.state == UP && server.current_connection < server.max_connection) {
            if (--server.current_weight == 0) {
                server.current_weight = server.priority_or_weight;
                continue; /* go to next server */
            }
            server.current_connection++;
            *previous_round_robin_index_address = j;
            candidate_index = *next_round_robin_index_address;
            select port and interface;
            return ip_address, port, interface;
        }
        continue;
    }
}
return NO_SERVER_AVAILABLE; /* may be indicated by ip=0, port=0 */
```

FIGURE 33B

```
UP Algorithm:
candidate_server.current_connection = 0xFFFF;
first_index_address = (unsigned short *) sub_service_group_address;
for (i=0; i<sub_service_group_size; i++) {
    next_index_address = (first_index_address+i);
    server = sub_service_table_address[next_index_address];
    if (server.state == UP && server.current_connection < candidate_server.current_connection) {
        candidate_index = *next_index_address;
        candidate_server = server;
    }
} if (i == server_group_size) {
    return NO_SERVER_AVAILABLE; /* may be indicated by ip=0, port=0 */
}

/* select candidate_server pointed at by candidate_index */
select a port and interface;
candidate_server.current_connection += candidate_server.max_connection;
return ip_address, port, interface;
```

FIGURE 33C

```
LC Algorithm:
candidate_server.current_connection = 0xFFFF;
first_index_address = (unsigned short *) sub_service_group_address;
for (i=0; i<sub_service_group_size; i++) {
    next_index_address = (first_index_address+i);
    server = sub_service_table_address[next_index_address];
    if (server.state == UP && server.current_connection < candidate_server.current_connection) {
        candidate_index = *next_index_address;
        candidate_server = server;
    }
}
if (i == server_group_size) {
    return NO_SERVER_AVAILABLE; /* may be indicated by ip=0, port=0 */
}

/* select candidate_server pointed at by candidate_index */
select a port and interface;
candidate_server.current_connection++;
return ip_address, port, interface;
```

FIGURE 33D

```
WLC Algorithm:
candidate_server.current_connection = (0xFFFF;
first_index_address = (unsigned short *) sub_service_group_address;
for (i=0; i<sub_service_group_size; i++) {
    next_index_address = (first_index_address+i);
    server = sub_service_table_address[next_index_address];
    if (server.state == UP && server.current_connection < candidate_server.current_connection) {
        candidate_index = *next_index_address;
        candidate_server = server;
    }
} if (1 == server_group_size) {
    return NO_SERVER_AVAILABLE; /* may be indicated by ip=0, port=0 */
}

/* select candidate_server pointed at by candidate_index */
select a port and interface;
increase candidate_server.current_connection count according to some predefined weighting function;
return ip_address, port, interface;
```

FIGURE 33E

```
PS Algorithm:
candidate_server.priority_or_weight = 0xff;
first_index_address = (unsigned short *) sub_service_group_address;
for (i=0; i<sub_service_group_size; i++) {
    next_index_address = (first_index_address++);
    server = sub_service_table_address[next_index_address];
    if (server.state == UP && server.current_connection < server.max_connection &&
            server.priority_or_weight > candidate_server.priority_or_weight) {
        candidate_index = *next_index_address;
        candidate_server = server;
    }
}
if (i == server_group_size) {
    return NO_SERVER_AVAILABLE; /* may be indicated by ip=0, port=0 */
}

/* select candidate_server pointed at by candidate_index */
/* select a port and interface */
candidate_server.current_connection++;
return ip_address, port, interface;
```

FIGURE 33F

| Type of Data in Buffer | Data Purged | next action |
|---|---|---|
| none | all data received has been purged | wait for new data and then decide if it is additional non-header data or header data |
| non-header data | full purge: all data sent to pakman has been purged | return to step 1 in this sequence |
| | all data sent to pakman has not been purged | wait for full purge of all data sent to pakman then return to step 1 in this sequence |
| header data | full purge: all data sent to pakman has been purged | wait for complete header and then send header to CA |
| | all data sent to pakman has not been purged | wait for full purge |

FIGURE 36

| Selection | TCB Type | Use During "Expected" Server/Client Behavior |
|---|---|---|
| syn_sent | ctcb / stcb | Timer is set by pakman when the first packet received by a client or server passes through talisman. This is the value which should be used when the crawler entry is initialized. Otherwise, it is not used. |
| retry1, retry2, retry3 | ctcb / stcb | If the client or server does not respond to the 1st packet sent by talisman then the timeout will expire. (In the case of a client this is a synack packet, while in the case of a server this is a syn packet). Pakman then uses these timer values to retransmit the appropriate packet, seeking a response. If there is no response after the third attempt then a reset will be sent. |
| established | ctcb | ctcb - client ack is received by talisman, completing the 3-way ahndshake. |
|  | stcb | Used to indicate that an activity has occured for the talisman to server connection. There are two circumstances under which this value is selected:<br>1) Talisman receives a synack from the server. If a timeout occurs then a series of req_sent and data_retry timeouts will be used to send the synack packet to the client multiple times.<br>2) Pakman requests data from FMU. This is the first step in forwarding client data to the server. If this timeout occurs then some error has occured or an http1.1 connection has been left open, but unused, for too long. In such cases the connection will be reset. |
| req_sent | stcb | Timer is set when client data is first forwarded to the server. If an uck for some or all of the data is received then the timer is reset to established. If the timer expires then a series of data_retry timeouts are used to send the data. |
| data_retry1, data_retry2, data_retry3 | stcb | Talisman resends data 3 times (retry1, retry2, retry3) and then resets the connection if a data_retry3 timer expires. |
| fin_seen | ctcb | Set when a client which is bound to a server sends a fin and server has not seen a fin |
|  | stcb | Set when a server sends a fin packet. |

FIGURE 39A

| Selection | TCB Type | Use During "Expected" Server/Client Behavior |
|---|---|---|
| fin_acked | ctcb | This timeout is set if the connection has seen the following events:<br>server sends fin<br>client acks<br>client fin is received by talisman<br>Once the timer expires the fin_timeout timer is selected. |
| fin_timeout | stcb | This timeout is used only in corner cases involving unexpected behavior on the part of the server or the client. |
| | ctcb / stcb | When timer expires the crawler entry is immediately deleted. A dedicated timer is used so that the time the connection remains open after a FIN can be tuned. After this timer expires a reset timeout is usually started. |
| reset | ctcb / stcb | When timer expires talisman sends a reset and then schedules crawler entry for deletion using the reclaim_now timer. |
| reclaim_now | ctcb / stcb | When timer expires talisman immediately deletes the crawler entry. |

FIGURE 39B

SWITCHING SYSTEM

RELATED APPLICATIONS

This application is related to U.S. Provisional Application No. 60/355,922, entitled "Network Switch"; U.S. patent application Ser. No. 10/073,483, entitled "Method Of And System For Allocating Resources To Resource Requests Based On Application Of Persistence Policies"; U.S. patent application Ser. No. 10/074,462, entitled "Method Of And System For Allocating Resources To Resource Requests"; U.S. patent application Ser. No. 10/073,538, entitled "Method And System For Maintaining Temporal Consistency Of Resources And Data In A Multiple Processor Packet Switch"; U.S. patent application Ser. No. 10/073,638, entitled "Method And System For Managing Traffic In A Packet Network Environment"; U.S. patent application Ser. No. 10/073,484, entitled "Method And System For Translating Packet Sizes In A Network." Each of the foregoing applications is filed concurrently herewith, and owned in common by the assignee hereof. Moreover, each of these applications is fully incorporated herein by reference as though set forth in full.

FIELD OF THE INVENTION

This invention generally relates to a switching system, and, more specifically, to an architecture for such a system which is modularized, scaleable, and suitable for high throughput applications.

RELATED ART

In an application known as Server Load Balancing (SLB), a bank of servers is maintained at a logical or physical network situs within a network, and an entity within the network distributes client requests across the bank of servers. The objective is to avoid overloading any one of the servers, thus decreasing the response time from any one of the servers. Another objective is to provide redundancy so that the network situs can remain operational even if one or more of the servers goes down.

In one approach to server load balancing, illustrated in FIG. 1, a client 100 desires to access a resource maintained in one or more servers in the bank of servers 102. The bank of servers 102 is accessible to the client 100 over a network 106, which may be a TCP/IP network such as the Internet. The client is assumed to be aware of the Uniform Resource Locator (URL) of the network situs corresponding to the bank of servers 102, e.g., AOL, but is not aware of the IP addresses of any of these servers. Consequently, it accesses (Domain Name System) DNS server 104 to determine the IP address of a specific server within the bank 102.

Each of the servers in bank 102 has a separate IP address which is maintained by DNS server 104, and associated by the DNS server 104 with the URL of the network situs corresponding to bank 102. When DNS server 104 receives the request from client 100, it allocates one of the servers within bank 102 to the request, and then it provides the client 100 with the IP address of the server it has allocated. Client 100, armed with the IP address of the server that has been allocated to it, then interacts directly with that server using the IP address that has been provided to it.

A problem with this approach is that, since the server bank 102 has no way of knowing beforehand which specific server will be allocated to the client's request, all resources must be replicated across each of the specific servers 102a, 102b, 102c. That way, no matter which specific server is allocated to the client's request, the request can be handled. Replication of resources across each of the individual servers, however, is an inefficient utilization of system resources, and thus may not be suitable for certain applications.

Another problem is that any changes to the server bank 102, such as addition or deletion of specific servers, must be reflected in DNS server 104. This requirement can be burdensome, particularly if the changes to server bank 102 are relatively dynamic.

Yet another problem is that DNS server 104 lacks access to the loading information regarding servers 102a, 102b, and 102c, and is therefore required to assign a request to a server in a manner which is independent of this loading information.

Another approach which has been considered is assigning all the individual servers within server bank 102 the same IP address, and assigning a network entity other than DNS server 104 the responsibility for allocating resource requests to specific servers. With this approach, changes to server bank 102 need not be reflected in DNS server 100, and the burden of updating DNS server 104 responsive to these changes can be avoided. Moreover, if the network entity is capable of allocating resource requests to specific servers, the resources need not be replicated across all the servers and can be maintained on specific servers. For example, referring to FIG. 2, all the individual servers 102a, 102b, 102c within server bank 102 are assigned to the same IP address, and network entity 200 is responsible for allocating requests from client 100 to specific servers. When requests are issued by client 100, network entity 200 can direct these requests to server 102a through the MAC address (which is layer 2 routing).

Conventional implementations of network entities capable of performing routing or switching functions are subject to significant bottlenecks, particularly as the number of connections being simultaneously handled approaches one million connections. One of these bottlenecks is the time it takes the stack to open up a connection. A second of these bottlenecks is the time required to perform the analysis required to route the packet to its desired destination. A third of these bottlenecks is the time it takes to pull the requested information into a cache.

These bottlenecks pose significant latency and problems issues for applications involving high throughout and/or large numbers of connections.

SUMMARY

The invention provides a system for handling one or more resource requests. A protocol engine receives a request addressed to the system in accordance with a specified protocol. A classification engine classifies the request according to the class of service requested. An analysis engine may analyze the request to determine a subclass of service requested. Responsive to one or both of these determinations, a policy engine may allocate a resource in response to the request. If the resource request is accompanied by a payload, the protocol engine may send the payload to the allocated resource using the prescribed protocol. Each of the foregoing engines may be implemented in hardware, or a combination of hardware and software.

The resource requests may be in the form of packets. A packet may be accompanied by data which constitutes the payload. In one embodiment, an interface engine buffers a packet, and, while the interface engine checks the packet for errors, the classification engine accesses the buffered packet and derives one or more keys therefrom. If the interface engine detects an error in the packet, it flushes the packet from the system before significant resources are committed to the packet or the packet is sent to its desired destination. If the interface engine does not detect an error in the packet, the one or more keys may be used to determine if a client-server connection already exists for the packet and/or to determine the desired class of service for the packet.

In a second embodiment, the classification engine derives first and second keys from the packet, and utilizes the first key to access a first database and determines therefrom if a client-server connection for the packet already exists and utilizes the second key to access a second database and determines therefrom the desired class of service for the packet.

In a third embodiment, a connection is represented by a pointer which points to a control block for the connection and which bears a 1-1 relationship with the connection. In this embodiment, a connection can be a connection between a client and the system, the system and a server, or a client and a server. Similarly, a control block for a connection can be a control block for a connection between a client and the system, the system and a server, or a client and a server. The control block for a connection between a client and the system can be bound to a control block for a connection between the system and a server, or may be unbound to such a control block.

In a fourth embodiment, a packet having a packet header is received and this packet header specifies the system as the destination for the packet. The protocol engine modifies the packet header to specify a client or server as the destination of the packet. The protocol engine may access one or more control blocks for a client-server connection for the packet to determine this client or server. The modified packet is then provided to the interface engine for transmission over the network.

In a fifth embodiment, for a first category of service, the system functions as a proxy for a server in relation to a packet, and, for a second category of service, does not function as a proxy for a server in relation to the packet. (In another embodiment, useful for applications such as SSL, the system may function as a full proxy).

In a sixth embodiment, for a selected category of service, the system buffers packets received from clients for assembly into larger data groupings, but does not do so for packets received from servers.

Similarly, in a seventh embodiment, for a selected category of service, the system acknowledges packets received from clients but not from servers.

In an eighth embodiment, for a selected category of service, the system places packets received from clients in an assembly buffer, and acknowledges receipt of such a packet using the TCP sequence space to indicate left-wise contiguity in the assembly buffer.

In a ninth embodiment, a connection, when created, is assigned a generation count, and a server is bound to the connection only if the generation count assigned to the entry is equal to an expected value.

In a tenth embodiment, for a first category of service, the system allocates a server to the packet responsive to the content of a data grouping encapsulating the packet, while, for a second category of service, the system allocates a server to the packet responsive to information other than the content of a data grouping encapsulating the packet.

In an eleventh embodiment, for a first category of service, the system allocates a server to the packet on a deferred basis, i.e., after the analysis engine has analyzed the content of a data grouping encapsulating the packet to determine the subclass of service requested, and possibly other information, while, for a second category of service, the system allocates a server to the packet upon a determination by the classification engine of the class of service requested.

A twelfth embodiment comprises any combination of the foregoing embodiments.

In one implementation, the packets are TCP/IP packets, and the analysis engine comprises an assembly engine (which in one example may be referred to as the external memory unit (EMU)), and a content analyzer (CA). In this implementation, each of the engines may be implemented in hardware, for example, as one or more finite state machines.

In this implementation, the interface engine receives a packet, buffers it, and checks it for checksum errors. While the interface engine is checking the packet for checksum errors, the classification engine accesses the packet and derives two keys therefrom. The first key is derived from a 5-tuple consisting of the following pieces of information obtained from the packet header: source IP address, destination IP address, source port, destination port, and protocol. The second key is derived from a 3-tuple consisting of the following pieces of information obtained from the packet header: destination IP address, destination port, and protocol.

If the interface engine detects a checksum error in the packet, it flushes the packet from the system before a server has been allocated to the packet or before the packet is sent to its desired destination.

Assuming a checksum error is not detected, the classification engine utilizes the first key to access a first content addressable memory (CAM) and determine therefrom whether a client-server connection exists for the packet. The entry in the CAM corresponding to the first key is analyzed to determine if it corresponds to a client-server connection, or is the null value, indicating that a client-server connection does not exist.

A connection may be defined with the aid of layered reference models for depicting the movement of information between entities connected to a network. The layers in the reference models help to segregate information and network functions into manageable units. The general functions of each layer are often based on an international standard called Open System Interconnection (OSI) Reference Model promulgated by the International Standard Organization (ISO). OSI sets forth seven processing layers through which information may pass when transmitted between network entities. Layer 1 is the physical layer, layer 2 is the data link layer, layer 3 is the network layer, layer 4 is the transport layer, layer 5 is the session layer, layer 6 is the presentation layer, and layer 7 is the application layer.

Another layered reference model that is widely implemented is the TCP/IP (Transmission Control Protocol/Internet Protocol) Reference Model. TCP/IP defines four processing layers through which information may pass when transmitted between network entities. Layer 1 is the host-to-network layer, and corresponds to the combination of layers 1 and 2 in the OSI model. Layer 2 is the Internet Protocol (IP) layer, and corresponds to layer 3 in the OSI model. Layer 3 is the transport layer, and corresponds to layer 4 in the OSI model. Either of two end-to-end protocols may apply to layer 3 in the TCP/IP model. The first is a connection oriented protocol known as the Transmission Control Protocol (TCP). The second is a connectionless protocol known as the User Datagram Protocol (UDP). Layer 4 is the application layer, and corresponds to layer 7 in the OSI model. Counterparts to layers 5 and 6 in the OSI model are not present in the TCP/IP model.

If a flow (layer 4) connection has been established for the packet, the protocol engine arranges to have the packet sent to its desired destination, whether client or server. Similarly, if a layer 5 client-server connection has been established for the packet, and the packet originates from a server, the protocol engine sends the packet to the client called for by the connection.

The classification engine also utilizes the second key to access a second CAM, and determine therefrom the desired class of service for the packet, whether layer 4 or layer 5. Each entry in the second CAM associates a desired class of service with the possible values of the second key. The desired class of server output by the second CAM is utilized only when the access to the first CAM indicates a connection does not yet exist for the packet.

If the desired class of service is layer 4, and a connection does not yet exist, the classification engine issues a service request to the policy engine. In response, the policy engine allocates a server to the request based on application of a suitable policy, e.g., round robin, least connections, etc. The protocol engine then creates a connection with the server, makes suitable entries in the first CAM and corresponding control block, and forwards the packet to the interface engine for transmitting to the server.

If the desired level of service is layer 5, and a connection does not exist, and the packet has originated with a client, the protocol engine causes an assembly buffer to be allocated in the EMU, for assembling the packet into a larger data grouping. Once the buffer has been allocated, the EMU inserts the packet at the appropriate location in the assembly buffer. Additional packets from the client are also added to the buffer until an http end-of-header is detected (or the buffer is full, or the end of the payload in a POST method is detected, or, in applications involving SSL, the end of an SSL record is detected). As the packets are received, the protocol engine acts as a server proxy inasmuch as it acknowledges receipt of the packets to the client, and uses the sequence space to indicate left-wise contiguity in the EMU buffer. Thus, if the packets are received in order, the protocol engine increments the next available sequence number in sequence space with the length of the packets as the packets are received. However, if the packets are received out of order, the protocol engine updates the next available sequence number in sequence space to accommodate the length of the packet on a deferred basis, i.e., when left-wise contiguity is present.

Once an appropriate data grouping has been assembled in the EMU, the data grouping is passed to the CA, which analyzes the contents thereof, and, responsive thereto, determines a desired sub-class of service. For example, in the case of http, once an http end-of-header has been detected, the header contents are passed to the CA for analysis thereof. In the case of https, once a https record layer has been obtained, the record layer contents (and the corresponding encrypted http string) are passed to the CA for analysis thereof. The CA may also derive certain cookie or session information from the contents of the data grouping and pass this on to the policy engine. Such information may include a cookie or session identifier, a hash value derived from cookie information, or a server identifier derived from cookie information.

Responsive to the desired class of service as determined by the classification engine, the desired sub-class of service as determined by the analysis engine, and any cookie or session information which is derived by the analysis engine, the policy engine allocates a server based on application of a suitable load balancing or persistence policy. If a persistence policy is applicable, a server is identified which is allocated to the request based on application of such a policy. If a persistence policy is inapplicable, a server is identified and allocated to the request based on application of a suitable load balancing policy.

Examples of the load balancing policies which may be applicable include round robin, weighted round robin, least connections, weighted least connections, or utilization percentage. Examples of the persistence policies which may be applicable include self-identification stickiness, cookie hashing stickiness, client-based persistence, cookie identifier based persistence, or session identifier based persistence.

According to self-identification stickiness, the server identifier derived by the analysis engine from cookie information is used to identify and allocate a server to the request. According to cookie hashing stickiness, a service index and/or hash value derived by the analysis engine from cookie information is used to identify and allocate a server to the request. According to client based persistence, a service index and/or client IP address is used to connect the client which issued the request to the server previously connected to the client. According to cookie identifier based persistence, a cookie identifier derived by the analysis engine is used to connect the client which issued the request to the server which issued the cookie. According to session identifier based persistence, a session identifier derived by the analysis engine is used to connect the client which issued the request to the server which issued the session identifier.

The protocol engine then binds the server which has been allocated to the client-side portion of the connection, and makes suitable entries in the first CAM and corresponding control blocks. It then passes the contents of the assembly buffer to the interface engine for subsequent transmission to the server, and purges the buffer upon confirmation of receipt.

Each entry in the first CAM may be implemented as a pointer to a corresponding control block maintained by the protocol engine, where the pointer bears a 1-1 relationship with the connection. In the case of a flow (layer 4) connection, the control block contains information relating to both the client-system connection, and the system-server connection. In the case of a layer 5 connection, the control block may contain information relating to the client-system connection or the system-server connection. If a server has been bound to a layer 5 client connection, the corresponding control block may be bound to the control block corresponding to the system-server connection.

When a connection is created, a generation count is assigned to the connection and data representative thereof stored in the control block for the connection. When a server is to be bound to a connection, the protocol engine first compares the generation count stored in the control block for the connection with the expected generation count, and binds the server to the connection only if the stored generation count is equal to the expected value.

When a packet is received, the packet header will specify a client or server as the source of the packet, and the system as the destination of the packet. If a layer 4 connection has been established for the packet, the control block associated with the connection is retrieved. Responsive thereto, the protocol engine modifies the packet header to indicate the system as the source of the packet, and the client or server called for by the control block as the destination of the packet. It then provides the packet to the interface engine for transmitting to the desired destination.

If a layer 5 client-server connection has been established for the packet, and the packet originates with a server, the control blocks associated with the connection are retrieved. Responsive thereto, the protocol engine modifies the packet header to indicate the system as the source of the packet, and to indicate the client specified by the control blocks as the destination of the packet. If then provides the packet to the interface engine for transmitting to the client.

For packets originating with a client, where the desired level of service is layer 5, the system buffers the packet in an assembly buffer in the EMU, thus allowing a server to be allocated to the packets based on the content of an http segment encapsulating the packet.

From the foregoing, it will be seen that, in this implementation; the protocol engine functions as a server proxy for client-originating packets requiring level 5 service, but does not do so in relation to client-originating packets requiring level 4 service.

- in the case of http, the protocol engine functions as a server proxy for client-originating layer 5 packets, but does not function as a client proxy for server-originating layer 5 packets (in the case of https, the protocol engine may function as a full proxy).
- the protocol engine causes client-originating packets requiring layer 5 service to be buffered in the EMU in order to assemble them into larger data groupings, but does not do so for server-originating packets requiring layer 5 service (or for any packets requiring layer 4 service).
- the protocol engine acknowledges the receipt of client-originating packets requiring layer 5 service, but does not do so for server-originating packets requiring layer 5 service (or for any packets requiring layer 4 service).
- the protocol engine causes client-originating packets requiring layer 5 service to be buffered by the EMU in an assembly buffer, and uses sequence space to indicate left-wise contiguity in the EMU buffer.
- the control block associated with a connection is assigned a generation count when it is created, and a server is only bound to the connection if the generation count in the control block is equal to an expected generation value.
- the policy engine allocates a server to a packet requiring layer 5 service based on the content of the packet, but does not do so in relation to packets requiring layer 4 service.
- the policy engine allocates a server to a client-originating packet requiring layer 4 service upon ascertaining that a connection does not yet exist for the packet, and allocates a server to a client-originating packet requiring layer 5 service on a deferred basis, i.e., after analysis of the content of an http segment encapsulating the packet by the analysis engine.

Method counterparts to each of these embodiments are also provided. Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 4A is a simplified block diagram of one embodiment of a system according to the invention.

FIGS. 5A-5D illustrate examples of TCP control blocks.

FIG. 7A is a simplified block diagram showing a re-assembly buffer within the EMU.

FIG. 10B illustrates the possible values of the fields in the format illustrated in FIG. 10A.

FIG. 12B illustrates the format of a new service-related communication between the classification and policy engines in the implementation of FIG. 8.

FIGS. 13A-13C illustrate, respectively, in simplified form the format of a flow TCB, a client TCB, and a server TCB in the implementation of FIG. 8.

FIG. 14B is a listing and description of the fields in the client-side TCB of FIG. 14A.

FIG. 14C is a listing and description of the fields relating to sequence number tracking in the client-side TCB of FIG. 14A.

FIG. 15B is a listing and description of the fields in the server-side TCB of FIG. 15A.

FIG. 15C is a listing and description of the fields relating to sequence number tracking in the server-side TCB of FIG. 15A.

FIG. 16A illustrates the format of an entry in the SrvcIndex table in the implementation of FIG. 8.

FIG. 16B illustrates the format of an entry in the SuperGrp table in the implementation of FIG. 8.

FIG. 20 illustrates an example of an http header.

FIG. 21 illustrates the formats of SSL records.

FIGS. 24A-24C illustrate the three phases of a TCP connection.

FIG. 32 is a table illustrating content analyzer persistence processing in the implementation of FIG. 8.

FIGS. 33A-33F are examples of pseudo-code listings for the following server load balancing policies: round robin, weighted round robin, utilization percentage, least connections, weighted least connections, and priority.

FIG. 36 is a table listing possible actions by the EMU after the L5 content of a header is sent to the protocol engine in the implementation of FIG. 8.

FIGS. 39A-39B is a table illustrating the possible timeout values used by the crawler in the implementation of FIG. 8.

DETAILED DESCRIPTION

Example Application

Figure 1:
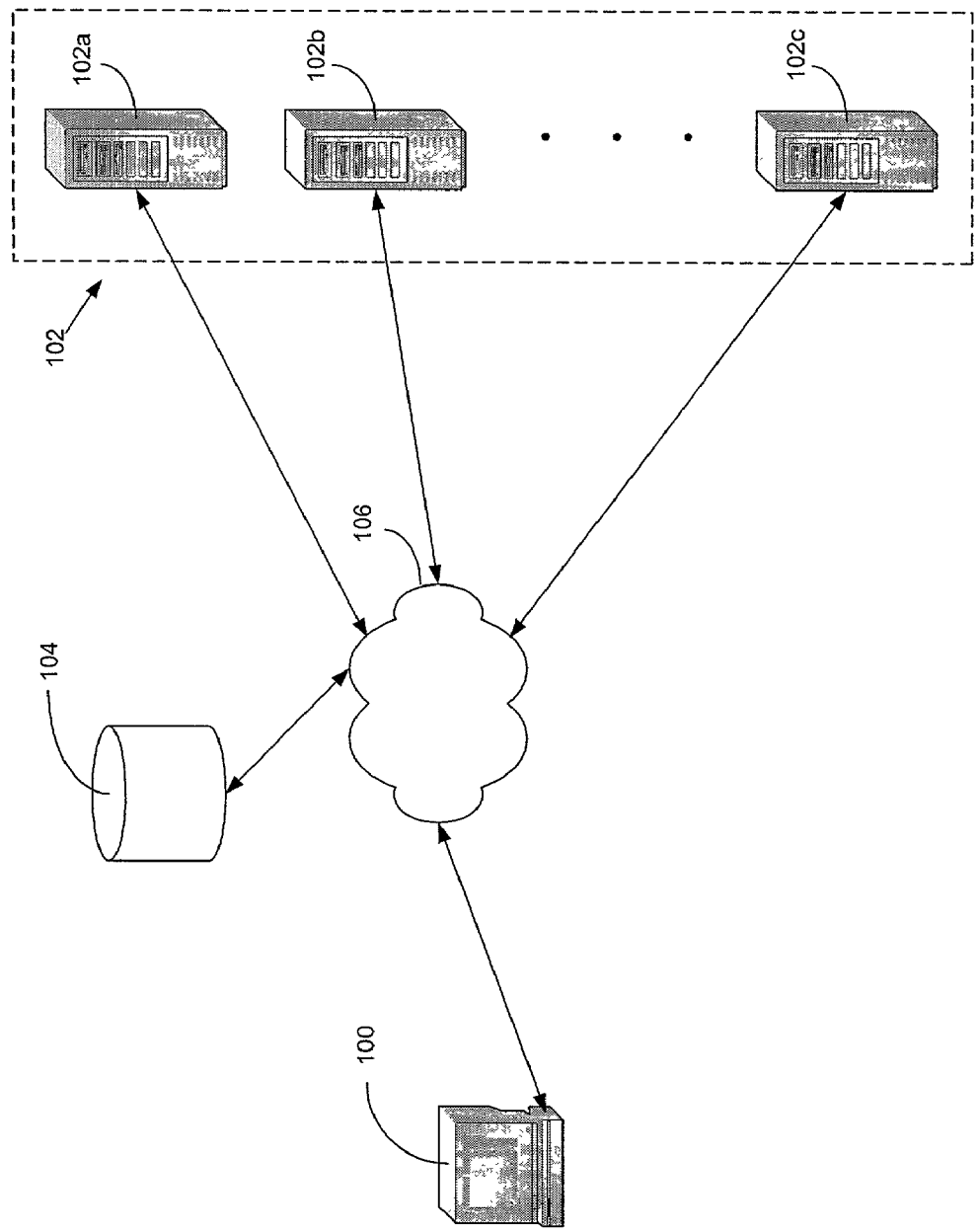
FIG. 1 illustrates a conventional approach to server load balancing.
Figure 2:
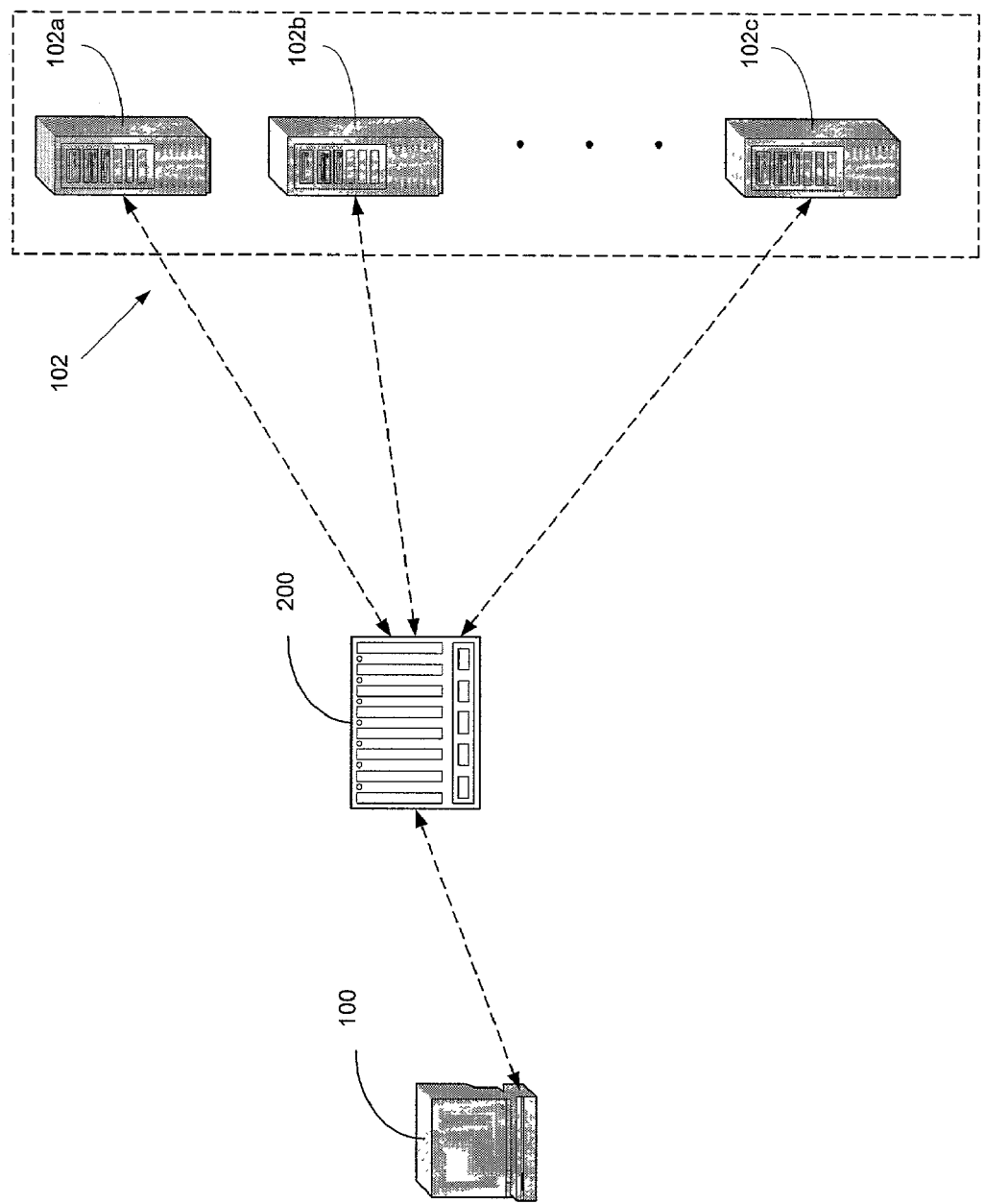
FIG. 2 illustrates an approach to server load balancing in which the iP addresses of individual servers within a server bank are transparent to the client.
Figure 3:
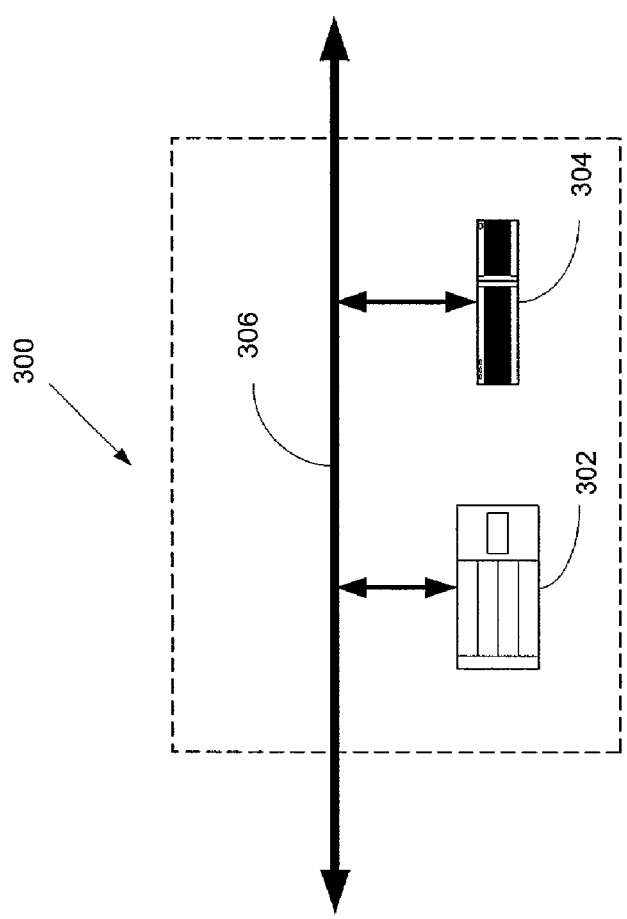
FIG. 3 is a simplified block diagram of one example of a switch incorporating a system according to the invention.

Referring to FIG. 3, an example application of a system according to the invention is illustrated. This example is being provided solely to add context and aid in the understanding of the invention. Other applications are possible, so this example should not be taken as limiting.

As illustrated, in this example application, network entity 300 comprises layer 3 switch 302, Ethernet bus 306, and layer 4/layer 5-7 switch 304 configured to embody a system according to the invention. The switch 302 is configured to route packets at the layer 3 level while switch 304 is configured to route packets at the layer 4 level, the layer 5 level, or at levels above layer 5 (layers 6-7 in the OSI model).

When a packet is received by network entity 300 over Ethernet bus 306, if layer 3 service is called for, switch 302 assumes responsibility for routing the packet to its desired destination. However, if layer 4, layer 5, or layer 5+service is called for, switch 304 assumes responsibility for routing the packet to its desired destination.

EMBODIMENTS OF THE INVENTION

Referring to FIG. 4A, a first embodiment of the invention comprises a system 400 for handling one or more resource requests. A protocol engine 402 receives a resource request in accordance with a prescribed protocol, and classification engine 404 determines the class of service called for by the request. Analysis engine 408 may analyze the request to determine the sub-class of service called for by the request. Responsive to one or both of these determinations, policy engine 406 may identify and allocate a resource to the request. The engines 402, 404, 406, and 408 may each be implemented as hardware, or a combination of hardware and software.

Figure 4B:
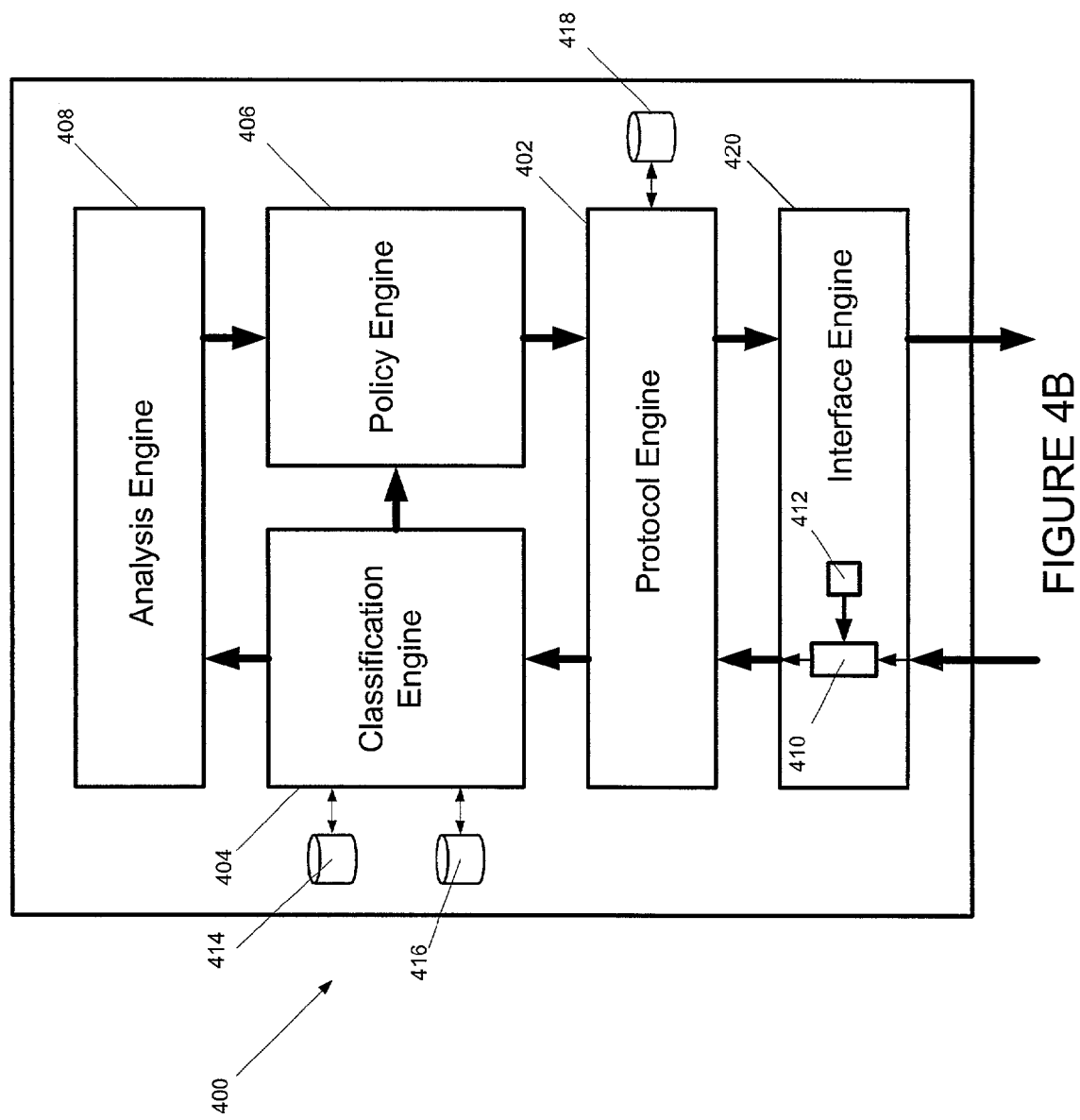
FIG. 4B is a simplified block diagram of a second embodiment of a system according to the invention illustrating a semi store and forward feature of the interface engine, and some of the databases utilized by the classification and protocol engines.

The resource requests may be in the form of packets. Referring to FIG. 4B, in a second embodiment, interface engine 420 includes buffer 410 and error detection logic 412. (The engine 420 may be implemented as hardware, or a combination of hardware and software). In this embodiment, interface engine 420 buffers an incoming packet in buffer 410, and, while the error detection logic 412 checks the packet for errors, the classification engine 404 accesses the buffered packet and derives one or more keys therefrom. If the error detection logic 412 detects an error in the packet, it flushes the packet from the system before significant resources are committed to the packet or the packet is sent to its desired destination. If the error detection logic 412 does not detect an error in the packet, the one or more keys may be used to determine the desired class of service for the packet, including whether a client-server connection already exists for the packet.

In a third embodiment, also referring to FIG. 4B, the classification engine 404 derives first and second keys from the packet, and utilizes the first key to access a first database 414 and determines therefrom if a client-server connection for the packet already exists and utilizes the second key to access a second database 416 and determine therefrom the desired class of service for the packet. If a client-server connection already exists for the packet, the protocol engine 402 may route the packet to the destination called for by the existing connection. If a client-server connection does not already exist for the packet, the analysis engine may analyze the packet to determine the desired sub-class of service called for. Responsive to one or both of the desired class and sub-class of service, the policy engine 406 may establish a client-server connection for the packet, and the protocol engine 402 may then route the packet to the destination called for by the connection.

In a fourth embodiment, a connection is represented by a pointer which points to a control block for the connection and which bears a 1-1 relationship with the connection. In this embodiment, a connection can be a connection between a client and the system, the system and a server, or a client and a server. Similarly, a control block for a connection can be a control block for a connection between a client and the system, the system and a server, or a client and a server. The control block for a connection between a client and the system can be bound to a control block for a connection between the system and a server, or may be unbound to such a control block.

Referring to FIG. 4B, in the fourth embodiment, the control blocks for the connections may be maintained by the protocol engine 402 in third database 418. Referring to FIGS. 5A-5D, examples of control blocks for the various connections which are possible in a TCP/IP network are illustrated.

FIG. 5A illustrates a control block 500 for a connection between a client and the system, where the system is represented by a virtual IP address and port. As illustrated, the control block 500 includes a field 502 containing the IP address of the client, $C_{IP}$, a field 504 containing the port of the client, $C_P$, a field 506 containing the virtual IP address of a server, $V_{IP}$, a field 508 containing the virtual port of a server, $V_P$, a field 510 specifying the protocol of the connection, Pr, and, optionally, other fields 512 containing other information pertinent to the connection.

FIG. 5B illustrates a control block 514 for a connection between the system and a server, where the system is represented by a logical IP address and port, $T_{IP}$ and $T_P$. As illustrated, the control block 514 includes a field 516 containing the logical IP address of the system, $T_{IP}$, a field 518 containing the logical port of the system, $T_P$, a field 520 containing the IP address of the server, $S_{IP}$, a field 522 containing the port of the server, $S_P$, a field 524 specifying the protocol of the connection, Pr, and, optionally, other fields 526 containing other information pertinent to the connection.

FIG. 5C illustrates a control block 528 for a connection between a client and a server. As illustrated, the control block 528 includes a field 530 containing the IP address of the client, $C_{IP}$, a field 532 containing the port of the system, $C_P$, a field 534 containing the IP address of the server, $S_{IP}$, a field 536 containing the port of the server, $S_P$, a field 538 specifying the protocol of the connection, Pr, and, optionally, other fields 540 containing other information pertinent to the connection.

FIG. 5D illustrates a control block 542 for a client-system connection which has been bound to a control block 544 for a system-server connection, where the binding is achieved by a pointer to the system-server control block 544, which pointer is maintained in a field 546 within the client-system control block 542, and a pointer to the client-system control block 542, which pointer is maintained in a field 548 within the system-server control block 544.

In a fifth embodiment, a packet having a packet header is received and this packet header specifies the system as the destination for the packet. The protocol engine 406 modifies the packet header to specify a client or server as the destination of the packet. The third logic may access one or more control blocks for a client-server connection for the packet to determine this client or server. The modified packet is then provided to the interface engine 420 for transmitting over the network.

Figure 6A:
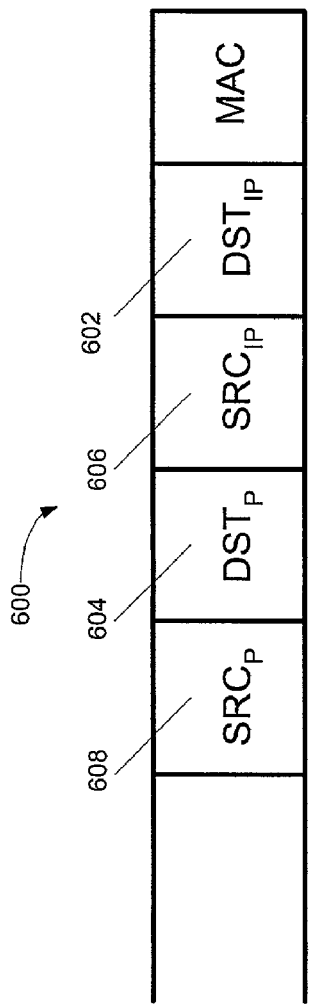
FIG. 6A is a simplified view of a packet header.
Figure 6B:
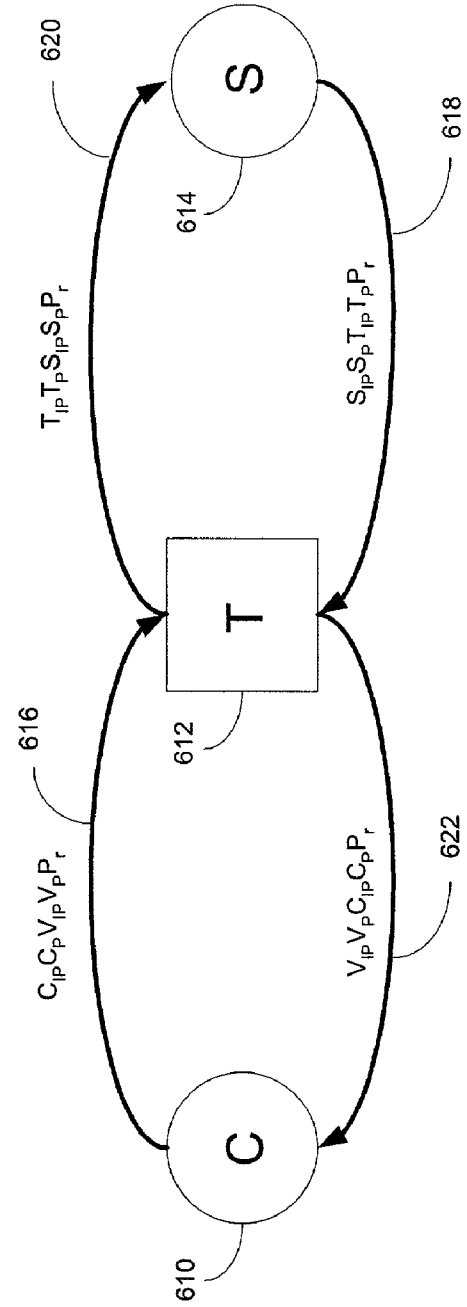
FIG. 6B is a diagram illustrating the IP and port addressing of packets exchanged between a client and server and which are forwarded by a system configured according to the invention.

For example, referring to FIG. 6A, a packet header 600 for a TCP/IP packet is illustrated. The source IP address and source port fields of the packet header, identified respectively with numerals 606 and 608, could specify either a client or server as the source of the packet, but the destination IP address and destination port fields, identified respectively with numerals 602 and 604, specify the system as the destination of the packet. Referring to FIG. 6B, the system, which is identified with numeral 612, is assumed to be an intermediate stopping point for the packet, and the ultimate destination of the packet, if it originated with client 610, is assumed to be server 614; similarly, the ultimate destination of the packet, if it originated with server 614, is assumed to be client 610.

If a packet is received by the system 612, where the packet header is addressed as indicated by branch 616, i.e., with the client as the source and a virtual address of the system as the destination, the protocol engine 402 accesses one or more control blocks relating to the client-server connection, e.g., a control block such as control block 528 illustrated in FIG. 5C or bound control blocks 542 and 544 such as illustrated in FIG. 5D, in order to determine that the server 614 is the ultimate destination of the packet. Accordingly, the protocol engine 402 would be further configured to modify the packet header to specify the system 612 as the source of the packet and the server 614 as the destination of the packet, as indicated by branch 620 in FIG. 6B.

If a packet is received by the system 612, where the packet header is addressed as indicated by branch 618, i.e., with the server as the source and a virtual address of the system as the destination, the protocol engine 402 would again be configured to access one or more control blocks relating to the client-server connection, e.g., a control block such as control block 528 illustrated in FIG. 5C or bound control blocks 542 and 544 such as illustrated in FIG. 5D, in order to determine that the client 610 is the ultimate destination of the packet. Accordingly, the protocol engine 402 modifies the packet header to specify the system 612 as the source of the packet and the client 610 as the destination of the packet, as indicated by branch 622 in FIG. 6B.

In a sixth embodiment, the system determines the category of service assigned to a packet, and, for a first category of service, the system functions as a proxy for a server in relation to a packet originating from a client, and, for a second category of service, the system does not function as a proxy for a server in relation to the packet. Thus, if the first category of service is assigned to the packet, the system might buffer client-originating packets on behalf of the server and/or acknowledge receipt of the packets on behalf of the server, such that the presence of the system is transparent to the client.

In a seventh embodiment, for a selected category of service, the system buffers packets received from clients for assembly into larger data groupings, but does not do so for packets received from servers. Avoiding the buffering of packets received from servers for the selected category of service might be desirable if, for example, the volume of traffic sent from servers to clients exceeds that sent from clients to servers, and buffering of such traffic would place an unacceptable burden on the system.

Referring to FIG. 7A, in one example of this embodiment, an assembly buffer 700 is provided within analysis engine 408 for the buffering of data packets. When a packet is received that is assigned a category of service that calls for buffering, the packet is buffered at the appropriate location within buffer 700. When a suitable number of packets have been buffered so that a larger data grouping of the appropriate size has been assembled, the larger data grouping may then be forwarded to its desired destination.

In an eighth embodiment, for a selected category of service, the system acknowledges packets received from clients but not from servers. Again, this embodiment might be suitable in an application where the volume of traffic sent from servers to clients exceeds that sent from clients to servers.

In one example of this embodiment, for the selected category of service, the system places packets received from clients in an assembly buffer, acknowledges receipt of such packets, and uses the sequence space to indicate left-wise contiguity in the assembly buffer. Therefore, the next available sequence number in sequence space will be updated to reflect the length of the packet only when the assembly buffer with the packet inserted is left-wise contiguous.

Figure 7B:
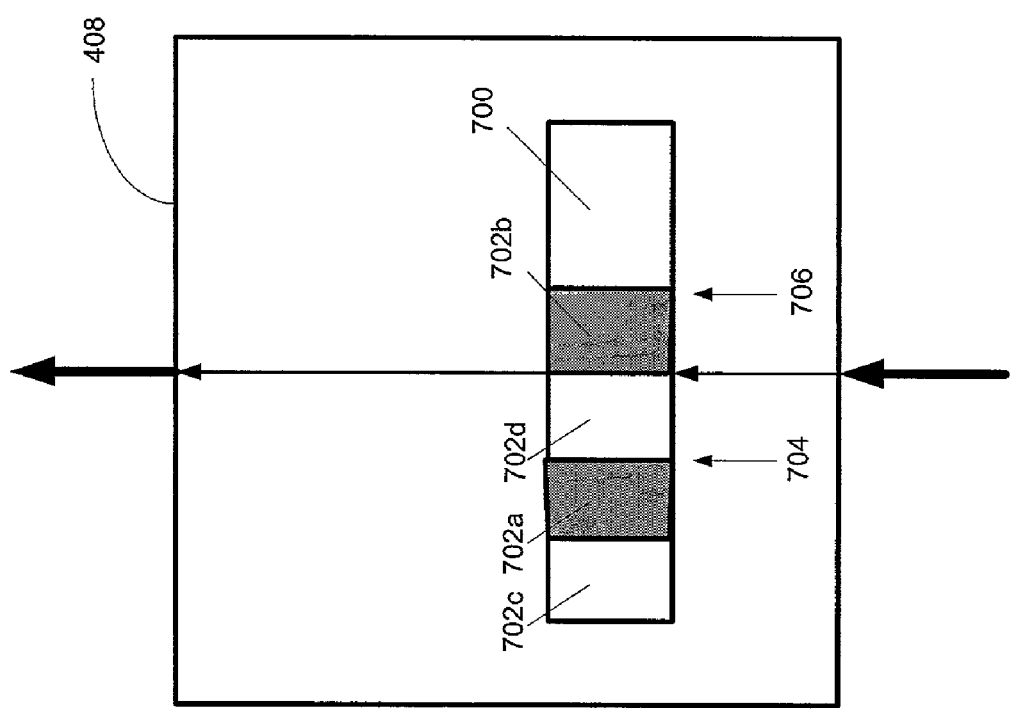
FIG. 7B is a simplified block diagram showing a re-assembly buffer within the EMU where left-wise contiguity of data in the buffer is not present.

Thus, referring to FIG. 7B, packets 702a and 702b have been placed in assembly buffer 700, but the next available sequence number in sequence space is not updated right away to reflect the length of such packets since gaps 702c and 702d are still present in the assembly buffer, and the assembly buffer is not left-wise contiguous beginning at the end of any packet in the buffer, i.e., beginning at the locations identified with numerals 704 and 706. Instead, the updating of the next available sequence number to reflect the length of such packets is deferred until additional packets arrive to fill the gaps 702c and 702d.

Figure 7C:
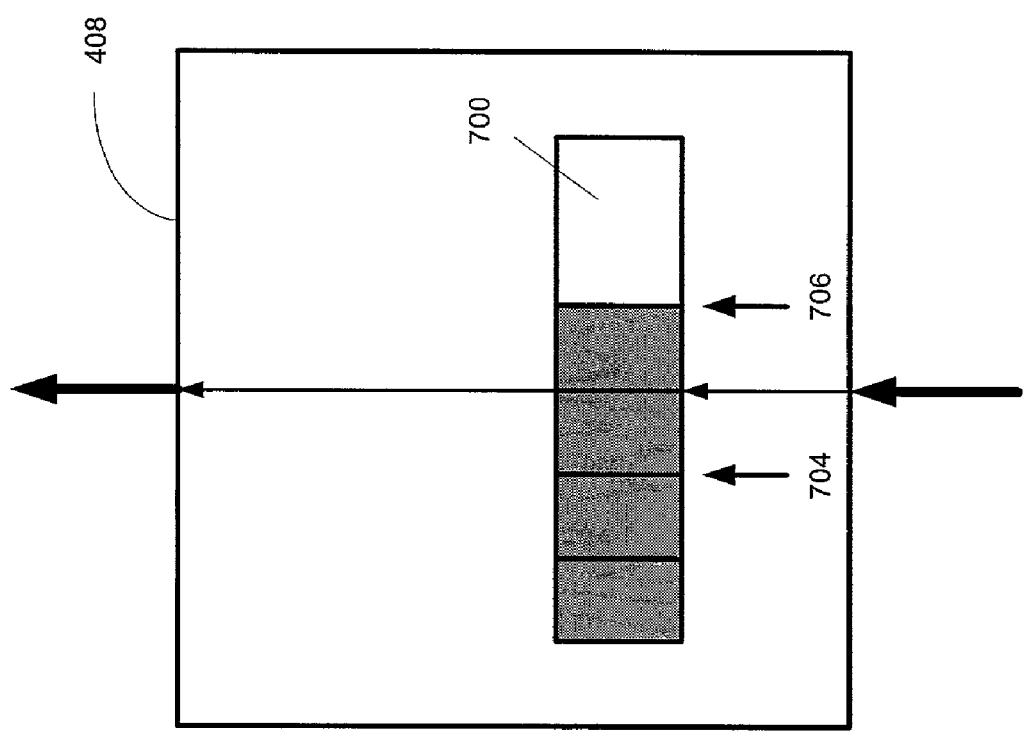
FIG. 7C is a simplified block diagram showing a re-assembly buffer within the EMU where left-wise contiguity of data in the buffer is present.

When such packets arrive, the situation may be represented as illustrated in FIG. 7C. There, since the buffer is now left-wise contiguous beginning with location 706, the next available sequence number may be updated to reflect the length of all four packets at the same time. (If gap 702c were to be filled with a packet prior to gap 702d, in accordance with the left-wise contiguity rule, the next available sequence number might first be updated to reflect the length of the two packets to the left of location 704, followed by the updating of the sequence number to reflect the length of the two packets between locations 704 and 706).

In a ninth embodiment, a connection, when created, is assigned a generation count, and a server is bound to the connection only if the generation count assigned to the entry is equal to an expected value.

In one example, the generation count is stored in a control block for the connection when the connection is first created. The system then compares the stored value with an expected value at the time that a server has been allocated to the connection and is slated to be bound to it. If the values match, the binding is allowed to occur, but if the values do not match, the binding is not allowed to occur.

Thus, referring to FIG. 5D, when control block 542 is first created, a generation count might be assigned to the control block and stored within area 512 within the control block. Later, when a server is slated to be bound to the connection, the control block 544 for the server side of the connection is only bound to control block 542 if the stored generation count equals an expected value.

This feature is likely to be most useful when the binding decision is deferred in relation to the inception of the creation of the connection. The reason for this is that there is a risk in this scenario of improperly binding a scenario to a stale, inactive connection. This risk is absent in the case where the binding decision is made immediately upon the inception of the creation of the connection.

In a tenth embodiment, for a first category of service, the system allocates a server to the packet responsive to the content of a data grouping encapsulating the packet, while, for a second category of service, the system allocates a server to the packet responsive to information other than the content of a data grouping encapsulating the packet.

Figure 7D:
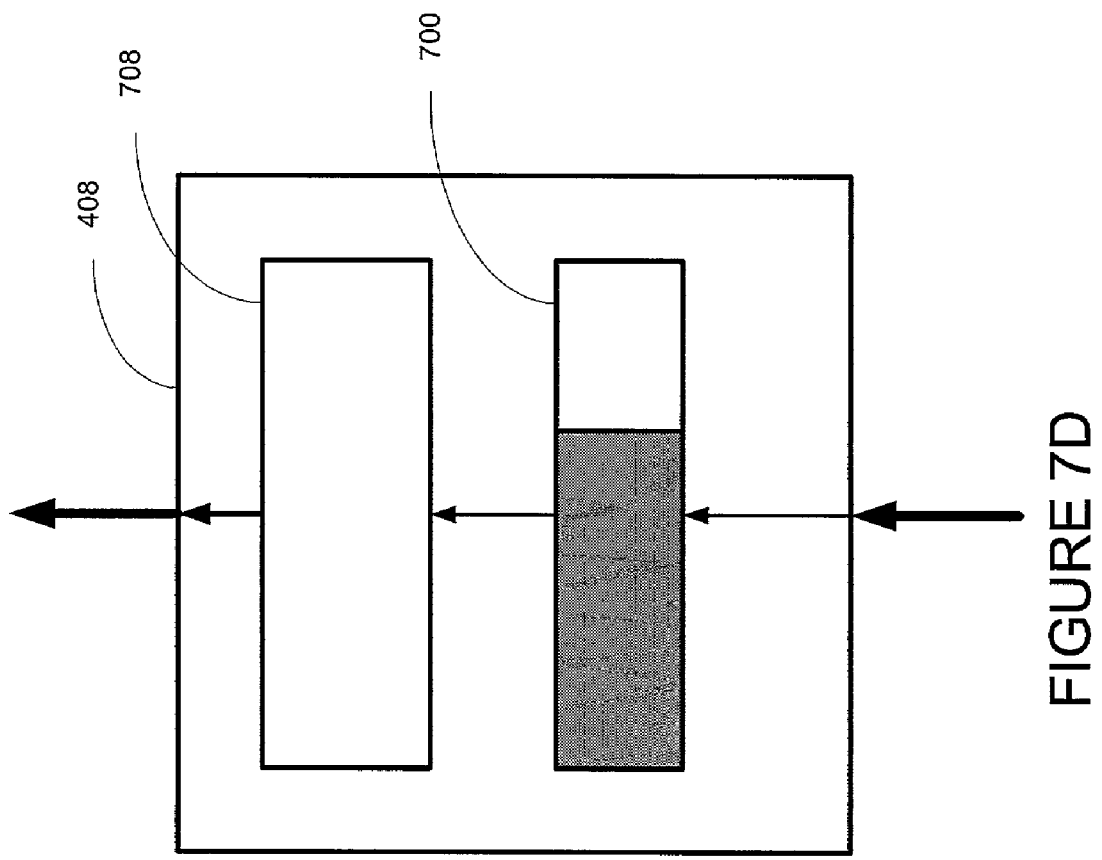
FIG. 7D is a simplified block diagram showing a re-assembly buffer within the EMU and a content analyzer within the analysis engine.

In one example, referring to FIG. 7D, packets are buffered in assembly buffer 700 within analysis engine 408, and when a data grouping of sufficient size has been assembled in buffer 700, the buffer contents are forwarded to content analyzer 708, also within analysis engine 408. Content analyzer 708 analyzes the content of the data grouping, and responsive thereto, provides information to policy engine 406 indicating a desired sub-class of service, and possibly other information relating to content, such as cookie or session information. Based on this information, the policy engine 408 allocates a server to the data grouping.

In an eleventh embodiment, for a first category of service, the system allocates a server to the packet on a deferred basis, i.e., after the analysis engine 408 has analyzed the content of a data grouping encapsulating the packet to determine a desired sub-class of service, and possibly other information, while, for a second category of service, the system allocates a server to the packet upon a determination by the classification engine 404 of the desired class of service.

In one example, referring to FIG. 7D, for the first category of service, allocation of a server is deferred until a data grouping encapsulating the packet has been buffered in assembly buffer 700, and the contents of the data grouping analyzed by content analyzer 708. However, for the second category of service, allocation of a server is performed upon a determination by classification engine 404 of the desired class of service.

A twelfth embodiment comprises any combination of the foregoing embodiments.

An implementation of a system according to the invention will now be described. Many other implementations are possible, so this description should not be taken as limiting.

Figure 8:
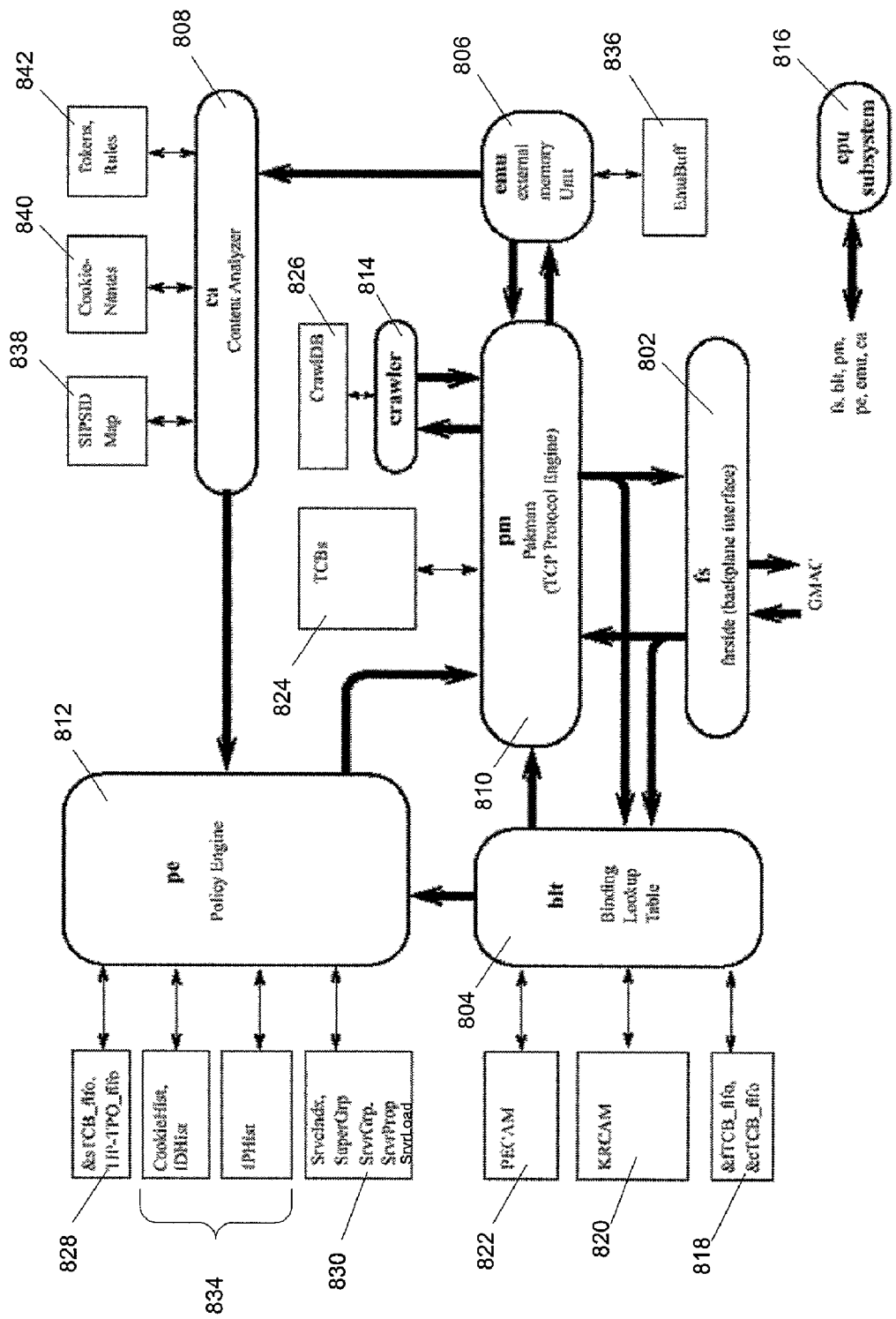
FIG. 8 is a block diagram of one implementation of a system according to the invention.

In this implementation, referring to FIG. 8, the packets are TCP/IP packets. In this implementation, the system comprises interface 802, classification engine 804 (also referred to in the figure as a binding lookup table (BLT)), external memory unit (EMU) 806, content analyzer (CA) 808, TCP protocol engine (PM) 810, crawler 814, and policy engine (PE) 812. A CPU 816 may also be provided for various control and implementation functions. In this implementation, the interface 802, BLT 804, EMU 806, CA 808, PM 810, PE 812, and crawler 814 may each be implemented in hardware as, for example, one or more finite state machines.

The interface 802 is configured to function as an interface to an external network (through an Ethernet MAC layer connection or the like) for the receipt or transmission of packets.

The BLT 804 is configured to determine a desired class of service associated with an incoming packet, including determining whether a client-server connection already exists for the packet.

The PM 810 is configured to provide TCPIP stack support to packets. (A detailed explanation of aspects of the function and operation of PM 810 is provided in U.S. patent application Ser. No. 10/073,538, entitled "Method And System For Maintaining Temporal Consistency Of Resources And Data In A Multiple-Processor Packet Switch"; U.S. patent application Ser. No. 10/073,638, entitled "Method And System For Managing Traffic In A Packet Network Environment"; U.S. patent application Ser. No. 10/073,484, entitled "Method And System For Translating Packet Sizes In A Network," previously incorporated herein by reference).

The PE 812 is configured to allocate servers to clients in response to the desired class of service as determined by BLT 804 or the desired sub-class of service, and possibly other information, as determined by CA 808. (A detailed description of aspects of the function and operation of PE 812 is provided in U.S. patent application Ser. No. 10/073,483, entitled "Method Of And System For Allocating Resources To Resource Requests Based On Application Of Persistence Policies"; U.S. patent application Ser. No. 10/074,462, entitled "Method Of And System For Allocating Resources To Resource Requests," previously incorporated herein by reference.)

The crawler 814 is configured to identify timeouts and initiate connection deletion is response to a timeout.

The EMU 806 is configured to buffer packets for layer 5 connections into larger data groupings.

The CA 808 is configured to analyze the content of the data groupings from EMU 806 and determine the desired subclass of service, and possibly other information such as cookie and session information, in response thereto.

Figure 9:
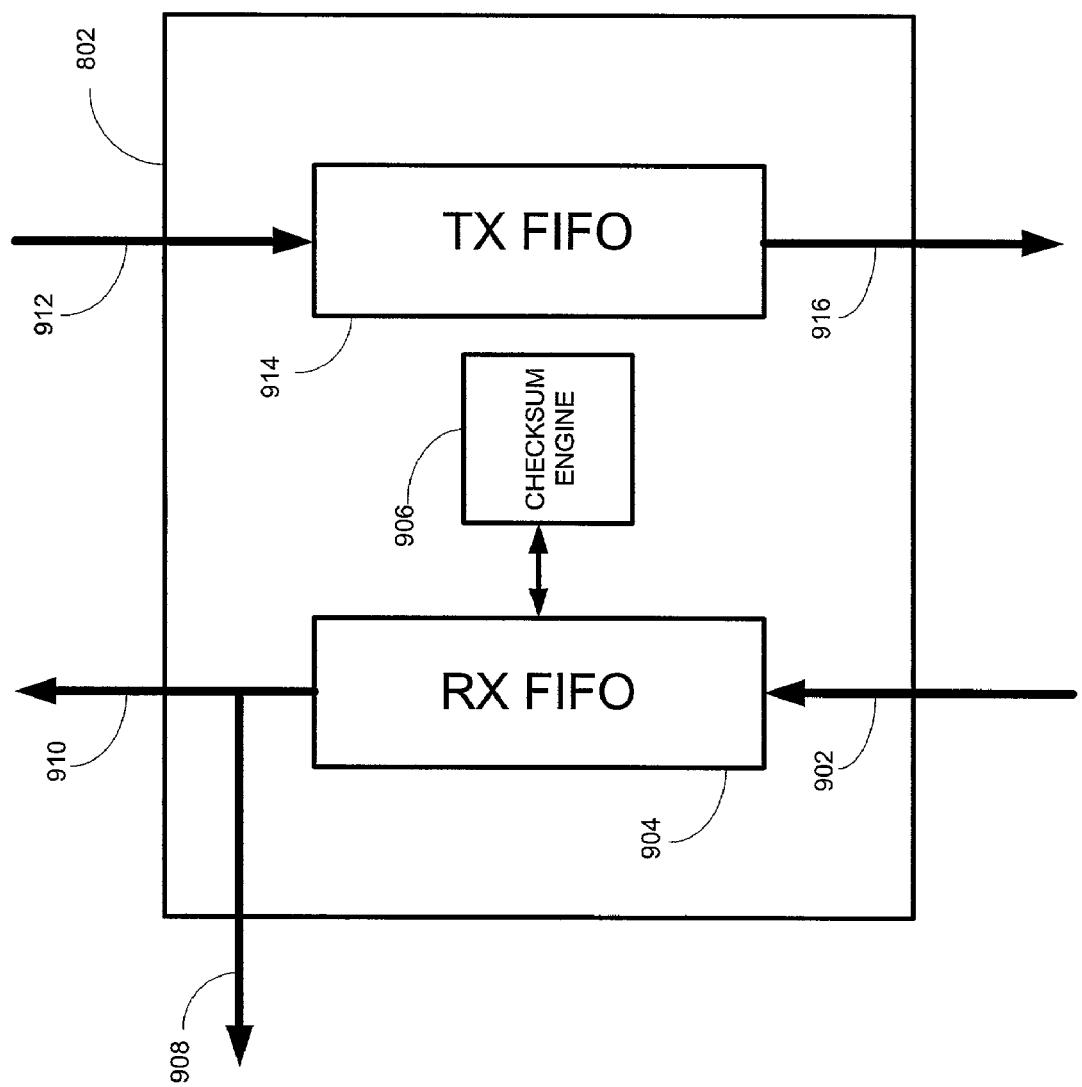
FIG. 9 is a simplified block diagram of the interface engine of the implementation of FIG. 8 illustrating a receive FIFO, a transmit FIFO, and a checksum engine.

Referring to FIG. 9, the interface 802 comprises Rx FIFO buffer 904, checksum engine 906, and Tx FIFO buffer 914. Incoming packets are received over bus 902, and stored in Rx FIFO buffer 904. Checksum engine 906 checks a buffered packet for errors. While the checksum engine 906 is checking the packet for checksum errors, the BLT 804 accesses the packet and derives two keys therefrom. The first key is derived from a 5-tuple consisting of the following pieces of information obtained from the packet header: source IP address, destination IP address, source port, destination port, and protocol.

The second key is derived from a 3-tuple consisting of the following pieces of information obtained from the packet header: destination IP address, destination port, and protocol.

If the checksum engine 906 detects a checksum error in the packet, the packet is flushed from the system before a server has been allocated to the packet or before the packet is sent to its desired destination.

Assuming a checksum error is not detected, the packet is provided to PM 810 over bus 910. Moreover, BLT 804 utilizes the first key to access a first content addressable memory (CAM) and determines therefrom whether a client-server connection has been established for the packet. The entry in the CAM corresponding to the first key is analyzed to determine if it corresponds to a client-server connection, or is the null value, indicating that a client-server connection for the packet has not yet been established. If a null value is returned, indicating that a client-server for the connection has not been established, the second key is used by BLT 804 to access a second CAM, and derive therefrom the desired class of service for the connection to be established for the packet.

The BLT 804 maintains three databases, identified respectively with numerals 818, 820, and 822. The first, identified with numeral 818, comprises two FIFO buffers, one for the storage of pointers to control blocks for active layer 4 (also referred to as flow) connections, and one for the storage of pointers to control blocks for active client-side layer 5 connections. The former is referred to in the figure as &ffCB_fifo, while the latter is referred to in the figure as &cTCB_fifo. Each of these two FIFOs is initialized during system configuration with a finite set of pointers.

Each of the pointers in the &ffCB_fifo, when allocated, uniquely represents an active layer 4 connection, and each of the pointers in the &cTCB_fifo, when allocated, uniquely represents an active client-side layer 5 connection. When a layer 4 connection is first created, one of the pointers in the &ffCB_fifo is taken from the FIFO and allocated to the connection, and when the connection is terminated, the pointer is placed back in the FIFO. Similarly, when a layer 5 connection is first created, one of the pointers in the &cTCB_fifo is taken from the FIFO and allocated to the connection, and when the connection is terminated, the pointer is placed back in the FIFO.

A generation count is also stored with each pointer, and when a pointer is recycled, i.e., placed back in its respective FIFO, the generation count is incremented, and stored back in the pointer. This generation count is examined before a server is bound to the connection represented by the pointer to ensure that it equals an expected value.

In one example, the TCB pointers have a tagged format in which a tag is associated with a value. In one specific example, the TCB pointers are 24 bit unsigned integers having the format shown in FIG. 10A. As illustrated, according to this format, the lower 22 bits of the pointer, identified with numeral 1002, represents a pointer to a layer 4 (flow) TCP control block (TCB) (in the case of a &fTCB pointers) or a client-side layer 5 TCB (in the case of a &cTCB pointer). (A third pointer, &sTCB, relates to a server-side layer 5 connection, and is maintained by PE 812 rather than BLT 804. It will be discussed later in relation to PE 812). Bit 22, identified in the figure with numeral 1004, indicates whether the pointer is a flow or server-side layer 5 pointer. Bit 23, identified in the figure with numeral 1006, indicates whether the pointer is a BLT-managed pointer (flow or client-side layer 5 pointer) or a PE-managed pointer (server-side layer 5 pointer). The following table identifies the possible settings of these two bits and their meaning:

| Bit 23 | Bit 22 | Meaning |
| --- | --- | --- |
| 1 | 1 | Flow (layer 4) pointer |
| 1 | 0 | Client-side layer 5 pointer |
| 0 | 1 | Server-side layer 5 pointer |
| 0 | 0 | ILLEGAL |

In this example, the lower 22 bit address field, identified with numeral 1002, can take on any value between 22'h0 and 22'hFFFFB. The remaining four values, 22'hFFFFC-22'hFFFFF, are reserved, and are used to implement various commands associated with a connection such as Reset (RST), Drop (DRP), Ignore (IGN), and Forward (FWD), as indicated by the table of FIG. 10B. The Reset command causes a reset packet to be sent. In the case where the client is seeking to establish or has established a TCP connection, this causes the client to restart the connection establishment phase. The Drop and Ignore commands cause the packet to be dropped. The Forward command causes the packet to be forwarded, and is invoked when the system is functioning as a default router or gateway. These commands are sent to PM 810 for execution thereof.

The second database maintained by BLT 804, identified in the figure with numeral 820, comprises a content addressable memory (CAM) known as the key reduction CAM (KRCAM). When a connection is first created, whether layer 4, client-side layer 5, or server side layer 5, a TCB pointer representing the connection is allocated and stored in the KRCAM. As described previously, a pointer may be a flow pointer, a client-side layer 5 pointer, or a server-side layer 5 pointer, having the format illustrated in FIG. 10A. Each pointer stored in the KRCAM is accessible through a key derived from a packet.

An access to the KRCAM can result in either a pointer or the null value. If the access results in the null value, it indicates that a connection has not been established for the packet from which the 5-tuple key has been derived. If the access results in a pointer, it indicates that a connection has been established. (As will be seen, additional information about the connection is available through one or more TCP control blocks accessible through the pointer).

The third database maintained by BLT 804, identified in the figure with numeral 822, comprises a CAM known as the service index CAM (PECAM). This CAM maintains information regarding which class of service is to be provided to a packet. Entries in the CAM indicative of the desired class of service are accessible through a key derived from a packet. The key is derived from a 3-tuple comprising the destination IP address, the destination port, and the protocol. The PECAM is initialized at system configuration time to indicate the classes of service which are to be provided to packets.

Figure 11:
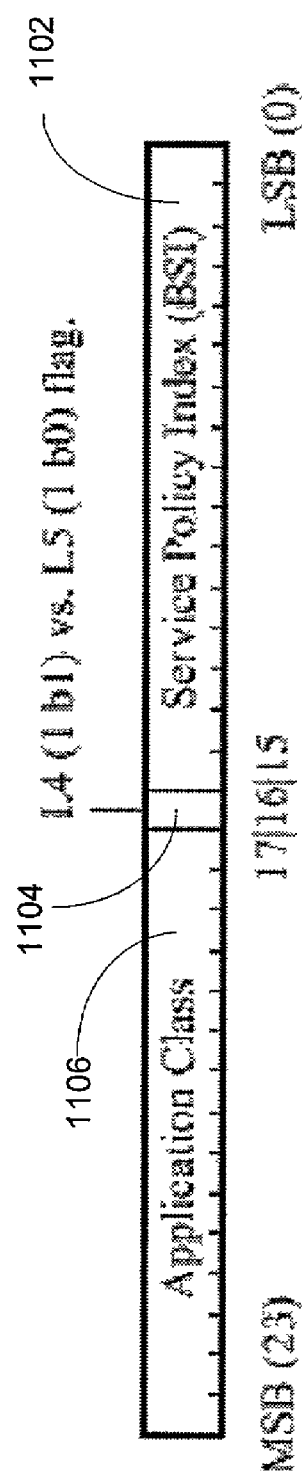
FIG. 11 illustrates the format of a PECAM entry in the implementation of FIG. 8.

In one example, the format of a PECAM entry is as illustrated in FIG. 11. The lower 16 bits, identified with numeral 1102, represents a Service Policy Index, and is representative of the class of service which is desired for the packet. The settings of this field are application dependent, but some examples of possible services which may be indicated by this field are whether or not the connection is to be SSL-terminated or not, whether the quality of service (QOS) is to be high or low, if the desired service is a layer 5+ service, the specific layer beyond layer 5 which is involved, the Internet service provider (ISP) to be associated with the connection, e.g., AOL, AKAMAI, YAHOO, CNN, and whether the connection or ISP is to be associated with a high or low level of priority.

Bit 16, identified with numeral 1104, indicates whether the service is a layer 4 or layer 5 service.

The upper 7 bits, identified with numeral 1106, indicate an application class associated the connection. Again, the settings in this field are application dependent, but some examples of settings which are possible for this field, include whether the connection relates to .gif files, text files, etc., or whether the connection is SSL-terminated.

The PM 810 maintains a database 824 of TCP control blocks (TCBs) for connections which have been established. A TCB for a connection is first initialized when BLT 804 determines that a connection for a packet has not been established. (This is indicated to the BLT when it accesses the KRCAM 820 using a key derived from the 5—tuple in turn derived from the packet, and receives a null value in response.) In parallel, the BLT 804 accesses the PECAM 822 to determine the desired class of service for the packet. Then, it access either the &fTCB_fifo or &cTCB_fifo (collectively identified with numeral 818 in FIG. 8) to allocate a pointer for the connection. It then sends PM 810 a message containing the information needed to establish the connection.

Alternatively, if a connection for the packet has already been established (indicated to the BLT 804 when it accesses the KRCAM 820 and receives a TCB pointer in response), the BLT 804 avoids accessing the PECAM 822 or the FIFOs 822, since the desired class of service for the packet was already established, and a TCB pointer for the connection already allocated, when the connection was first established. However, the BLT 804 still sends the PM 810 a message indicating that a connection for the packet has already been established.

Figure 12A:
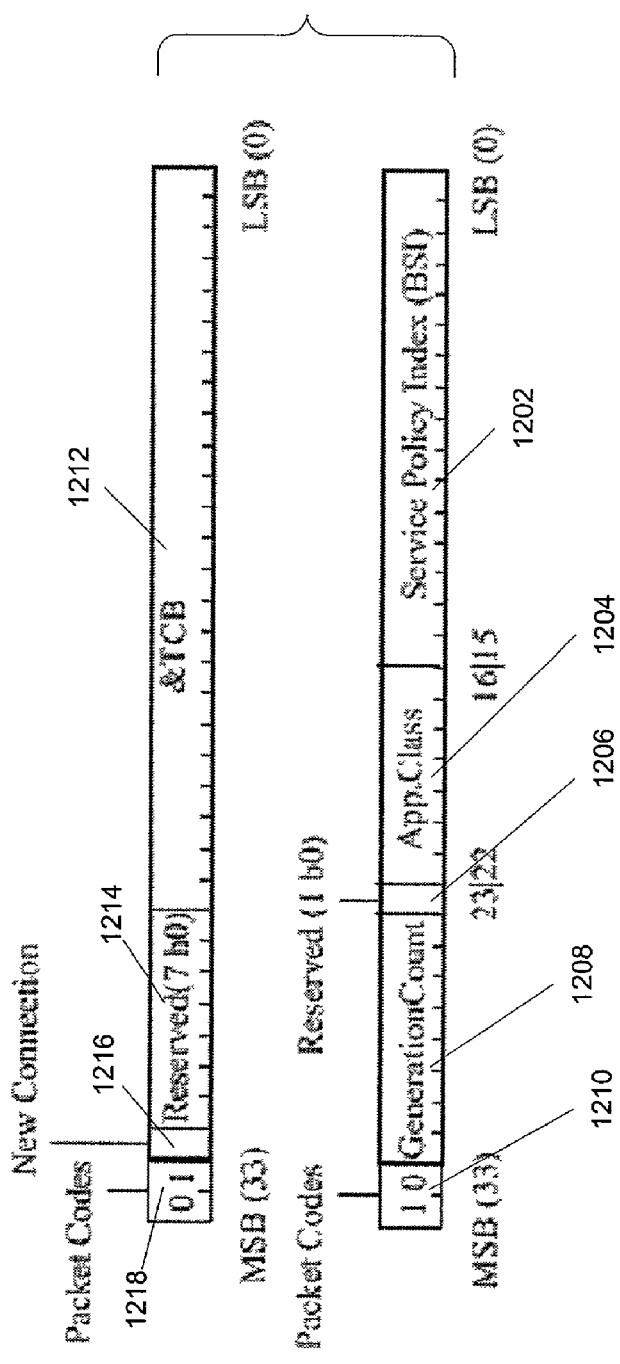
FIG. 12A illustrates the format of a new service-related communication between the classification and protocol engines in the implementation of FIG. 8.

In one example, the message to the PM 810 is a 68-bit value having the format illustrated in FIG. 12A. As illustrated, the lower 16 bits, identified with numeral 1202, is the Service Policy Index taken from the PECAM entry for the connection. The next 7 bits, identified with numeral 1204, is the Application Class also taken from the PECAM entry for the connection. The next bit, identified with numeral 1206, is reserved. The next 8 bits, identified with numeral 1208, is a generation count assigned when the pointer for the connection was taken from the corresponding FIFO. It indicates the number of times the pointer has been recycled. The next two bits, identified with numeral 1210, merely indicate that the foregoing 32 bits of information represents the lower 32 bits of a 64 bit message.

Figure 10A:
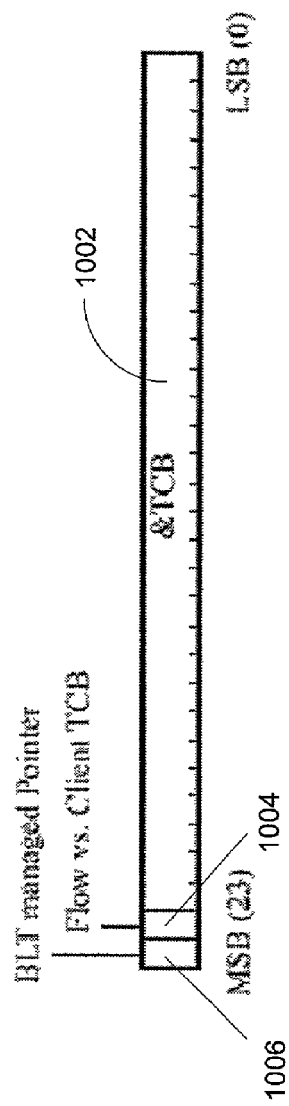
FIG. 10A illustrates the format of a &TCB pointer in the implementation of FIG. 8.

The next 24 bits, identified with numeral 1212, are a TCB pointer allocated to the connection (or a RST/DRP/IGN/FWD command for the connection) having the format illustrated in FIG. 10A. The next 7 bits, identified with numeral 1214, are reserved. The next bit, identified with numeral 1216, indicates to PM 810 whether the connection is a new one, or was previously established. The next 2 bits, identified with numeral 1218, indicate that the 32 bits comprising fields 1212, 1214, and 1216 represent the upper 32 bits of the 64 bit message.

FIG. 13A is a conceptual diagram of a client TCB, FIG. 13B is a conceptual diagram of a server TCB, and FIG. 13C is a conceptual diagram of a flow TCB. In one example, a flow TCB represents a layer 4 connection and is simply a client TCB and server TCB combined together as one 128 byte control block. A layer 5 connection on the other hand is represented by a 64 byte client TCB bound to a 64 byte server TCB through pointers.

Figure 14A:
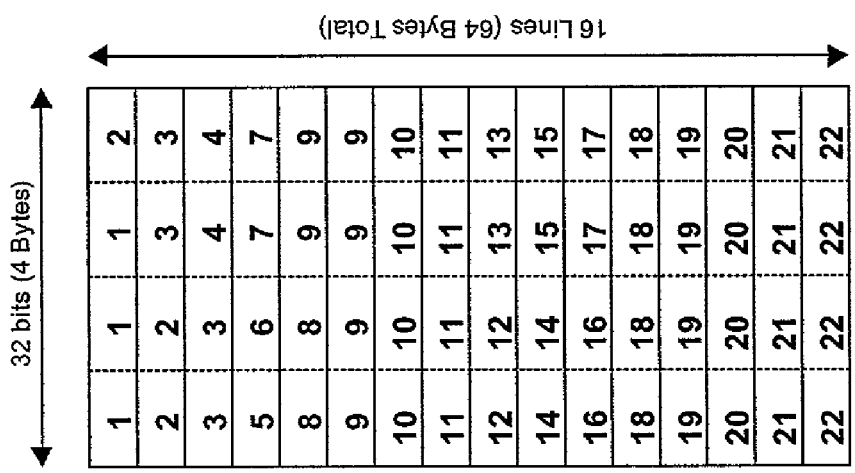
FIG. 14A illustrates the format of a client-side TCB in the implementation of FIG. 8.

Referring to FIG. 14A, one example of a client TCB is illustrated. In this particular example, the TCB is a 64 byte block having the fields indicated in FIG. 14A, with the fields having the meanings ascribed to them in FIGS. 14B-14C.

In particular, the ClientServerPointer, identified with numeral 2, is a pointer to a server TCB (in the case of a layer 5 connection), the ClientIP field, identified with numeral 12, specifies the IP address of the client, and the ClientPort field, identified with numeral 14, specifies the port of the client. The ClientState field, identified with numeral 4, specifies the state of the client-side connection (assuming a state-based protocol such as TCP is used). The VipIP field, identified with numeral 11, specifies the virtual IP address of the server, and the VipPort field, identified with numeral 15, specifies the virtual port of the server. (As previously explained in relation to FIG. 6B, incoming packets specify virtual rather than physical address information for the server, and the system translates these virtual addresses into system addresses).

The ClientInitSequenceNumber field, identified with numeral 19, initially records the initial sequence number for the client-side sequence space and subsequently records the next sequence number from the system to the client, and the ClientProxySequenceNumber field, identified with numeral 18, specifies the sequence number of the end of the last data segment sent to the server in the client-side sequence space. The ClientLastSequenceNumber field, identified with numeral 20, specifies the highest acknowledgment sequence number sent to the client. The ClientWindow field, identified with numeral 12, is the size of the client side window, and is a useful mechanism for throttling or otherwise controlling the rate at which packets are being sent from the client. These fields, as well as many of the other fields illustrated in FIGS. 14B-14C, are standard items of information required by the TCP/IP protocol, and need not be discussed further.

Figure 15A:
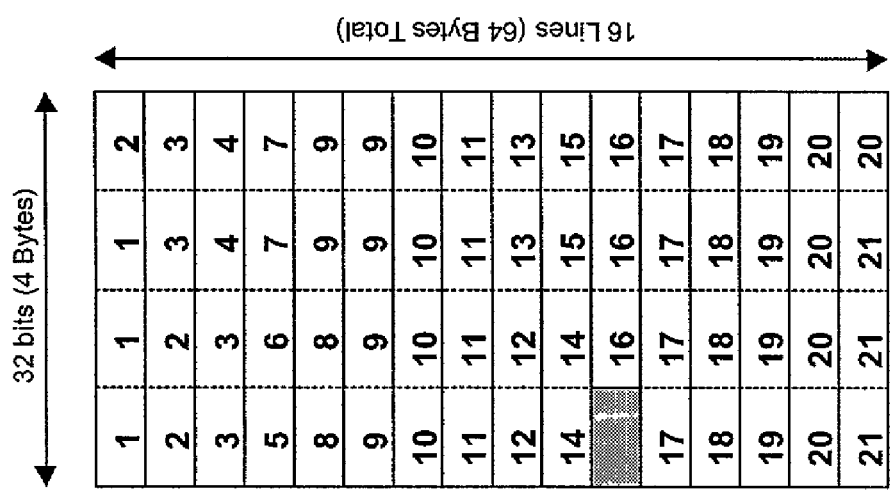
FIG. 15A illustrates the format of a server-side TCB in the implementation of FIG. 8.

Referring to FIG. 15A, one example of a server TCB is illustrated. In this particular example, the TCB is a 64 byte block having the fields indicated in FIG. 15A, with the fields having the meanings ascribed to them in FIGS. 15B-15C.

In particular, the ServerClientPointer, identified with numeral 2, is a pointer to a client TCB (in the case of a layer 5 connection), the ServerIP field, identified with numeral 10, specifies the IP address of the server, and the ServerPort field, identified with numeral 14, specifies the port of the server. The ServerState field, identified with numeral 4, specifies the state of the server-side connection (assuming a state-based protocol such as TCP is used). The TalismanIP field, identified with numeral 11, specifies the logical IP address of the system, and the TalismanPort field, identified with numeral 15, specifies the logical port of the system. (As previously explained in relation to FIG. 6B, packets forwarded by the system specify or are modified to specify a logical address as the source of the packet.).

The TalismanInitSequenceNumber field, identified with numeral 18, initially records the initial sequence number for the system-side sequence space, and subsequently records the highest acknowledgement number from the server. The ServerLastSequenceNumber field, identified with numeral 19, records the highest acknowledgement number sent to the server. These fields, as well as many of the other fields illustrated in FIGS. 15B-15C, are standard items of information required by the TCP/IP protocol, and need not be discussed further.

Turning back to FIG. 8, the crawler 814 maintains a crawler database 826, referred to in the figure as CrawlDB. An entry is made in this database when a connection is first created (and a TCB pointer for the connection first allocated), and is updated whenever the TCB pointer for the connection is accessed. Each entry bears a 1-1 relationship with a TCB pointer, and comprises a time-stamp and a timeout period. The time-stamp is the time the corresponding TCB pointer was last accessed. The timeout period is the timeout period that was determined when the TCB pointer was last accessed based on the state of the connection at the time. The entry is created when the TCB pointer for the connection is first created, and is updated whenever the TCB pointer is accessed. The timestamp placed in the entry is obtained from a timer indicative of the current time. The timeout period may bear a relationship to the corresponding TCP timeout period, but is generally different than that value to account for particular characteristics of the system.

Crawler 814 periodically walks through the CrawlIDB database 826, and compares the current time with the timestamp in each entry added to the timeout period specified in the entry. If an entry has timed out, i.e., the current time is greater than the timestamp in the entry added to the timeout period in the entry, the crawler 814 marks the entry, indicating that the PM 810 should take some action in relation to the corresponding connection. Some of the actions that may be taken for an entry are as follows:

| Action | Description |
|---|---|
| Deletion | Release all resources, i.e., TCB pointers, TCB blocks, CAM entries, servers, associated with connection |
| Retransmission | Data associated with layer 5 connection to be retransmitted. |
| Reset | The client or server for the connection to receive a TCP reset. |

Regarding the first specified action, Deletion, the TCB pointers for the connection, when released, are placed back in their corresponding FIFOs.

The PE 812 maintains two FIFO buffers, &sTCB_fifo and TIP-TPO_fifo, identified with numeral 828. The &sTCB_fifo is a buffer of TCB pointers which PE 812 maintains for layer 5 server-side connections. When a layer 5 connection is first created, BLT 804 allocates a pointer from the &cTCB_fifo for the client-side portion of the connection. PM 810 initializes a TCB for this portion of the connection. (See FIGS. 14A-14C). Later, after the content of a data grouping containing the layer 5 is analyzed by CA 808, the PE 812 allocates a server to the connection. As part of this process, PE 812 allocates a pointer from the &sTCB_fifo. PM 810 creates a TCB for the server-side portion of the connection which is pointed to by the pointer allocated from the &sTCB_fifo. (See FIGS. 15A-15C). PM 810 then binds the TCBs for the client-side and server-side portions of the connection together. Note that the &sTCB_fifo is not utilized for the layer 4 connections, since all the information for the client-side and server-side portions of the connection are maintained in a single TCB. (See FIG. 13C). In one example, the format of a &sTCB pointer is as illustrated in FIG. 10A.

The TIP-TPO_fifo maintains a pool of logical IP addresses and ports which can be used to refer to the system. When a connection is first created, a pair of these IP addresses, ports is allocated from the FIFO and written into the corresponding TCB. For a layer 4 or 5 connection, this information is written into the fields 11 and 15 indicated in FIG. 14B. Referring to FIG. 6B, this information is written by PM 810 into the source fields of packet headers of packets are passing through the system on their way to a server (branch 620 in FIG. 6B). It is also appears in the destination fields of packet headers of packets originating from a server and destined to pass through the system on their way to a client (branch 618 in FIG. 6B).

Numeral 830 in FIG. 8 refers to five separate databases or tables, SrvcIndx, SuperGrp, SrvrGrp, SrvrLoad and SrvrProp. The SrvrIndx database is a table of entries which associates classes of service with server supergroups and policies. It is initialized at system configuration time. The SuperGrp database is a table of entries which associates server supergroups with groups of servers. The SrvrGrp database is a table of entries which associates server groups with individual servers. These tables are initialized at system configuration time as well. The SrvrLoad database is a database of entries which each indicate the current loading on a server. It is initialized at system configuration time, but then updated over time as the loading on the servers changes. The SrvrProp database is a table of entries which each indicate the physical properties for a server. It is initialized at system configuration time.

Figure 12B:
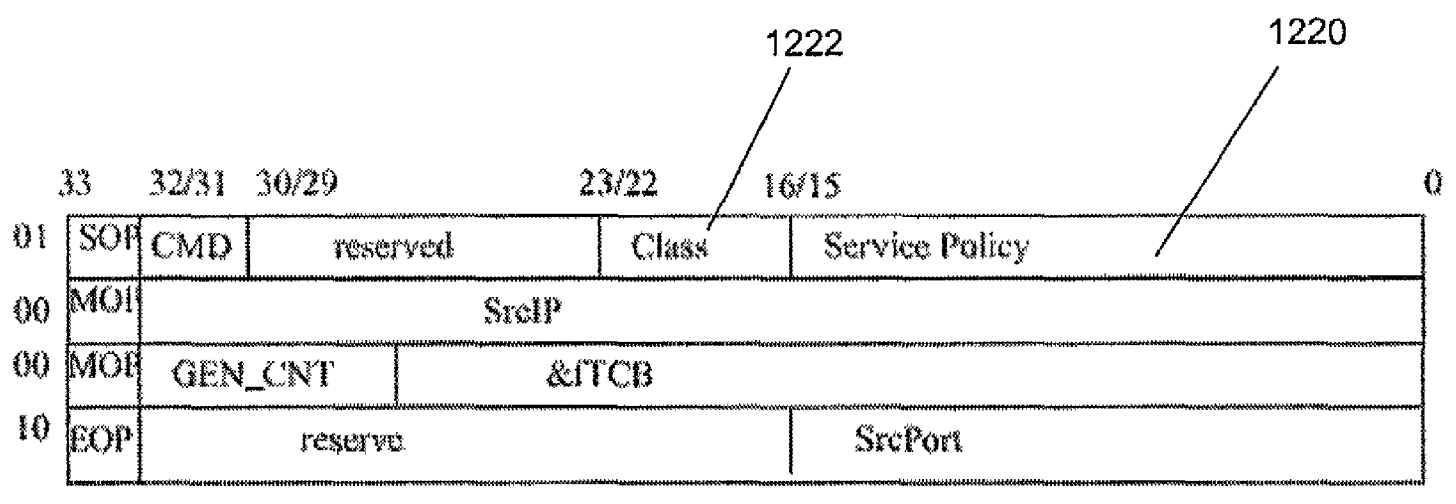

In one example, the format of an entry in the SrvcIndx table is illustrated in FIG. 16A. For a layer 4 service request from BLT 804 (illustrated in FIG. 12B), there is an entry in this table for each combination of Service Policy Index and Application Class (fields 1202 and 1204 in FIG. 12A, which illustrates an example of the format of a new-service related communication from the BLT 804 to PM 810 for a layer 4 request, and fields 1220 and 1224, which illustrate an example of the format of a new-service related communication from the BLT 804 to the PE 812 for a layer 4 request). For a layer 5 service request from CA 808 (illustrated in FIG. 22), there is an entry in this table for each value of the Content Analyzer Service Index (field 2200 in FIG. 22, which illustrates an example of the format of a new-service related communication from CA 808 to PE 812 for a layer 5 service request).

Referring to FIG. 16A, the field 1602 is a pointer to the supergroup assigned to the service request, and the field 1604 is an indicator of the load balancing policy assigned to this service request. The fields 1606, 1608, and 1610 convey, respectively, the maximum number of connections which can be handled for this class of service, the current number of connections being handled for this class of service, and the peak number of connections which have been handled in the past for this class of service.

The policy field 1604 indicates a suitable load balancing policy, example of which are as follows:

| Policy | Description |
| --- | --- |
| Round Robin (RR) | A server is allocated by evenly distributing requests amongst a group of servers. |
| Weighted Round Robin (WRR) | A server is allocated by distributing requests amongst a group of servers in proportion to static weights assigned to each of the servers. |
| Utilization Percentage (UP) | A server in a group which has the least utilization percentage (current loading/maximum loading x 100%) is allocated to a request. |
| Least Connection (LS) | A server in a group with the least number of connections is allocated to a request. |
| Weighted Least Connection (WLS) | Each server in a group is assigned a static weighting, and a server in the group with the weighted least number of connection is allocated to a request. |
| Priority (PS) | A server in a group with the highest priority as set by at system configuration time is allocated to a request. |

Examples of pseudo-code listings are each of these policies are illustrated, respectively, in FIGS. 33A-33F.

The supergroup field 1602 is a pointer to an entry in the SuperGrp table. In one example, an entry in the SuperGrp table has the format indicated in FIG. 16B. In this example, the fields 1612*a*, 1612*b* are pointers to the server groups associated with the super-group. (For ease of illustration, only two group pointers are shown in FIG. 16B, but it should be appreciated that examples are possible with more or less than two such pointers). The field 1614 indicates the next available group through implementation of a round robin policy. (Again, other allocation policies are possible, so this example should not be taken as limiting.). The fields 1616 and 1618 indicate respectively the number of server groups in the super group, the current server groups, and server port numbers.

The fields 1612*a*, 1612*b* are pointers to entries in the SrvrGrp table. If a round robin policy is applicable, the next available group as indicated by the field 1614 is used to select the corresponding pointer from the possible pointers 1612*a*, 1612*b* to access an entry for the server group in the SrvrGrp table which is assigned to the server request.

Figure 16C:
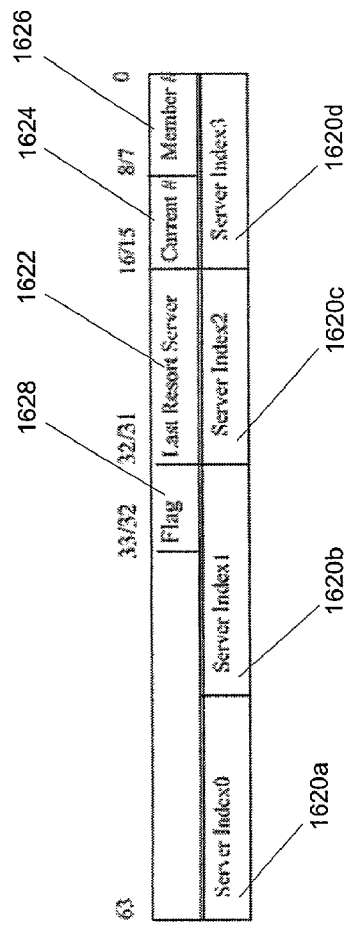
FIG. 16C illustrates the format of an entry in the SrvrGrp table in the implementation of FIG. 8.

In one example, an entry in the SrvrGrp table may have the format illustrated in FIG. 16C. The fields 1620*a*, 1620*b*, 1620*c*, and 1620*d* are pointers to loading and physical address information for the specific servers in a group. (For each of illustration only, four such pointers are shown in FIG. 16C, but it should be appreciated that examples are possible where there are more than four and less than four pointers for each entry in the SrvrGrp table). The field 1626 indicates the number of servers in the group, and the field 1624 indicates the next available server in the group through implementation of a round robin policy. (For implementation of other policies, loading information for the servers in the group may have to be accessed). The field 1622 is an indicator of the last resort server, which is the server assigned to the request as a last resort.

The fields 1620*a*, 1620*b*, 1620*c*, and 1620*d* are pointers to corresponding entries in the SrvrLoad and SrvrProp tables.

Figure 16D:
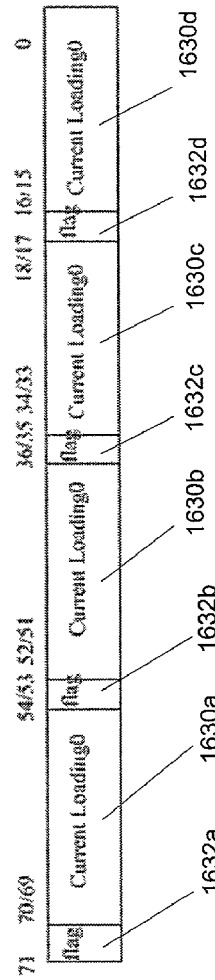
FIG. 16D illustrates the format of an entry in the SrvrLoad table in the implementation of FIG. 8.
Figure 16E:
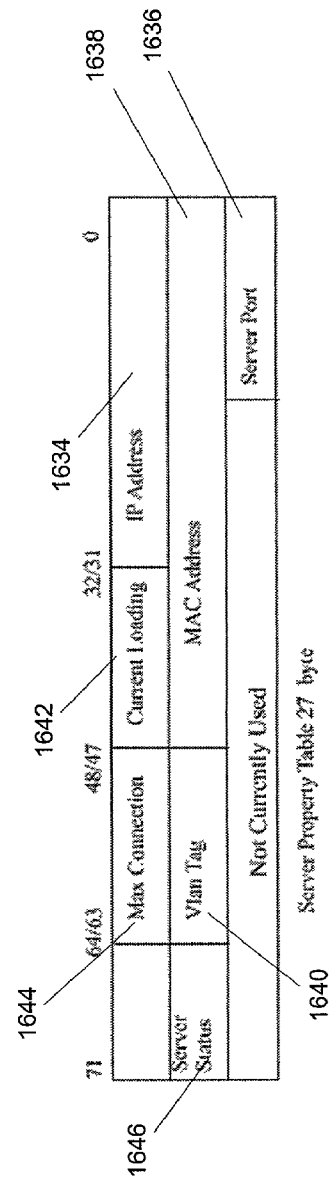
FIG. 16E illustrates the format of an entry in the SrvrProp table in the implementation of FIG. 8.

Referring to FIG. 16D, an example of an entry in the SrvrLoad table is illustrated. The fields 1630*a*, 1630*b*, 1630*c*, and 1630*d* record the current loading (in terms of number of connections) of the servers in the corresponding group. (For the sake of illustration only, four such pointers are shown in FIG. 16D, but it should be appreciated that examples are possible where there are more or less than four servers in the group. Therefore, this example should not be taken as limiting.). Referring to FIG. 16E, an example of an entry in the SrvrProp table is illustrated. The field 1634 is the IP address of the server, the field 1636 is the port of the server, the field 1638 is the MAC address of the server, and the field 1640 is the Vlan Tag of the server. The field 1642 is the current loading of the server (in terms of number of connections) and the field 1644 is the maximum number of connections that can be simultaneously handled by the server. The field 1646 is the server status.

The load balancing policy applicable to the particular class of service (specified by the field 1604 in FIG. 16A) is applied to the loading information for each of the servers in the group assigned to the request to identify a server to allocate to the request based on application of a load balancing policy.

The PE 812 may also allocate a server to a request based on application of a persistence policy, examples of which are as follows:

| Policy | Description |
| --- | --- |
| Self-identification Cookie Stickiness | For layer 5 requests only, the server ID will be extracted from cookie information, and assigned to the request. |
| Cookie Hashing Stickiness | For layer 5 requests only, a hash value will be derived from cookie information, and a hash algorithm translates this hash value into a server, which is assigned to the request if the same service is requested. |
| Client-Based Persistence (Learned) | For layer 4 and layer 5 requests, the client IP address is used to determine the server the client was connected to before, and that server is allocated to the client. |
| Cookie-ID Based Persistence (Learned) | For layer 5 requests only, cookie information stored by a client is analyzed to determine the server that issued the cookie, and that server is allocated to the client. |
| (SSL) Session-ID Based Persistent (Learned) | For layer 5 requests only, session information stored by a client is analyzed to determine the server that issued the session information, and that server is allocated to the client. |

For purposes of this disclosure, the terms "persistence" and "stickiness" are used synonymously when referring to resource allocation (and this use of the term "persistence" may differ from its meaning in http in relation to a "keep connection alive" command).

According to self-identification stickiness, the server identifier (field 2210 in FIG. 22) derived by CA 808 from cookie information is used to identify a server for allocating to the request. According to cookie hashing stickiness, the hash value (field 2214 in FIG. 22) derived by CA 808 from cookie information is used to identify a server for allocating to the request. According to client based persistence, the client IP address (field 2208 in FIG. 22) is used to connect the client which issued the request to the server previously connected to the client. According to cookie identifier based persistence, a cookie identifier (field 2202 in FIG. 22) derived by CA 808 is used to connect the client which issued the request to the server which issued the cookie. According to SSL session identifier based persistence, an SSL session identifier (field 2202 in FIG. 22) derived by CA 808 is used to connect the client which issued the request to the server which issued the session identifier.

Certain fields in the communication from CA 808 (FIG. 22) indicate whether and which persistence policy to apply. Field 2212 indicates whether or not the server identifier field (field 2210) is valid; field 2216 indicates whether the cookie hashing value (field 2214) is valid; field 2204 indicates whether field 2202 is valid and contains a cookie identifier; and field 2206 indicates whether field 2202 is valid and contains a session identifier.

If field 2212 indicates that field 2210 contains a valid server identifier, PE 812 concludes that a self-identification cookie mode is in effect, and allocates the server identified by field 2210 to the request. If field 2216 indicates that field 2214 contains a valid cookie hashing value, PE 812 concludes that a directive hash mode is in effect, and uses this information to allocate a server to the request. In one example, PE 812 uses the lower 7 bits of the CA Service Index (CSI), field 2200 in FIG. 22, as an index in the SrvcIndx table to identify a super group, and then uses the lower 7 bits of the sum of the CSI field and the cookie hash value (field 2214) as an index to select an entry in the SrvrGrp table (thus in effect selecting a server group for the request). PE 812 then uses the upper 7 bits of this sum to select one of the servers in the group. PE 812 then allocates this server to the request.

If neither of self-identification cookie mode or directive hash mode is in effect, PE 812 then considers whether cookie learning mode is in effect. In cookie learning mode, PE 812 uses the IPHist database, identified with numeral 834 in FIG. 8, to implement client based persistence, cookie-ID based persistence, and session-ID based persistence policies.

The IPHist database 834 stores information about the connections which have been established in the past between clients and servers. This database is used to implement two kinds of stickiness, the first being based on whether a connection still exists, and the second being whether the connection existed within a certain amount of time from the present. It consists of entries which are indexed through an index derived by application of a hash function to a hash key derived from one of the following: the client IP address, a cookie ID, or a session ID. In particular, if the cookie ID or SSL session ID is valid and available (field 2202 in FIG. 22 as determined by an access to fields 2204 and 2206), the hash key is derived from one or the other of these two values. (In one example, the hash key is equal to the sum of one of these two values, whichever is applicable, and the Service Index which is applicable (BSI for layer 4 request and CSI for layer 5 requests) Only if both of these two values is unavailable is the hash key derived from the client IP address (field 2208 in FIG. 22). (Again, in on example, the hash key is equal to the sum of the client IP address and the applicable Service Index, BSI for layer 4 requests and CSI for layer 5 requests.).

The entries in the table are grouped into buckets, with the entries in a bucket all corresponding to the same index. When an entry is desired to be written into the table, and there is a collision, the next available entry in the bucket is sequentially searched for and used. Similarly, when an entry is desired to be read from the table, a bucket is accessed, and the entries in the bucket sequentially accessed and evaluated until the desired entry is found or the search of the bucket is exhausted.

Each entry in the table corresponds with a particular connection and identifies the particular server that was involved in the connection. To implement a stickiness policy for an incoming service request, a hash key is derived from one of the previously discussed identifiers (with preference being give to the cookie ID or session ID if one is available, and if one is not available, to the client IP address) and a hash function is applied to the hash key to derive an index to the IPHist database. The table is then accessed to determine if an entry exists for the identifier for the category of service currently requested. If so, the server corresponding to the entry is allocated to the service request.

If no corresponding entry exists in the table, and the cookie ID or session ID was used as the hash entry, the table is again accessed using the client IP address as the hash key. If a corresponding entry still does not exist in the table, the server that was identified through application of a load balancing policy is allocated to the request. The IPHist database is then updated to reflect the new connection. If a cookie or session ID is available, an entry is made in the table using this value of the hash key. A second entry is then made in the table using the client IP address as the hash key. (Thus, two entries can exist in the table for the same connection). If a cookie or session ID is unavailable, a single entry is made in the table using the client IP address as the hash key.

Figure 17:
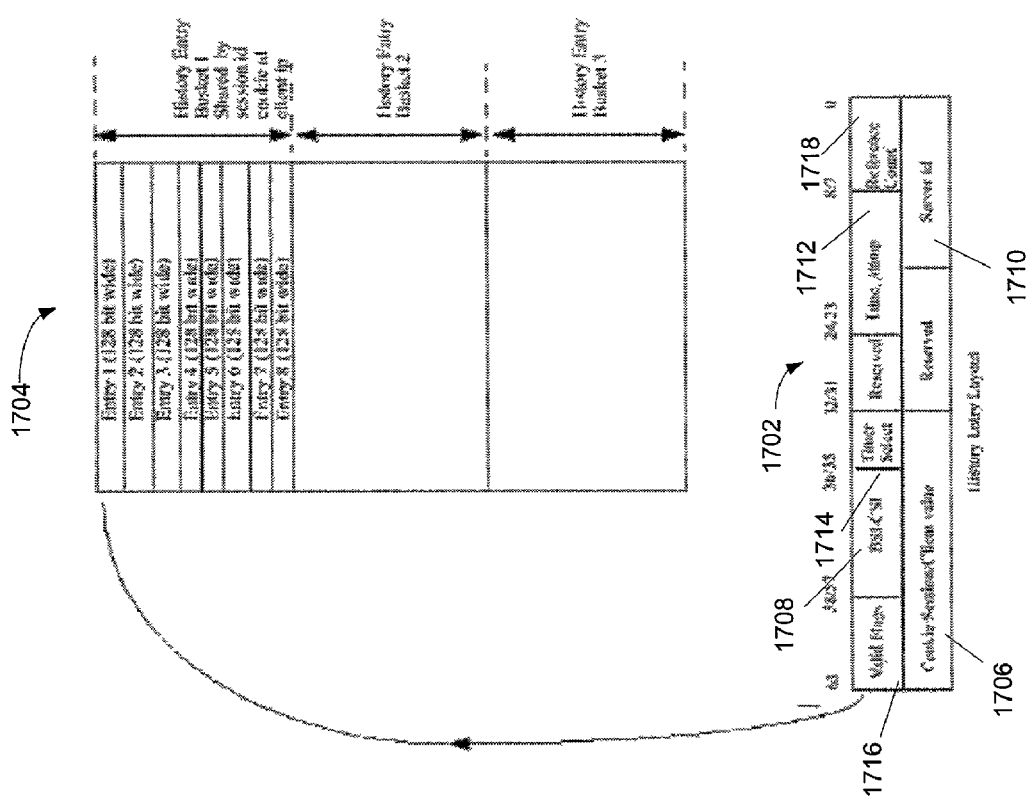
FIG. 17 illustrates the format of an entry in the History Table in the implementation of FIG. 8.

Referring to FIG. 17, an example of an entry in the IPHist database is identified with numeral 1702, and the organization of the IPHist database into buckets is identified with numeral 1704. Within entry 1702, the field 1706 is the hash key corresponding to the entry. As indicated previously, it is derived from one or the other of the client IP address, a cookie ID, or a session ID. Field 1708 is the requested class of service associated with the entry. (For a layer 4 request, this field is the Base Service Index, i.e., field 1202 in FIG. 12A and field 1220 in FIG. 12B. For a layer 5 request, this field is the CA Service Index, i.e., field 2200 in FIG. 22).

Field 1710 is the ID of the server associated with the connection, and field 1712 is a timestamp which is stored when the prior connection was closed in the IDHist database. Field 1714 is a timeout value stored with the entry when it was first created. Field 1718 is a count of the number of active connections that exist which correspond to the entry. A crawler, akin to the crawler 814 in FIG. 8, periodically walks through the IDHist database, and deletes entries for which no connections are active and which have timed out.

Turning back to FIG. 8, the EMU 806 maintains a database EmuBuff, identified with numeral 836. This database comprises a plurality of buffers, one of which corresponds to each active layer 5 connection which has been or is being established. The incoming packets relating to a layer 5 connection are buffered in the corresponding buffer for the connection until an entire http header has been obtained. This is determined when two successive carriage returns, line feeds are detected, indicating the end of an http header. At that point, the contents of the buffer may be sent to CA 808.

In one example, a buffer within EMU 806 is 1536 bytes in length, sufficient to hold an entire http header. As packets are received for the connection, they are placed in the corresponding portion of the buffer. If the packets are received in order, PM 810 functions as a proxy for the server, and acknowledges the receipt of the packets as it receives them. If the packets are received out of order, however, a deferred acknowledgement mode is implemented, whereby the packets are acknowledged to the point of leftwise contiguity. To facilitate this, a flag is maintained for each byte of the buffer, indicating whether the corresponding byte has been filled with packet data. When the byte is filled, the corresponding flag is set to a logical "1", and when the byte is empty, the corresponding flag is reset to a logical "0". EM 806 periodically scans the flags from left to right, and is able to rapidly determine therefrom which bytes in the buffer are left-wise continuous. PM 810 then utilizes this information to issue acknowledgements at the appropriate time.

For other types of data segments, e.g., a https record layer and an associated encrypted http header, the EMU buffers may be configured differently. Moreover, in contrast to the situation with http headers, where the PM 810 functions as a half-proxy for layer 5 packets, i.e., it functions as a proxy for the server for client-originating layer 5 packets, but does not do so for server-originating layer 5 packets, in the case of https segments, the PM 810 may function as a full proxy for layer 5 packets.

Figure 18:
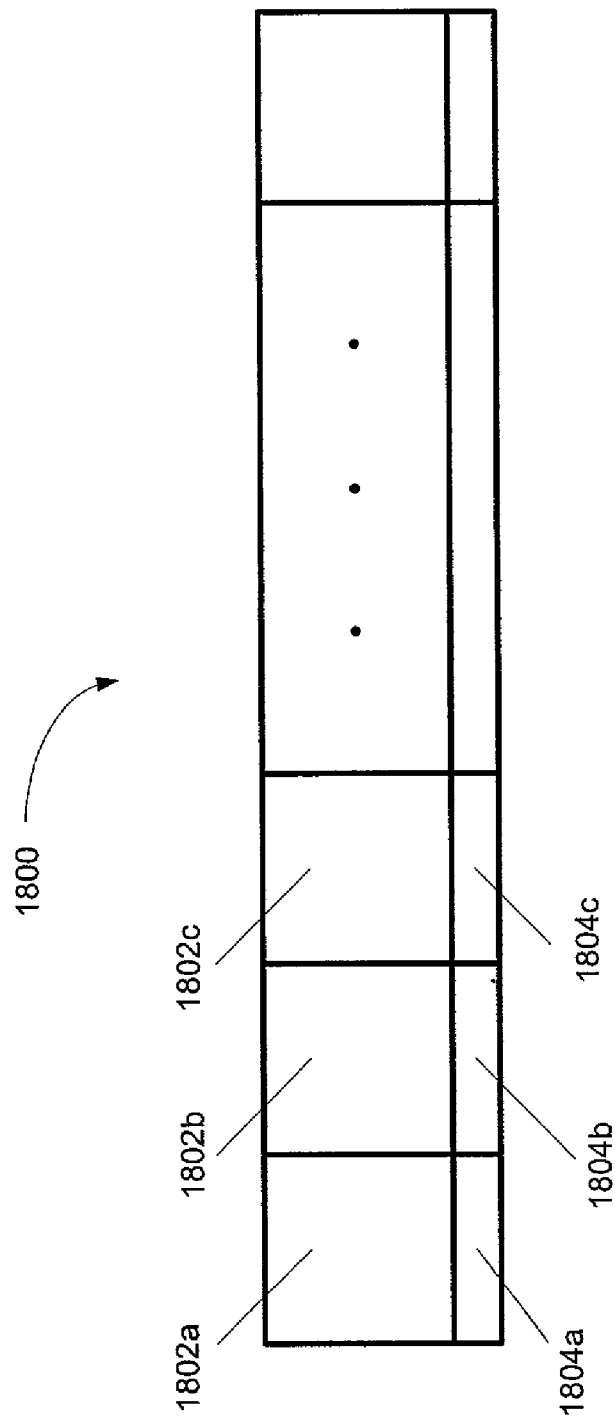
FIG. 18 illustrates an EMU buffer with associated tags in the implementation of FIG. 8.

Referring to FIG. 18, an example of an EMU buffer is illustrated. Numerals 1802*a*, 1802*b*, 1802*c* refer to successive bytes in the buffer, while numerals 1804*a*, 1804*b*, 1804*c* refer to the corresponding flags for the bytes. In this example, the PM 810 determines a left-wise contiguous grouping of bytes in the buffer, by scanning the flags 1804*a*, 1804*b*, 1804*c* left-to-right, and stopping when a logical '0' is detected. The bytes to the left of this point, where the corresponding flags are a logical '1', represent a left-wise contiguous grouping of data.

Figure 19:
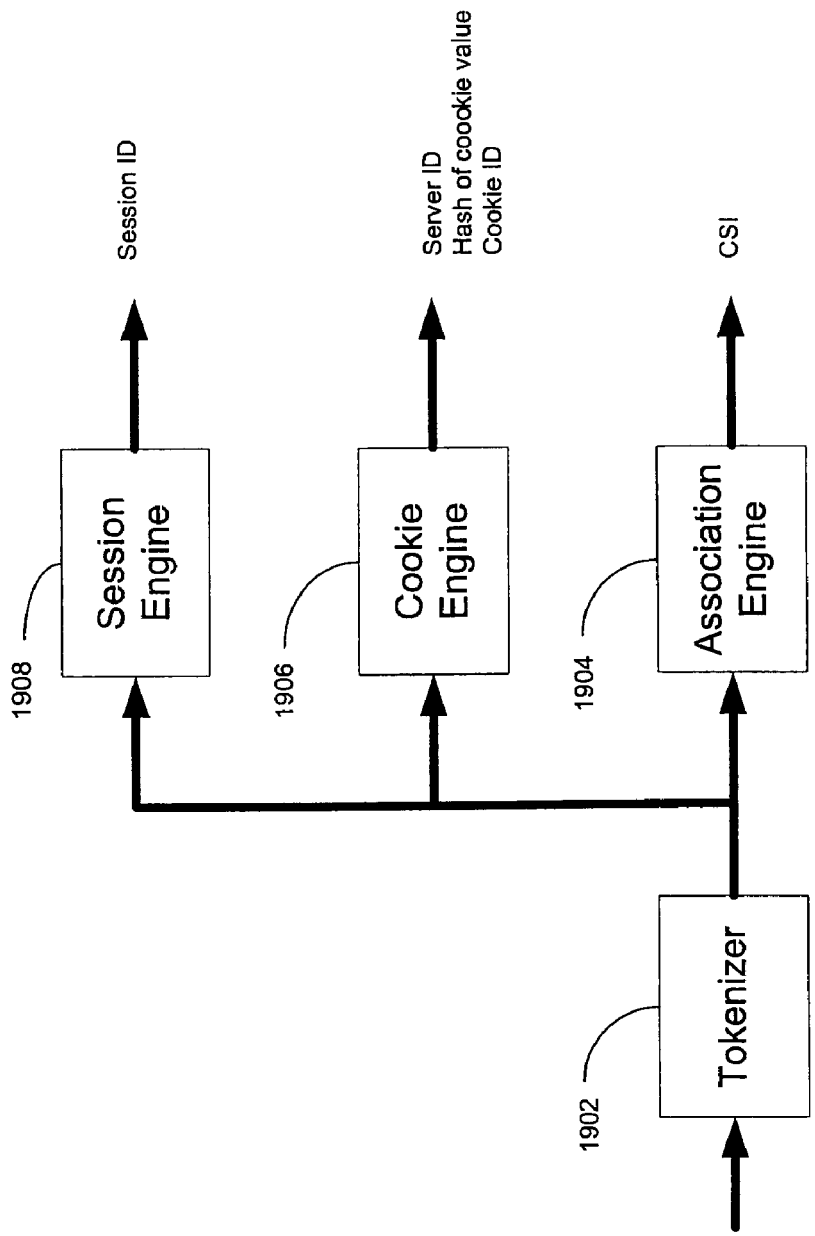
FIG. 19 illustrates a simplified block diagram of the content analyzer in the implementation of FIG. 8.

Referring to FIG. 19, in one embodiment, CA 812 comprises tokenizer 1902, association engine 1904, cookie engine 1906, and session engine 1908. Tokenizer 1902 scans through the http header, and parses it to identify the values of certain tokens, such as domain, URL, host, content type, and cookie value, while ignoring delimiters such as '/', ':', and '.'. If certain of these fields are not present, e.g., URL, domain and host field, the tokenizer 1902 may assign default values to them. When an end-of-line mark is detected, the tokenizer 1902 pushes the values of the keywords it has found onto a FIFO buffer. For ease of data manipulation, the tokenizer 1902 may maintain a dictionary to associate each of the codes with its corresponding value, and convert each of the values it has found into uniformly sized codes. To help it identify tokens, the tokenizer 1902 may utilize a configuration table, which describes the logical structure of the server farm.

The association engine 1904 applies a set of rules to the buffered tokens, and associates various combinations of BSI, domain, and URL path names with a CSI. The rules may require exact, prefix, suffix, or combinations of prefix and suffix matches for the URL pathname. In one example, the association engine 1904 maintains the rules as entries in an association engine CAM (AECAM).

An exact match may be represented as A, a prefix match may be represented as A/*, a suffix match may be represented as */B, and a prefix and suffix match may be represented as A/*/B, where A and B specify text which is to be matched. Thus, consider the examples set forth in the following table:

| | | | |
|---|---|---|---|
| $BSI_1$ | $domain_1$ | A/B | $CSI_1$ |
| $BSI_1$ | $domain_1$ | A/B/C/* | $CSI_2$ |
| $BSI_1$ | $domain_1$ | A/B/C/*/D | $CSI_3$ |
| $BSI_1$ | $domain_1$ | A/B/C/D/E | $CSI_4$ |

The first rule associates the CA Service Index $CSI_1$ with the Base Service Index $BSI_1$, the domain name domain, and a URL pathname which is A/B exactly. The second rule associates the CA Service Index $CSI_2$ with the Base Service Index $BSI_1$, the domain name domain, and a URL pathname which begins with A/B/C (any suffix is acceptable). The third rule associates the CA Service Index $CSI_3$ with the Base Service Index $BSI_1$, the domain name $domain_1$, and a URL pathname which begins with A/B/C and ends with D. The fourth rule associates the CA Service Index $CSI_4$ with the Base Service Index $BSI_1$, the domain name domain, and a URL pathname which is A/B/C/DIE exactly.

If more than one rule is applicable, the rule which controls is the one with the longest URL prefix match. Thus, if both rules two and three in the apply example apply to a URL pathname of A/B/C/G/D, rule three will control, and the service request will be assigned a CA Service Index of $CSI_3$.

Three special rules formats are BSI/domain/*, BSI/*/*, and BSI/*/URL. The first assigns a CSI to a service request based on the combination of BSI and domain, without consideration of the URL pathname. This rule may be handled by the association in the normal fashion, i.e., through a suitable entry in the AECAM.

The second assigns a CSI to a service request based solely on the BSI. This rule may be handled through a suitable entry in the cookie name table. In particular, referring to FIG. 21, field 2108 is a default CSI value which is assigned to a BSI in the event this second type of rule is in effect.

The third assigns a CSI to a service request based on the combination of the BSI and URL pathname, but without consideration of the domain. This rule may be handled through suitable entries in the AECAM.

Cookie engine 1906 scans the tokens parsed by tokenizer 1902, and processes any cookies which have been identified. The cookie engine 1906 first accesses a cookie name table to determine how to process a cookie. An entry in the cookie name table is illustrated in FIG. 21. Each entry in the table is indexed through a Base Service Index, identified with numeral 2102. The other fields in the entry comprises a cookie mode identifier, identified with numeral 2104, and a cookie name, identified with numeral 2106.

To process a cookie, the BSI for the service request is used to access the corresponding entry in the cookie name table. If there is a cookie in the http header for the request having a name which matches the cookie name recorded in field 2106 of the entry, the cookie value for the cookie is processed according to the cookie processing mode recorded by field 2104.

In one example, one of three modes may be specified: self-identification cookie mode, directive hash mode, and cookie learning mode. In self-identification cookie mode, the cookie value following the matched cookie name is the IP/MAC address of a server, and cookie engine outputs a server identifier derived from this cookie value. (For example, a combination of the cookie value and BSI may be used as an index to a table to obtain the server ID). CA 808 then communicates this server ID to PE 812 along with an indication that the server ID is valid (in the format illustrated in FIG. 22), and this server is allocated to the service request.

In directive hash mode, a hash function is applied to the cookie value following the matched cookie name, and the resulting hash value is output by the cookie engine 1906. CA 808 then communicates this hash value to PE 812 along with an indication that this hash value is valid (in the format illustrated in FIG. 22), and this value in combination with the CSI for the service request is used to identify a server (as previously described) which is allocated to the service request.

In cookie learning mode, a cookie identifier is derived from the cookie value following the matched cookie name, and this cookie identifier is output by the cookie engine 1906. (For example, the cookie identified may be derived from a hash of the cookie value). CA 808 then communicates this value to PE 812 along with an indication that the cookie ID is valid (in the format illustrated in FIG. 22), and PE 812 then uses this information to build up the history table (IPHist 834). In particular, PE 812 places an entry in the history table using an index derived from this cookie identifier. (It also places an entry in the history table for the same connection using an index derived from the client IP address). This information is then used to implement cookie ID based persistence, and client based persistence. (Moreover, in a default cookie learning mode, a default cookie value will be provided by CA 808 for use in building up the history table).

The session engine 1908 is configured to handle https packets, which comprise a SSL record layer followed by encrypted http text. The format of a SSL record layer differs by version. In one example, versions 2.0, 3.0, and 3.1 are supported.

The session engine 1908 will locate the session identifier string in the layer, derive a session identifier from this field, and output this session identifier. (For example, the session identifier may be a hash of the session identifier string.).

Figure 22:
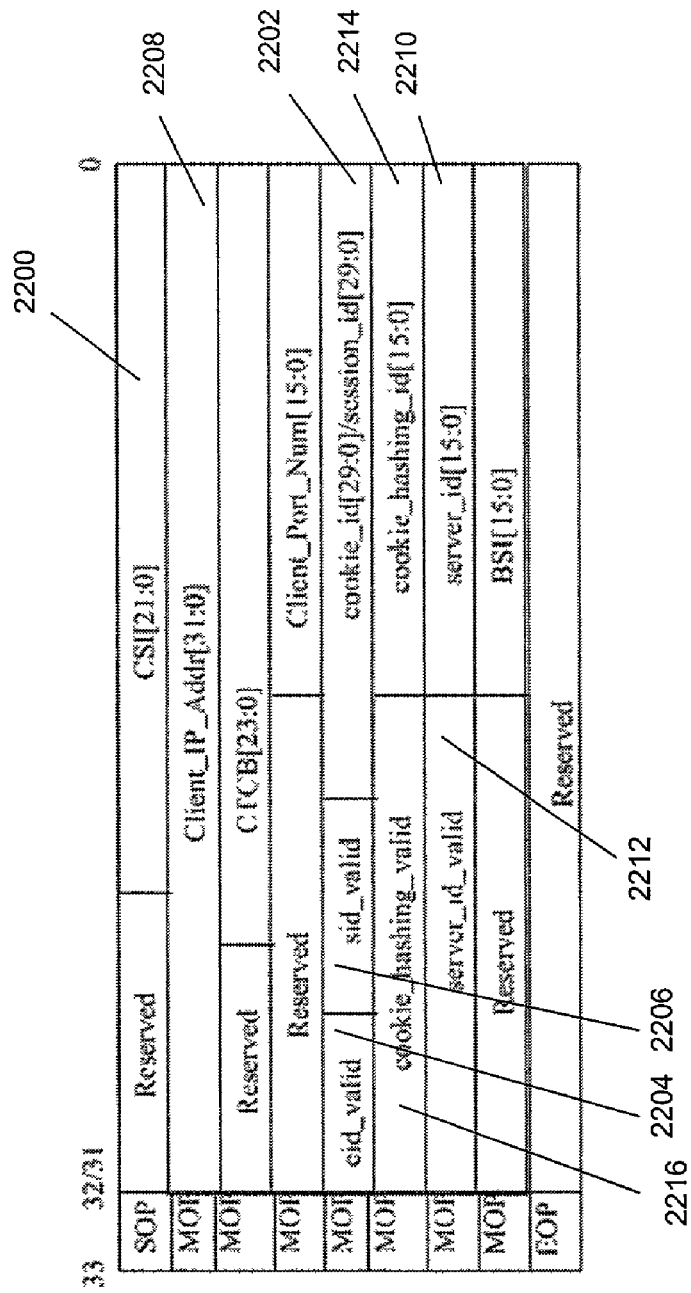
FIG. 22 illustrates the format of a new service-related communication from the content analyzer to the policy engine in the implementation of FIG. 8.

CA 808 then outputs this identifier, as well as an indication that it is valid, to PE 812 in the communication illustrated in FIG. 22. CA 808 also provides a CSI which is equal to the BSI for the service request. PE 812 then uses this information to build up the history table (IPHist 834). In particular, PE 812 places an entry in the history table using an index derived from this session identifier. (It also places an entry in the history table for the same connection using an index derived from the client IP address). This information is then used to implement session ID based persistence, and client based persistence.

Note that there are three control bits maintained in a control register in CA 808 which allow any of the association, cookie, or session engines 1904, 1906, 1908 to be disabled or bypassed. In particular, a URL switch can be used to disable or bypass the association engine 1904; a cookie switch can be used to disable or bypass the cookie engine 1908; and a session switch can be used to disable or bypass the session engine 1908.

When http segments are being received, these switches can be used to disable or bypass the session engine 1908, since the session identifier information is not available. Similarly, when https segments are being received, these switches can be used to disable or bypass the association engine 1904 and the cookie engine 1906, since the domain, URL pathname, and cookie information is not available.

Referring to FIG. 20, an example of a http header is illustrated. This particular example is a http GET request, but it should be appreciated that other examples are possible. When this GET request is received by CA 808, it is assumed that the following dictionary has already been produced responsive to the configuration table describing the server farm:
com-1
gif-2
jpg-3
myhomepage-4
myhome-5
www-6
yourhomepage-7
yourhome-8

Tokenizer 1902 parses the GET request, and, using the foregoing dictionary, identifies the following keywords:
www
myhomepage
com
myhome The tokenizer 1902 then uses the dictionary to map each of these keywords into the following binary codes:
6
4
1
5

The association engine 1904 receives each value from left to right, one value at a time. It searches the rules in the AECAM iteratively, using, at each iteration, a key comprising the current keyword combined with all previous keywords. It then applies the rule with the longest prefix match to determine a CSI for the request.

For example, assume the following rules are stored in the AECAM;
BSI, domain, 6/4/1/*, Wildcard hit, Stop
BSI, domain, 6/4/*/5, Wildcard hit, Left continue
BSI, domain, 6/4/1/3/*, Wildcard hit, Stop These rules each specify a certain action to be taken if the match prescribed by the rule is detected. For example, the first rule specifies that, if there is a wildcard match between the string 6/4/1/* and the URL path, and the BSI and domain also match, then searching should stop, and the CSI associated with the rule will apply. As another example, the second rule specifies that, if there is a wildcard match between the string 6/4/* and the URL path, then searching should continue in reverse towards the left. (If there is an ensuing wildcard match between the URL path and the string */5, searching should stop, and the CSI associated with the rule will apply.).

When these rules are applied to the example described earlier and illustrated in FIG. 20, assuming that the BSI and domain match, each of these rules matches the token string, and thus potentially apply. However, the third rule achieves the longest prefix match, and therefore will take precedence over the other two. Consequently, the CSI associated with this third rule will be assigned to the service request.

As another example, assume the configuration file indicates that all files of a particular type, i.e., .gif files, are to be stored on the same group of servers. In this event, the following rule will result in such files being assigned the same CSI, and therefore, group of servers: BSI, domain, *.gif, Wildcard hit, Stop.

Figure 23:
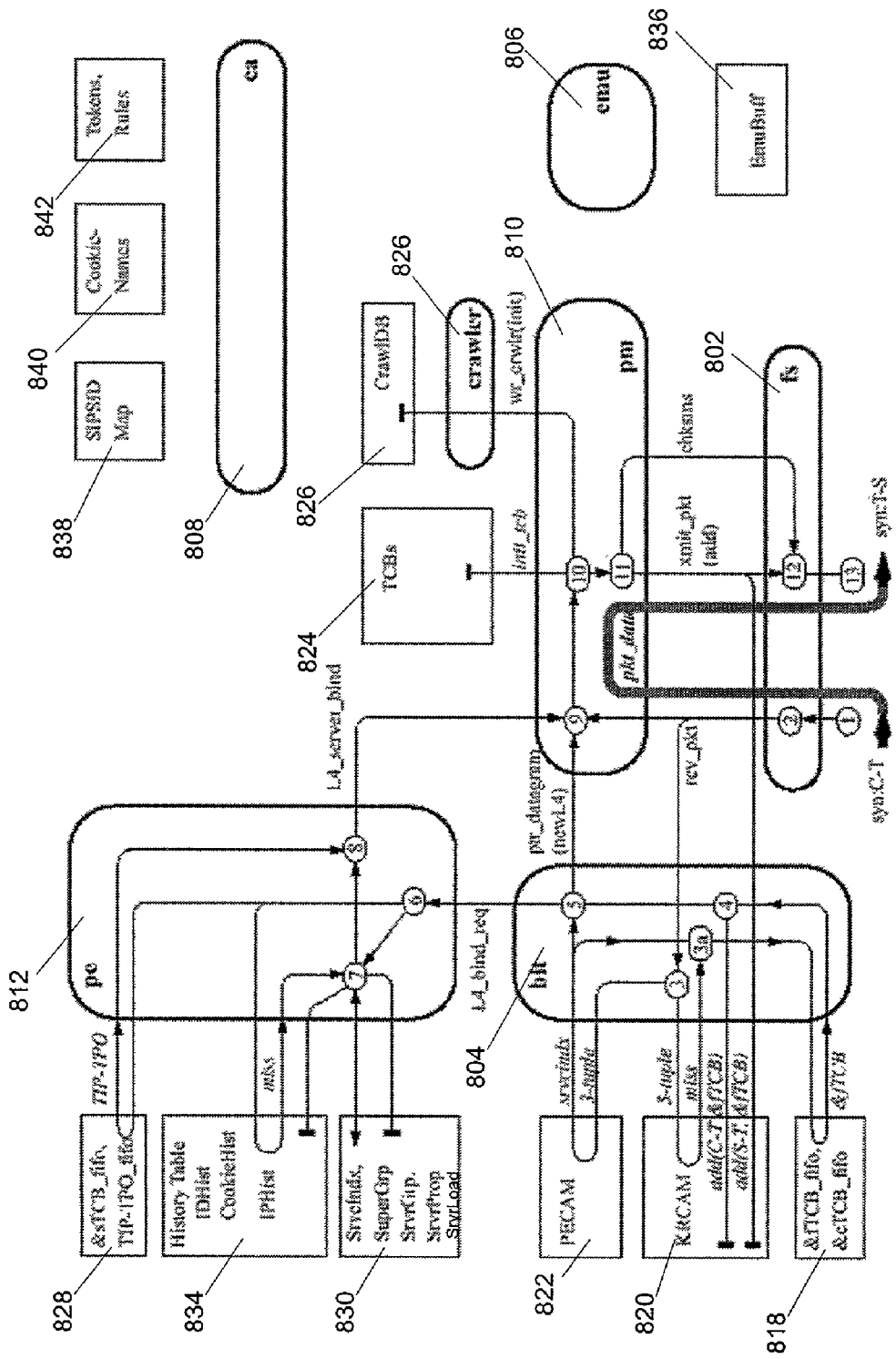
FIG. 23 illustrates the flow of the initial L4 client SYN packet through the implementation of FIG. 8.

The flow of control through the system of FIG. 8 during the lifetime of a layer 4 connection will now be described. Referring to FIG. 23, the description begins with the flow of the initial layer 4 SYN packet through the system. The major steps which are involved in the flow of this packet through the system are set forth below. Each step is numbered with a corresponding identifying numeral which appears in FIG. 23.

1) A SYN packet arrives from a client.

2) FS 802 stores the entire packet and ensures it has no FS-identifiable errors before allowing significant resources to be committed to the packet, i.e., resources beyond those required to allow BLT 804 to perform CAM lookups. Thus, once significant resources have been committed to the packet, all other units can assume the packet has no checksum errors, etc.

Figure 24A:
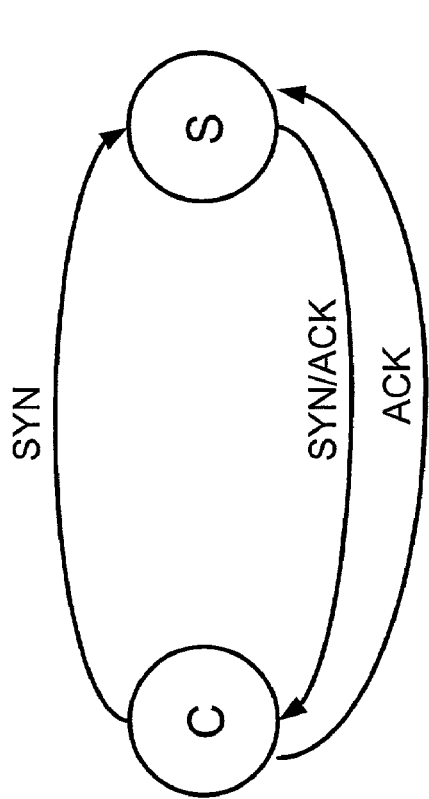
Figure 24B:
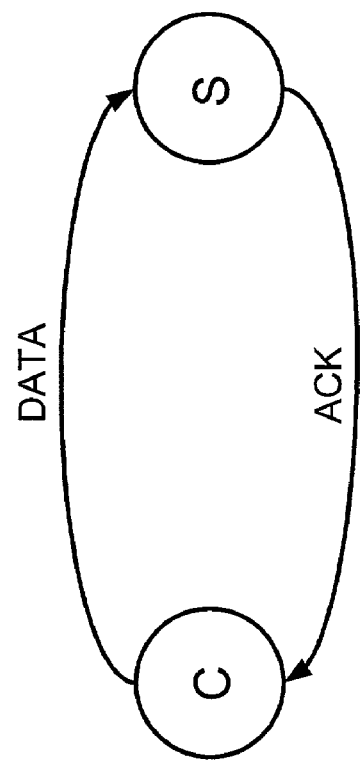

3) BLT 804 snoops the packet as it is passed to PM 810 and extracts the information it needs. Then it uses the 3-tuple of (dest IP, dest port, protocol) to reference the PECAM 822. In this example, the service is supported so the PECAM 822 will return the service index indicating L4 service, and the application class. Simultaneously, BLT 804 uses the 5-tuple formed by (src IP, dest IP, src port, dest port, protocol) to read the KRCAM 820. If the protocol utilized is a state-based protocol such as TCP BLT 804, and KRCAM 820 returns a null value, BLT 804 will consider the state of the protocol in determining whether the packet represents a request for a new connection. (Referring to FIGS. 24A-24C, there are three phases associated with a TCP connection, a connection establishment phase, illustrated in FIG. 24A, a data phase, illustrated in FIG. 24B, and a connection close phase, illustrated in FIG. 24C. As illustrated in FIG. 24A, the connection establishment phase involves a three-way handshake. As illustrated in FIG. 24B, the data phase involves a two-way handshake. As illustrated in FIG. 24C, the connection close phase involves a four-way handshake. The state of a TCP connection indicates both the phase of the connection which is underway, and the portion of the corresponding handshake which has been completed, and which has not). In particular, if KRCAM 820 returns a null value, and the SYN flag is set, BLT 804 concludes that the packet represents a request for a new connection. On the other hand, if KRCAM 820 returns a null value, and the SYN flag is not set, PM 810 will execute a Drop or Reset command.

3a) Once the PECAM 822 and KRCAM 820 have been referenced, the BLT 804 can determine whether this connection already exists and whether the service is supported. Because this is a new connection (and the SYN flag is set), the KRCAM 820 read will return a null value, and the BLT 804 will conclude this is a new connection.

4) The BLT 804 then uses the output of the PECAM 822 to determine that an L4 connection is called for. It then retrieves an &fTCB from &ffCB_fifo 818. In addition, the pair (5-tuple, &fTCB) is added to the KRCAM 820.

5) The &fTCB is then combined with a service index representing the type of service called for, and a L4 service request is sent to PE 812. Also, a datagram is sent to PM 810 advising it of the new connection.

6) The 812 PE performs two reads in parallel when it receives the L4 service request from BLT 804. First, it retrieves a TIP-TPO pair for use by the system when communicating with the server. (Note that the &sTCB fifo 828 is not read because the &fTCB allocated by the BLT 804 is used for both the client and the server). Second, if stickiness is enabled, it reads the IPHist database 834 to see if an entry matches a hash of the client IP and service index. Because this is the first connection for this client, there will be no match.

Figure 25:
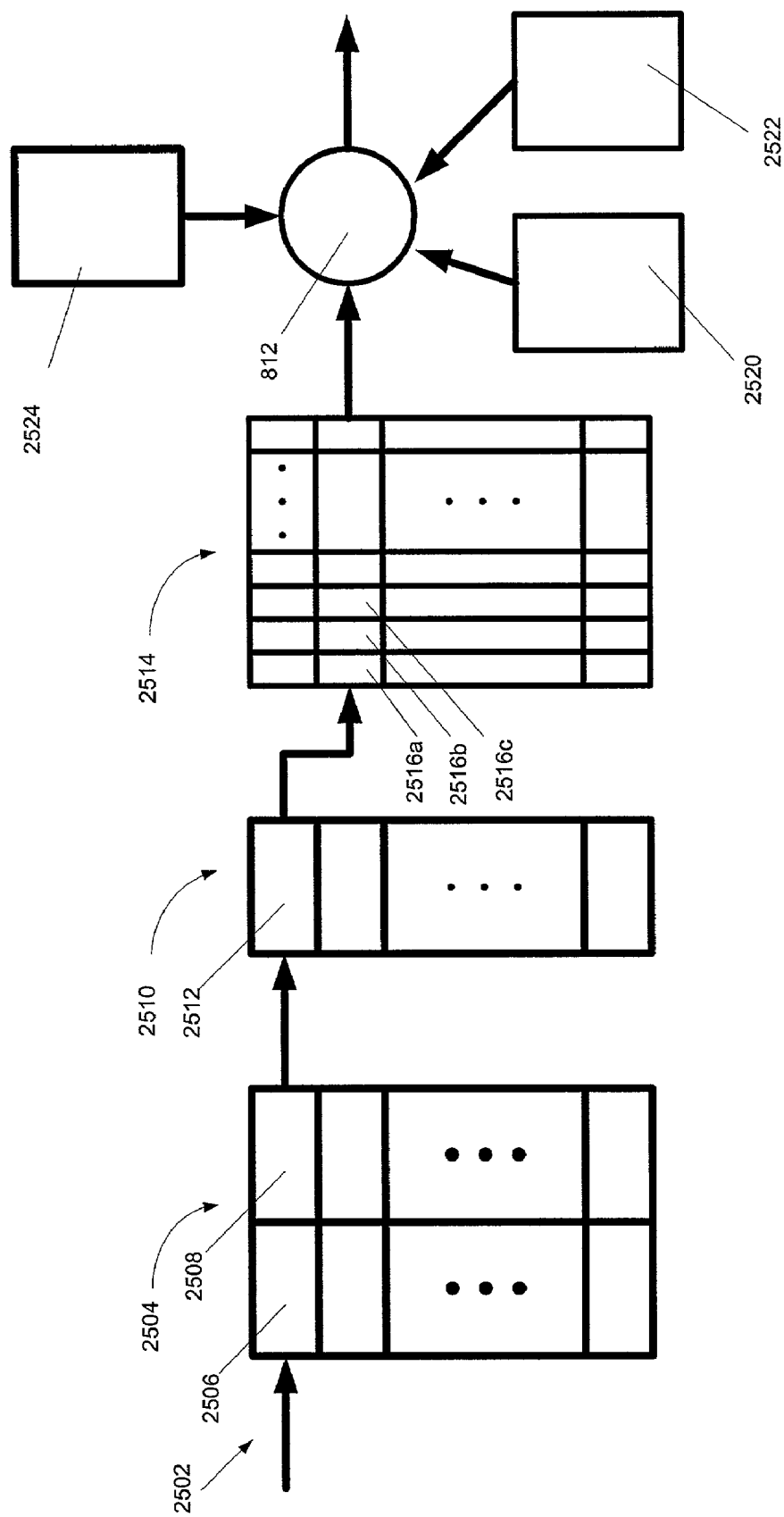
FIG. 25 illustrates the process of allocating a server responsive to a service request in the implementation of FIG. 8.

7) When the L4 service request arrives, the PE 812 also accesses the databases shown and identified with numeral 830 (SrvrIndx, SuperGrp, SrvrGrp, SrvrProp, and SrvrLoad) to allocate a server. The results of the read from IPHist 834 (a miss in this case) and the server allocation are used to select a server. (With reference to FIG. 25, the server allocation process is illustrated in more detail. The service request 2502 is used as an index to the SrvrIndx table 2504 to retrieve a pointer 2508 to a super group for the request and a server allocation policy indicator 2506. The pointer 2508 is used as an index to the SuperGrp table 2510 to retrieve a pointer 2512 to a group within the supergroup. In one example, the group is determined using a round robin policy, where requests to a supergroup are evenly distributed amongst the groups within the supergroup. However, other examples are possible, so this example should not be taken as limiting. The pointer 2512 is used as an index to the SrvrGrp table 2514 to retrieve current loading and address information 2516a, 2516b, 2516c regarding the individual servers within the group. The address information for the individual servers may be used by PE 812 to retrieve additional information regarding the individual servers in the group from the SrvrLoad table 2520 and/or the SrvrProp table 2522. The policy indicated by policy 2506 is then implemented to select one of the servers in the group. PE 812 then accesses the IPHist table 2524 which returns a miss in this case. The output 2526 of this process is an indicator of a server to be allocated to the request.)

8) An L4 server bind request is formed by combining the TIP-TPO with a description of the allocated server. The server bind request is then sent to PM 810.

9) When it sees the incoming packet from FS 802, PM 810 waits until the datagram indicating a new L4 connection arrives from BLT 804. Because the datagram indicates this is a new L4 connection, PM 810 waits for the L4 server bind request to arrive from PE 812.

10) Before forwarding the packet, PM 810 initializes in database 824 the TCB referenced by the &fTCB along with the corresponding crawler database entry in database 826. Note that this TCB describes the client-system connection and the system-server connection. Also, BLT 804 and PM 810 independently maintain generation counts, the BLT 804 for each &fTCB pointer, and the PM 810 for each L4 TCB. When initializing the TCB, PM 810 verifies that the generation count associated with the &fTCB sent from BLT 804 matches the value in its own TCB database.

11) PM 810 alters the appropriate IP and TCP header fields in the packet, and sends the SYN packet to FS 802. PM 810 also sends IP and TCP checksums separately to FS 802. PM 810 also tags the packet with a BLT add, which describes a connection between the server IP and port (allocated by PE 812) and the system IP and port (the TIP-TPO pair also allocated by PE 812 from the TIP-TPO_fifo 828). The protocol field for this connection is taken to be the same as that in the SYN packet. The &fTCB is also included in the BLT add. As the packet is sent to FS 802, BLT 804 snoops the add, and stores a corresponding entry in KRCAM 820.

12) FS 802 combines the packet body with the checksums and sends it out the transmit port.

Figure 26:
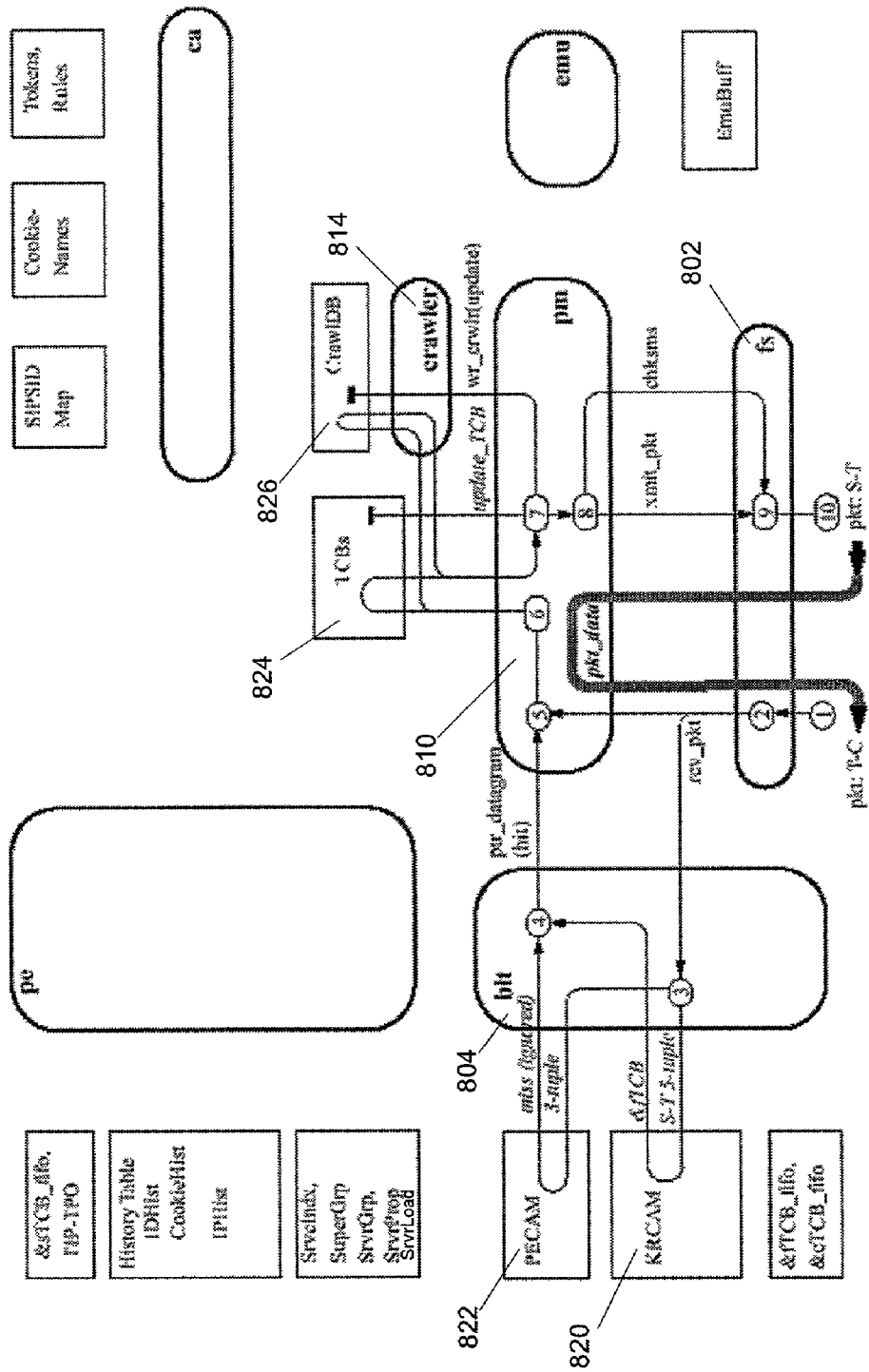
FIG. 26 illustrates the flow of the initial L4 server SYN/ACK packet through the implementation of FIG. 8.

Referring to FIG. 26, the flow of the L4 server SYN/ACK packet through the system will now be described. As before, the major steps in the flow are set forth below. The steps are numbered with a corresponding identifying numeral which appears in FIG. 26.

1) A SYN/ACK packet arrives from a server.

2) FS 802 stores the entire packet and performs error checking before allowing significant resources to be committed to the packet, i.e. resources beyond those required to allow BLT 804 to perform CAM lookups in relation to the packet.

3) BLT 804 snoops the packet as it is passed from FS 802 to PM 810. It extracts the 5-tuple of (src ip, src port, dest ip, dest port, protocol) and uses this key to search the KRCAM 820 for a &fTCB. Because the server-side connection was added to the KRCAM 820 when the client-originating SYN packet was processed, the search is successful, and a &fTCB is retrieved. From this, the BLT 804 knows that this is a packet for an established connection. BLT 804 also performs in parallel a read of PECAM 822 (in order to speed processing in the case client-originating packets). However, because there was a hit resulting from the search through KRCAM 820, the result from this read of PECAM 822 will be ignored.

4) The &fTCB read from KRCAM 820 is used to assemble a datagram for PM 810, indicating that there is an established connection for the packet in contrast to a new connection.

5) When PM 810 examines the datagram and sees that this is a packet for an established L4 connection, it proceeds without waiting for a server bind from PE 812 (which will never come since this is an established connection).

6) Because the search through KRCAM 820 was successful, PM 810 knows the TCB for the connection has been initialized and retrieves the TCB from database 824. It also retrieves the associated crawler entry from database 826.

7) Based on the flags in the incoming packet and the state of the connection (which is indicated in the TCB), PM 810 decides to forward the SYN/ACK packet to the client. It updates (in database 824) the TCB with the new state of the connection and also updates the corresponding crawler entry in database 826.

8) PM 810 modifies the packet header, assembles the outgoing packet, and sends the same to FS 802. It also computes the checksums, and separately sends them to FS 802.

9) FS 802 combines the packet with the checksums.

10) FS 802 transmits the packet to the client through its transmit port.

All subsequent packets sent from the client or the server are handled in the same manner as the server SYN/ACK packet. In particular, the access of KRCAM 820 which is performed by BLT 804 for either client- or server-originating packets will retrieve the &fTCB pointer. PM 810 will then use the state of the connection (obtainable from the TCB) to decide whether to forward the packet to the destination or reset the connection. Note that packets may be lost for several reasons, including checksum errors and buffer overflows. In such cases, the entire packet is always discarded, and the system relies on the TCP protocol to allow the L4 connection to recover from the loss of data packets. Note also that each time a packet is handled by PM 810, the crawler database 826 is updated in order to reset the timeout mechanism.

When the connection terminates without protocol errors or timeouts, as illustrated in FIG. 24C, the system observes the sequence whereby the client sends a FIN to the server, or the server sends a FIN to the client. Once the server sends a FIN, the protocol requires that the receiving end of a connection remain open for a designated waiting period in order to allow any packets remaining on the network to arrive. Therefore, the system does not immediately delete the connections, but, instead, updates the crawler database 814 so that the connection will timeout when the designated waiting period has elapsed.

Figure 27:
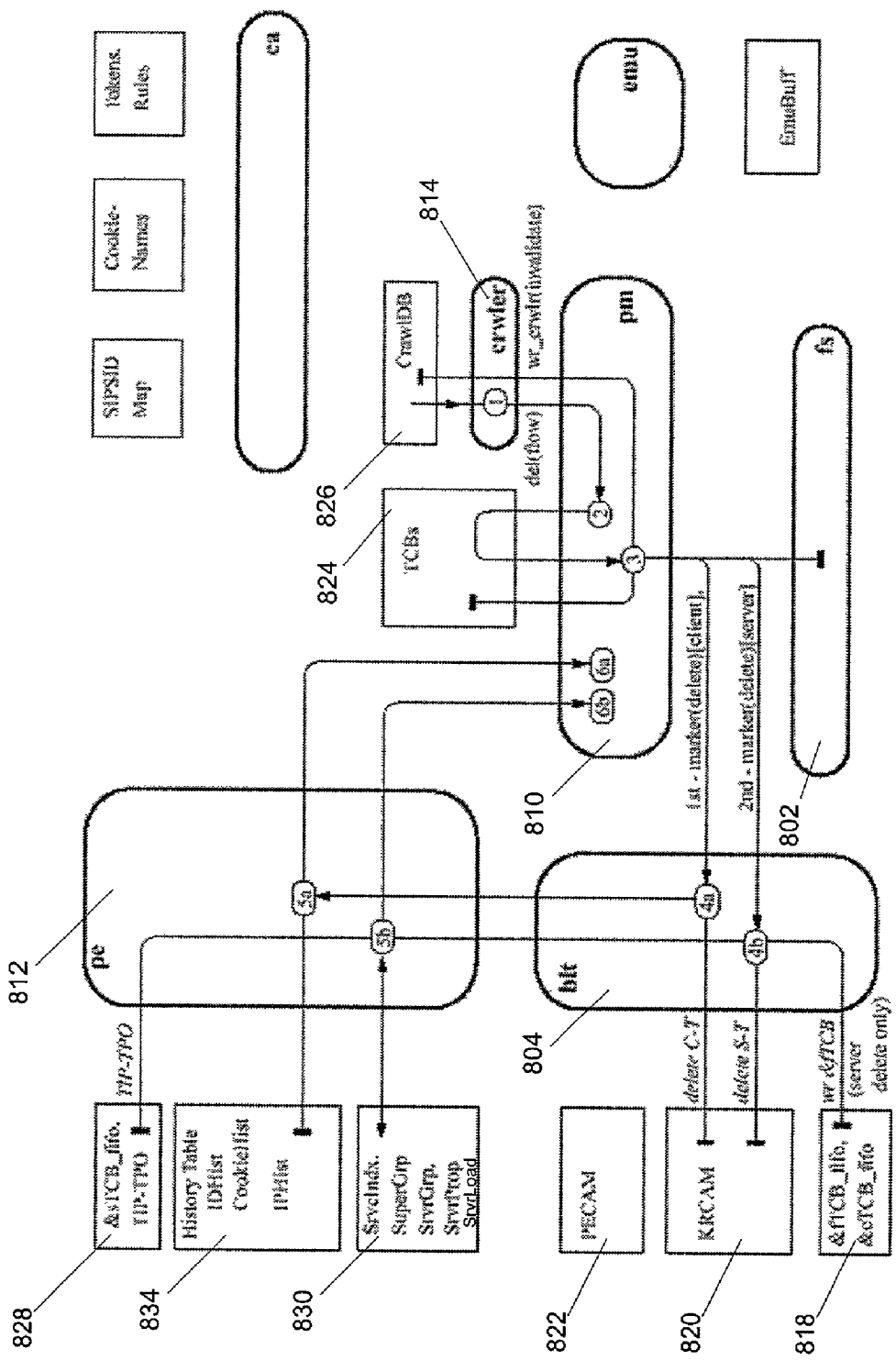
FIG. 27 illustrates the process of reclaiming L4 connection resources in the implementation of FIG. 8.

Referring to FIG. 27, the process of reclaiming resources upon the termination of an L4 connection will now be described. As before, the major steps in the process are set forth below. The steps are numbered with a corresponding identifying numeral which appears in FIG. 27.

1) The crawler 814, while trawling through its database 826, determines that the "waiting period" for an L4 connection has elapsed and the associated resources should be released. It then sends a delete request to PM 810.

2) PM 810 retrieves the corresponding TCB from its TCB database 824. From this TCB, PM 810 obtains the &fTCB and 5-tuple (src ip, dest ip, src port, dst port, protocol) for the connection.

3) PM 810 verifies that the connection is complete and marks the TCB as invalid. It then sends two marker(delete) packets to BLT 804, one for the client-system connection, and the other for the system-client connection. (FS 802 will also receive the marker packets, but will discard them). The marker(delete) packet for the client-system connection is always sent first. It is followed by the marker(delete) packer for the system-server connection. At the same time these marker packets are sent, PM 810 invalidates the TCB and crawler entries associated with the connection.

4) BLT 804 snoops the marker(delete) packet for the client-system connection, extracts the 5-tuple therefrom, and uses this 5-tuple to delete the corresponding entry in KRCAM 820. When BLT 804 snoops the marker(delete) packet for the system-server connection, it again extracts the 5-tuple and deletes the corresponding entry in the KRCAM 820. BLT 804 also recycles the &fTCB contained in the marker(delete) packet. BLT 804 also forwards each marker(delete) packet to PE 812.

5) When PE 812 receives the marker(delete) packet for the client-system connection, the history associated with that client in History Table 834 is updated to indicate termination of the connection. When PE 812 receives the marker(delete) packet for the server-system connection, the SrvrLoad and SrvrProp tables are updated to reflect the reduced load on the server. Also, the TIP-TPO address pair is recycled by placing the pair back on the TIP-TPO_fifo 828.

6) Every marker(delete) packet received by PE 812 is forwarded to PM 810. This allows PM 810 to verify that the marker(delete) packets were seen by both the BLT 804 and PE 812.

There are three sources for abnormal termination of an L4 connection:

1) The crawler 814 times out the connection;
2) The client sends a reset; and
3) The server sends a reset.

Each time an L4 packet is seen or accessed by PM 810, the crawler 814 is notified. The time since the last access is compared with a timeout interval which is set based on the state of the connection as of the last access. If the timeout period is exceeded, the crawler 814 will place a deletion request for the connection into a queue. This queue is read by PM 810. When PM 810 reads the delete request, it will delete the connection and reclaim resources. The only difference between a delete scheduled by a FIN and that prompted by a timeout is that, in a delete prompted by a timeout, a new packet can arrive after the expiration of the timeout period, but before PM 810 is aware that a timeout has occurred. In this situation, PM 810 will handle the packet in the normal manner and will update the crawler database 826 with a new timeout period. The actual deletion will only occur when the delete request is read from the queue.

If a race condition occurs, whereby a packet arrives after the timeout occurs, but before the BLT 804 has invalidated the corresponding entry in the KRCAM 820, PM 810 will drop the packet when it detects that the TCB is invalid.

When a reset packet is received, for an established connection, the crawler 814 schedules the TCB for deletion. When the delete request is read by PM 810, the resource reclamation process described above and illustrated in FIG. 27 is performed.

Figure 28:
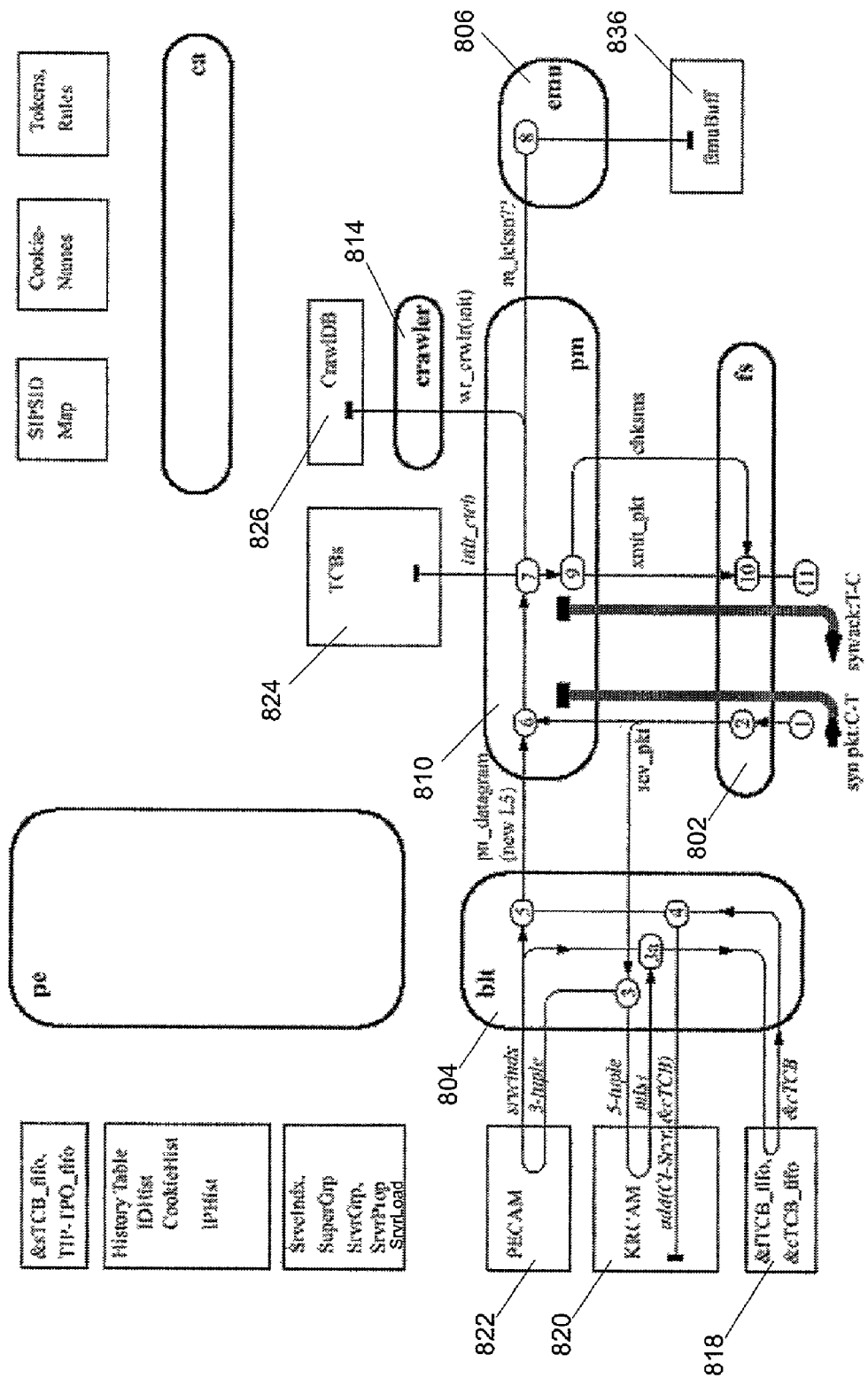
FIG. 28 illustrates the flow of the initial L5 client SYN packet through the implementation of FIG. 8.

The flow of control through the system of FIG. 8 during the lifetime of a layer 5 connection will now be described. Referring to FIG. 28, the description begins with the flow of the initial layer 5 SYN packet through the system. The major steps which are involved in the flow of this packet through the system are set forth below. Each step is numbered with a corresponding identifying numeral which appears in FIG. 28.

1) A SYN packet arrives from a client.

2) FS 802 performs error checking on the entire packet before forwarding it.

3) BLT 804 snoops the packet as it is passed to PM 810 and extracts the information it needs. Then it uses the 3-tuple of (dest IP, dest port, protocol) to reference the PECAM 822, and determine the requested service. In this example, the service is supported, so the PECAM 822 will return the service index for the requested service, L5, and the application class. Simultaneously, BLT 804 uses the 5-tuple formed by (src IP, dest IP, src port, dest port, protocol) to read the KRCAM 820. Because this is a new connection, the KRCAM 820 read will return a null value. The BLT 804 then uses the output of the PECAM 822 to determine that the requested service is for an L5 connection. It then retrieves an &cTCB from the &cTCB_fifo 818.

4) The pair (5-tuple, &cTCB) is added to the KRCAM 820.

5) The &cTCB is then combined with the service index to form a datagram, which is sent to PM 810. Note that there is no bind request sent to PE 812 at this time, sine this is an L5 connection, and the layer 5 content must be received and analyzed before a server can be chosen and allocated to the connection by PE 812.

6) When PM 810 sees the received packet, it waits until the datagram arrives from BLT 804. Because the datagram indicates this is a new L5 connection, PM 810 can proceed immediately to processing the datagram because it knows that any corresponding server bind from PE 812 will be deferred. In addition, PM 810 forwards any data in the packet to EMU 806 for buffering in EmuBuff 836.

7) PM 810 uses the &cTCB to reference and initialize in database 824 a client TCB and a corresponding entry in crawler database 826. (Note that a TCB for the server-side portion of the connection is not initialized at this time.). In particular, PM 810 initializes certain fields in the TCB for the client-side portion of the connection to the following values:

| Field | Value Initialized To |
| --- | --- |
| C -> T window size (field 1316 in FIG. 13A) | set to fixed value corresponding to EMU buffer size |
| C ->: T ack# | set to C -> T seq# arriving with the packet |
| T -> C seq# (field 1314 in FIG. 13A) | assigned by PM 810 to number such as client's ISN |

PM 810 also sends a lock sequence number message to EMU 806, indicating the sequence number space to be used for incoming client data, i.e., the C→T sequence number space. In addition, PM 810 selects a number, such as the client's ISN, which will be the initial sequence number data from the system to the client, i.e., the T→C sequence number space. This is saved in the client TCB (field 1314 in FIG. 13A).

8) EMU 806 initializes the sequence number associated with data sent from the client.

9) PM 810 constructs a SYN/ACK packet to send to the client. PM 810 computes IP and TCP checksums, and sends the same to FS 802. It also computes, as the acknowledgement number, the sequence number sent from the client plus one (the SYN from the client is counted). The sequence number for the T→C connection is the value chosen by PM 810 and stored in the client TCB.

10) Note that PM 810 does not pre-pend this packet with an add (as it did for an L4 SYN packet) because no server connection has been established.

11) FS 802 combines the packet with the checksums and sends it out the transmit port.

Figure 29:
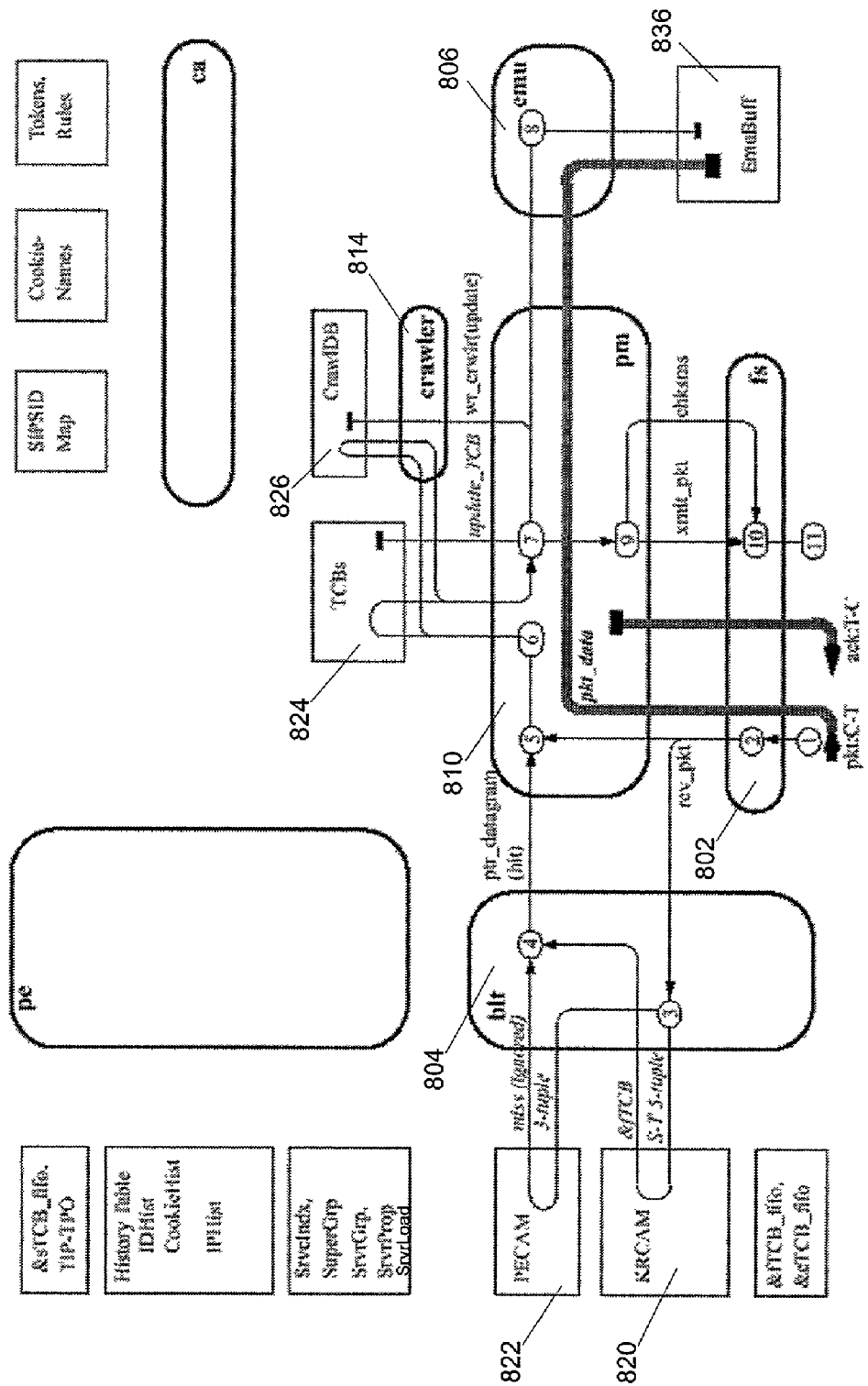
FIG. 29 illustrates the flow of a subsequent L5 client packet through the implementation of FIG. 8 assuming in-line ack mode is in effect.

Referring to FIG. 29, the flow of subsequent layer 5 client packets through the system (with in-line acking and in order packet arrival assumed) will now be described. The major steps which are involved in the flow of this packet through the system are set forth below. Each step is numbered with a corresponding identifying numeral which appears in FIG. 29.

1) A packet arrives from a client.

2) FS 802 performs error checking on the entire packet before forwarding it.

3) BLT 804 snoops the packet as it is passed from FS 802 to PM 810. BLT 804 extracts the 5-tuple of (src ip, src port, dest ip, dest port, protocol) and uses this key to search the KRCAM 820 for a TCB pointer. Because the client-system connection was added to the KRCAM 820 when the client SYN packet was processed, the seek hits and the &cTCB is retrieved. A simultaneous read of the PECAM 822 is also performed.

4) Since the search of the KRCAM 820 is successful, the results of the search of the PECAM 822 are not used. The &cTCB obtained through the search of the KRCAM 820 is used to assemble a datagram to PM 810 to advise it of the search hit.

5) When it receives the datagram, PM 810 immediately begins processing the datagram since it realizes the received packet relates to an existing L5 connection, and that any server allocation decision from PE 812 will be deferred.

6) PM 810 retrieves the TCB for the client-side connection from database 810. If a server bind to this connection has occurred, PM 810 also retrieves the TCB for the server-side portion of the connection. In addition, PM 810 also fetches the crawler entry associated with the client TCB.

7) PM 810 determines that the new data is contiguous and ordered with respect to any data which has previously arrived from the client, and that acknowledgements need not be deferred. PM 810 makes any needed updates to the client TCB. It then writes a copy of the layer 5 content of the received packet, along with a copy of both the server and client TCBs to a buffer to EMU 806 (which in turn stores this information in a buffer allocated to the connection in EmuBuff 836). PM 810 also updates the client- and server-side TCBs in database 824, and updates the crawler entry in database 826 associated with the client. Finally, PM 810 proceeds to construct an ACK packet for the client without assistance from EMU 806. More specifically, PM 810 retrieves the IP address, IP port, TCP port and TCP protocol from the client TCB. It sets the acknowledgement number to the previous T→C acknowledgement number plus the amount of data which has arrived. It sets the sequence number to that last sent to the client since the ACK packet previously sent to the client does not consume any sequence space. If a server has not been bound, then the sequence number corresponding to the start of the T-C space plus one is sent.

8) EMU 806 places the data it receives into the buffer associated with &cTCB which has been allocated in EmuBuff 836. It uses the C→T sequence number to place the data in the correct location in the buffer. As the data is placed into the buffer, it is parsed to determine if a complete http header has been received. (Here, it is assumed a complete header has not been received yet.) EMU also stores in the buffer copies of the client- and server-side TCBs sent with the data.

9) PM 810 assembles the outgoing ACK packet, and sends the same to FS 802. PM 810 also computes checksums for the packet, and sends these to FS 802 separately.

10) FS 802 combines the packet with the corresponding checksums.

11) FS 802 sends to the packet out through its transmit port.

Figure 30:
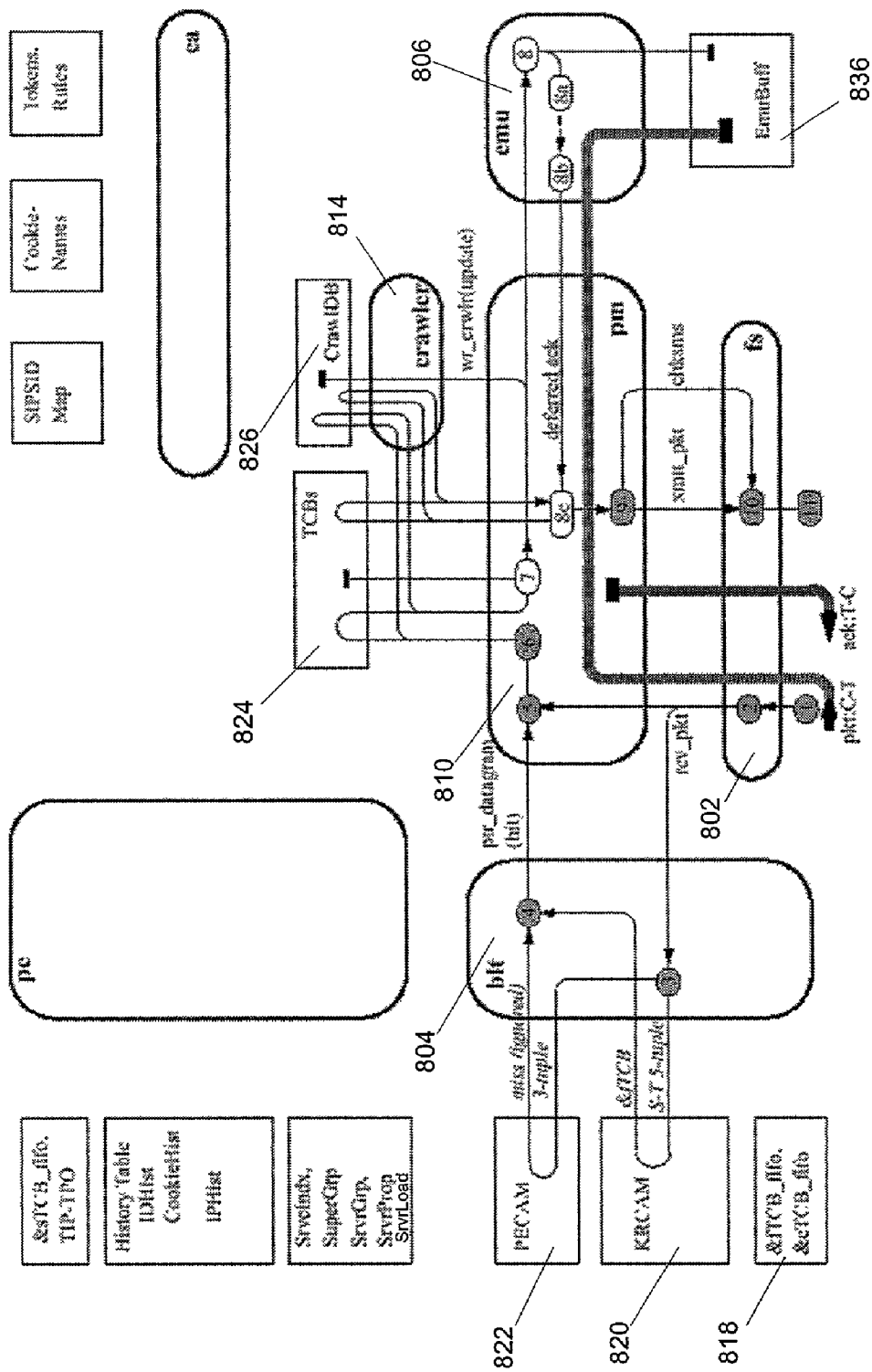
FIG. 30 illustrates the flow of a subsequent L5 client packet through the implementation of FIG. 8 assuming default ack mode is in effect.

Referring to FIG. 30, the flow of subsequent layer 5 client packets through the system (with deferred acking and out of order packet arrival assumed) will now be described. The steps which are identical to those involved assuming an in-line acking mode of processing are shaded in FIG. 30, and only the steps which differ from the in-line acking mode are described below. Each step is numbered with a corresponding identifying numeral which appears in FIG. 30.

7) PM 810 determines that this connection is in deferred ack mode. (This can occur for one of two reasons. First, when new data in this packet is not left-wise contiguous and ordered with respect to data which has previously arrived from the client (including the SYN packet). Second, when the connection was already in deferred ack mode because a previous packet of data had not been left-wise contiguous. Once a connection enters deferred ack mode, it remains in this mode until it is terminated.) PM 810 updates the crawler and TCB database entries as it does when in in-line ack mode. However, it does not directly generate an ACK packet to be sent to the client. Instead, it transfers data to EMU 806, with a request that EMU 806 perform a deferred acknowledgement to the client.

8) EMU 806 parses and stores the incoming data in the buffer allocated to it in EmuBuff 836. It also stores the client- and server-side TCBs in this buffer. In addition, EMU 806 determines how much contiguous data has arrived and, hence, the ack number which can be returned to the client.

8a) EMU 806 then constructs a request to assemble an acknowledgement packet which identifies the connection and the acknowledgement number. This request is placed in a queue within EMU 806.

8b) After some period of time, the request is sent to PM 810.

8c) When PM 810 receives the request, it constructs an ACK packet to send to the client. PM 810 first reads the sequence number it will send from the server-side TCB stored in database 824. (This information is obtained from the server-side TCB stored in database 824 rather than the copy stored in EMU 806 since there are circumstances where the latter may become stale, i.e., when the server sends a new packet with data to the client, resulting in an update to the server-side TCB stored in database 824 but not in EMU 806.). Other information required to construct the packet for the client may come from either the client-side TCB stored in database 824 or in EMU 806.

Figure 31:
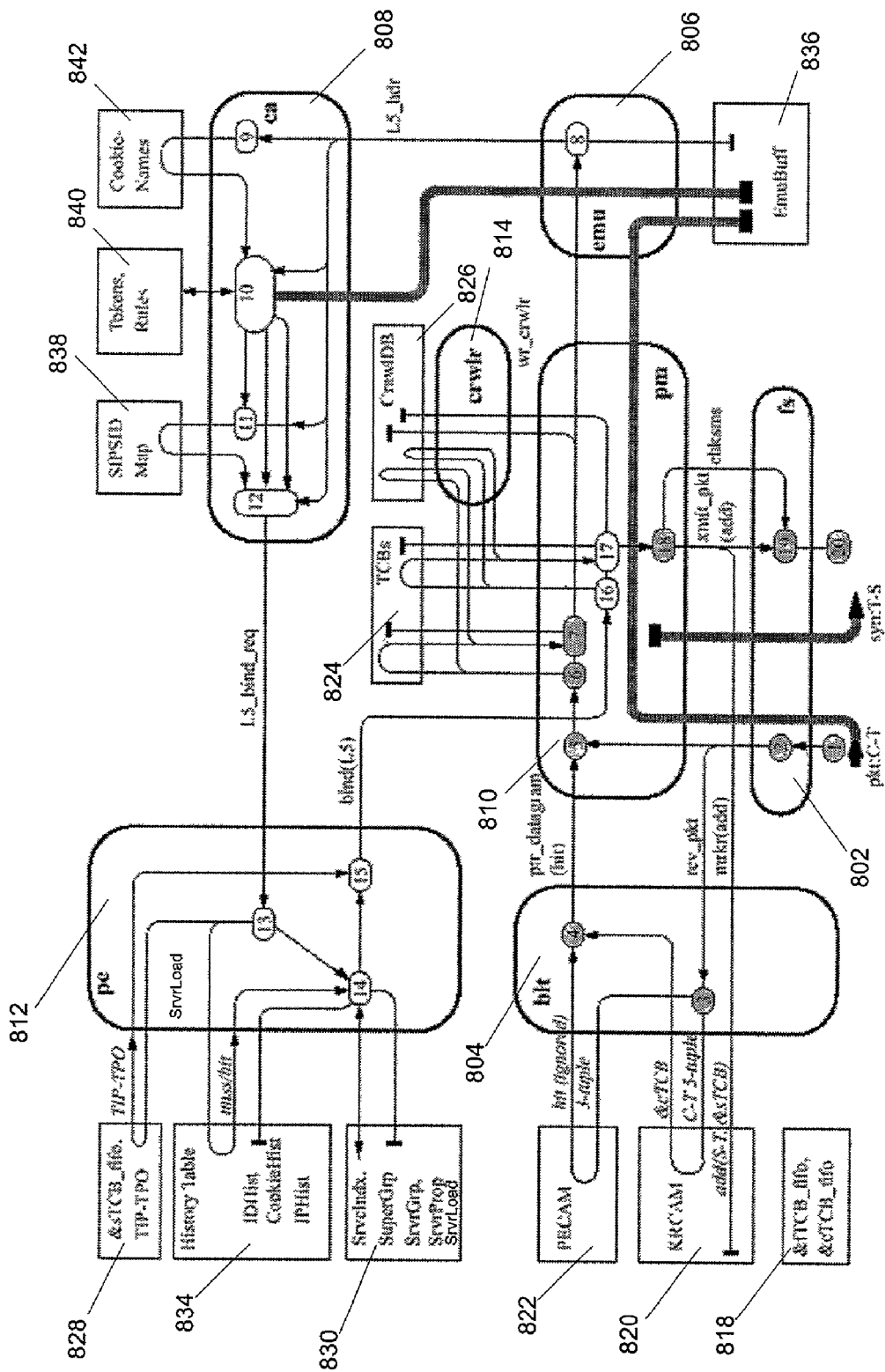
FIG. 31 illustrates the flow of an L5 packet which completes a header through the implementation of FIG. 8.

Referring to FIG. 31, the processing which occurs upon receipt of a L5 packet which completes a header will now be described. For clarity, the T→C acknowledgement which occurs upon receipt of the packet is not described here, but is assumed to have occurred as shown in either FIG. 29 (in-line ack mode) or FIG. 30 (deferred ack mode). The steps which are shown shaded in FIG. 31 are assumed to occur as described in either FIG. 29 or 30, depending on which ack mode is in effect. Only the additional processing steps, i.e., steps 8-17, are described below. Each of these steps is numbered with a corresponding identifying numeral which appears in FIG. 31.

8) EMU 806, while parsing the data, discovers that it now has a complete header. At this point, the entire header is sent to CA 808 along with a copy of the client-side and server-side TCBs. Note that the header and data remain in the EMU buffer in EmuBuff 836 so they can later be sent to the server which is ultimately allocated. Also, non-header data is not forwarded to CA 806.

9) CA 808 obtains the service index which was read from the PECAM 822 when the client first requested service. CA 808 uses this index to access the Cookie-Names database 842 and look up a cookie name and instructions on how to handle cookies.

10) CA 808 then uses the following to parse the cookie header:

the cookie name and instructions retrieved in step 9;

knowledge of the protocol used (currently only http or SSL);

definitions of tokens in the token database (identified with numeral 840 in FIG. 31); and rules which indicate which strings of tokens are recognized (obtained from the database 840 in FIG. 31).

The CA 808 produces the following output at this point:

whether this is an SSL connection (and, if so, the session id);

whether there is a cookie and cookie value associated with the service; whether the header matches a regular expression specified in the config (and assoc service index).

11) If cookie self identification mode is on, then the cookie_value and the service index are combined to produce a key. This key is used to reference the SIPSID table (the database 838 identified in FIG. 31). If an entry is present, it is a server_id which identifies a specific server.

12) CA 808 assembles the results of all of the various searches it has conducted into an L5 bind request for PE 812. (The table of FIG. 32 shows the information which is included with this bind request. Note that the cookie modes are mutually exclusive.) See previous discussion relating to CA 808 for more detail on the L5 bind request from CA 808. In addition, CA 808 forwards to PE 812 the client-side TCB, the service index, and other information sent from EMU.

13) When the PE 812 receives the L5 bind request, it retrieves a TIP, TOP pair from TIP-TPO_fifo 828, and also obtains an &sTCB from &sTCB_fifo 828. Finally, if CA forwarded a valid session_id, cookie_id or server_id, then PE 812 access History Table 834 to see if a valid entry exists.

14) At this point there are several ways that the server can be allocated. As shown in the table of FIG. 32, an SSL session ID will take highest precedence, followed by a valid history referring to a previously bound server. If there is no valid history (either there is no cookie or there is no entry), then a service index will be used to obtain a server (using the process illustrated in FIG. 25). If there is a valid service index obtained by cookie hashing, then that service index will be used for server allocation. Otherwise, the result of the header parsing will be used for server allocation. If there is a cookie and no valid entry in the History Table 834, then PE 812 attempts to add a valid history entry after the server has been chosen. However, if there is no room in the area of the table reference by the cookie, then no entry is written into the History Table 834. (See previous discussion relating to CA 808 for more detail).

15) At this point the IP address and related server information is combined with the TIP-TPO to produce an L5 bind message, which is forwarded to PM 810.

16-17) When PM 810 receives the L5 bind message, it proceeds to set up a connection with the chosen server so that the client data (which is still buffered in EMU 806) can be forwarded to the server. Therefore, PM 810 initializes a server TCB, and updates the crawler entry associated with the server-side connection. Then, it pre-pends an add to a SYN packet which is to be sent to the server. The BLT 804 will snoop the packet when it is sent to FS 812, recognize the add, and, in response, will add the &sTCB, 5-tuple pair to KRCAM 820.

Figure 34:
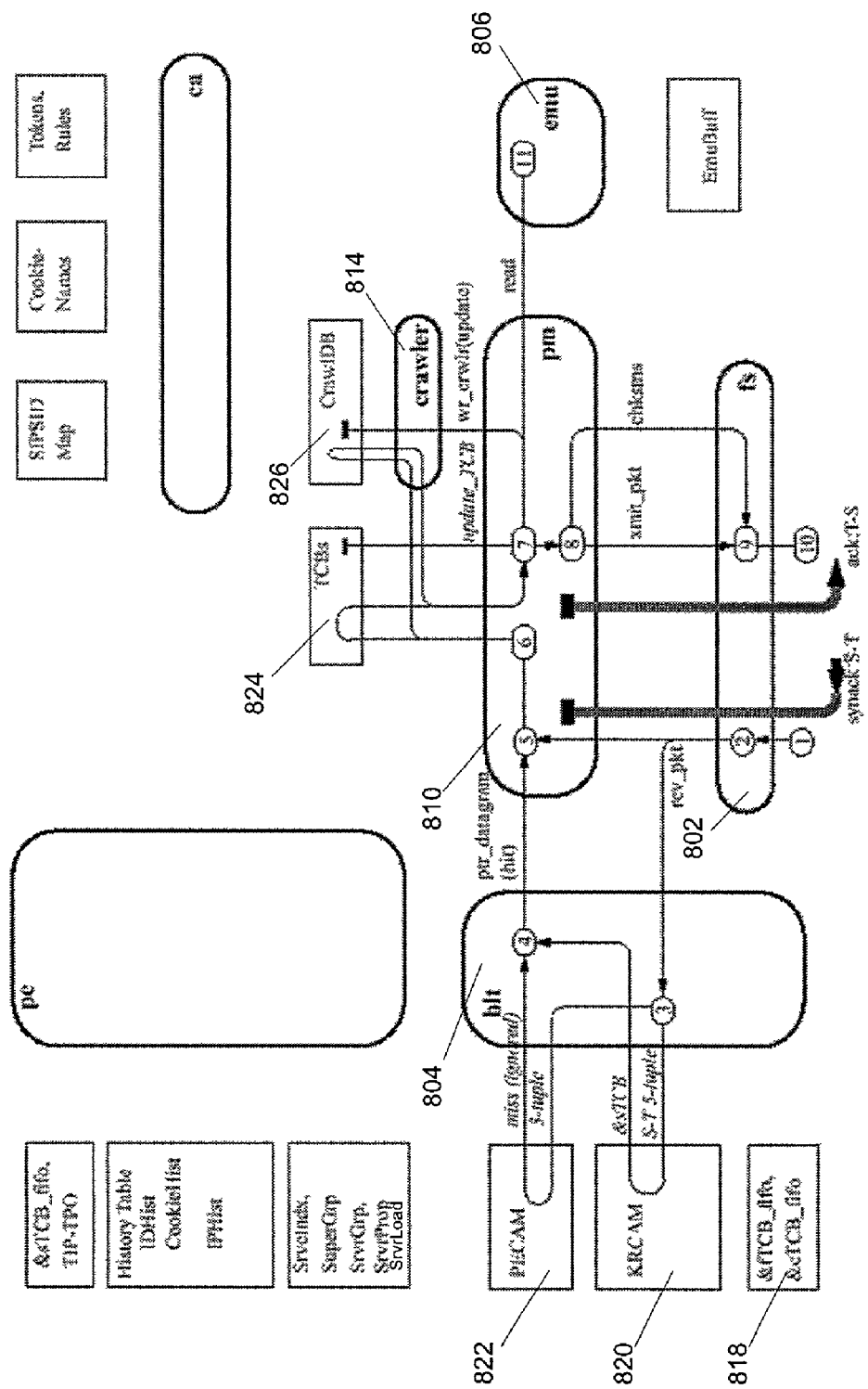
FIG. 34 illustrates the flow of an L5 server SYN/ACK packet through the implementation of FIG. 8.

Referring to FIG. 34, the process of completing the L5 server handshake will now be described. This process includes both processing a SYN/ACK from the server, and sending an ACK to the server responsive to the SYN/ACK. The major steps which are involved in this process are set forth below. Each step is numbered with a corresponding identifying numeral which appears in FIG. 34.

1-5) When the SYN/ACK packet is received from the server, the system begins to process the packet as with any other packet. In particular, the first five steps of handling are identical to those which occur in relation to any incoming packet from a connection which already has a valid entry in KRCAM 820. A search of the KRCAM 820 yields a hit, and BLT 804 sends the &sTCB that is retrieved to PM 810.

6) PM 810 will fetch the server-side TCB for the connection, and, because it is bound to a client-side, it will also fetch the client-side TCB. Finally, the crawler entry associated with the server-side TCB is fetched. When the server-side TCB is examined, PM 810 will realize that the incoming packet is a server acknowledgement of a client SYN packet requiring an L5 connection.

7) PM 810 realizes that no information need be forwarded to the client. However, PM 810 also realizes there is client information which must be sent to the server. Therefore, it sends a read request to EMU 11.

8-10) PM 810 completes the connection handshake by having an ACK sent to the server through FS 812.

Figure 35:
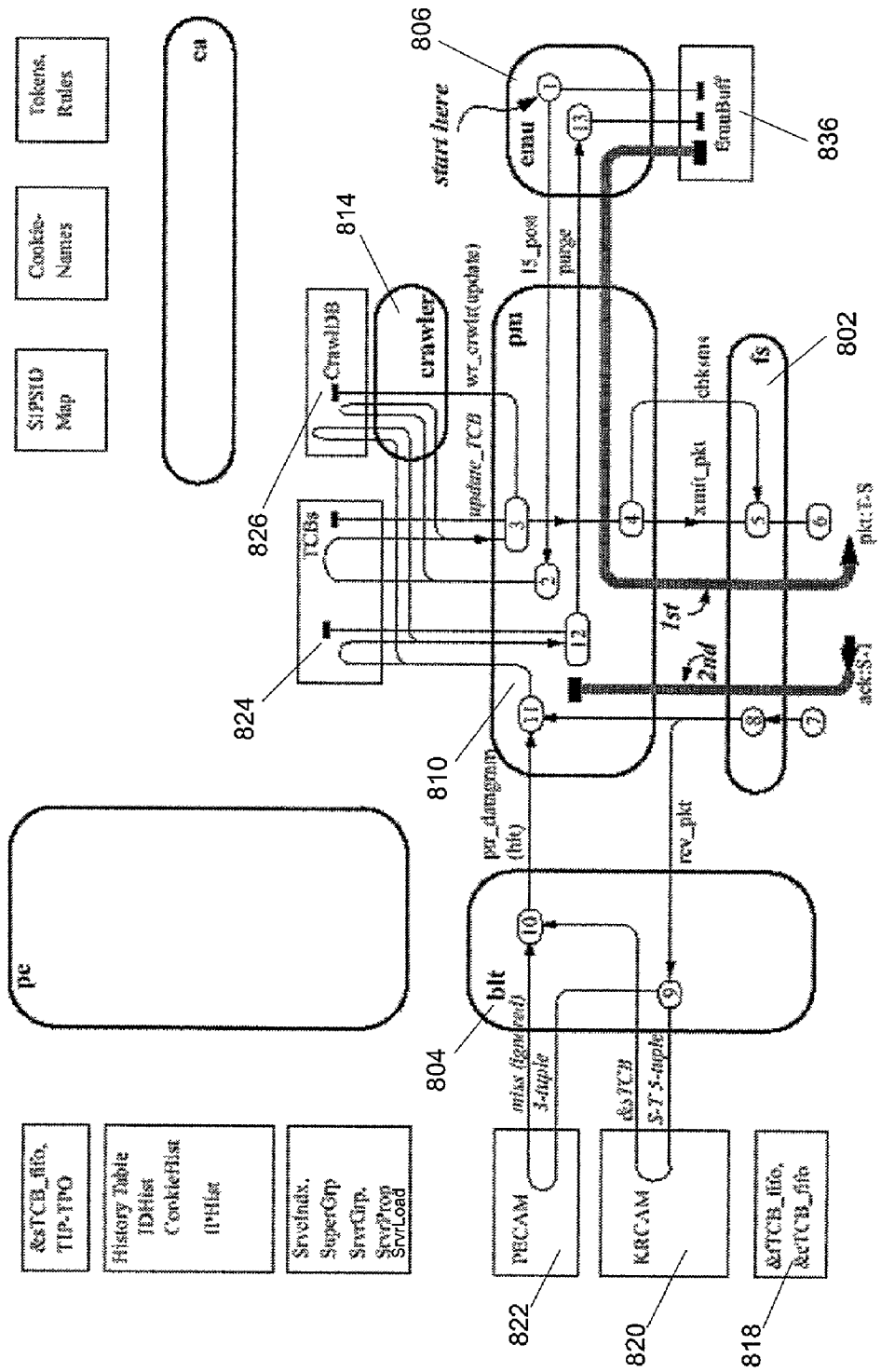
FIG. 35 illustrates the process of transferring L5 content to the server without data being present in the server ack in the implementation of FIG. 8.
Figure 37:
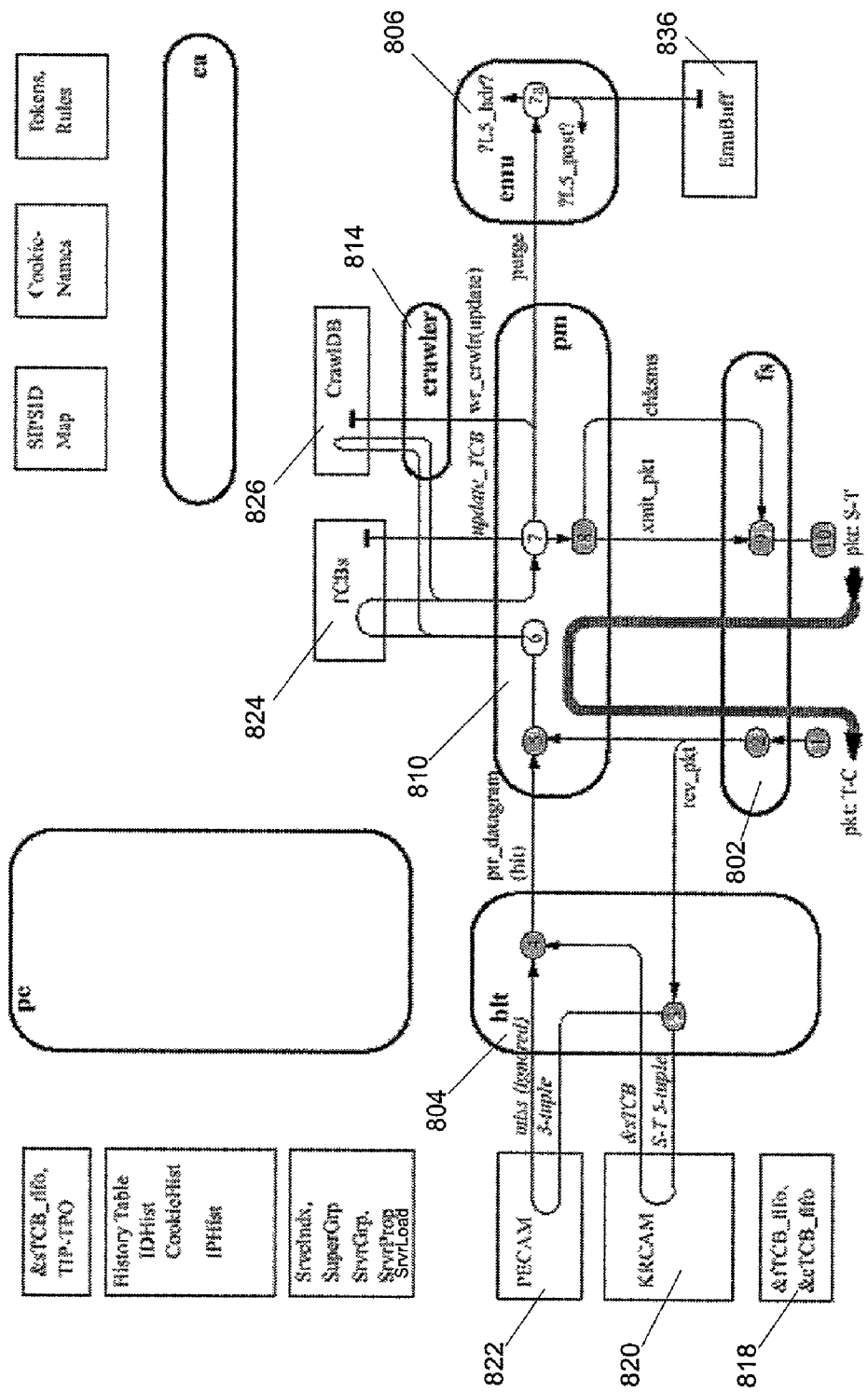
FIG. 37 illustrates the processing of L5 server packets which require forwarding to the client in the implementation of FIG. 8.

11) EMU 806 then processes the read request as described in relation to FIG. 35.

Referring to FIG. 35, the process of transferring L5 content to the server without data being in the server ACK will now be described. The major steps which are involved in this process are set forth below. Each step is numbered with a corresponding identifying numeral which appears in FIG. 35.

1) The process of transferring L5 content to a server begins when EMU 806 realizes that buffered data should be sent to PM 810. There are two reasons why this may occurs:

EMU 806 receives a read request from PM 810

EMU 806 receives a purge request from PM 810 and there is L5 data (not header) in the EMU buffer Until EMU 806 receives a read/purge request from PM 810, it has no way to know that there is a server ready to accept data. A purge request from PM 810 to EMU 806 occurs only after a system-server connection has been established.

EMU 806 then begins to transfer data from the EmuBuff 836 to PM 810 with an L5 post command appended.

2) When PM 810 receives the L5 post command, it retrieves any additional information required from the TCB database 824.

3-6) PM 810 then updates the corresponding entries in the TCB and crawler databases 824, 826. It then assembles and arranges to have sent to the server a packet encapsulating the data sent to it from EMU 806.

7-11) After a time, an acknowledgement from the server arrives, and undergoes the same connection recognition sequence as for any other packet.

12) PM 810 recognizes that this is an acknowledgement, and fetches the corresponding TCBs. It then determines that there is no data within the packet, and therefore no need to forward a packet to the client. However, PM 810 also determines if the ack number has increased, and thus whether the data has been received by the server. If so, PM 810 sends a purge command to EMU 806.

13) Upon receiving the purge command, EMU 806 marks the corresponding space in EmuBuff 836 as available. EMU 806 then takes the action indicated in the table illustrated in FIG. 36.

Referring to FIG. 36, the process of forwarding L5 server packets to the client will now be described. The major steps which are involved in this process are set forth below. Each step is numbered with a corresponding identifying numeral which appears in FIG. 36.

1-5) The first five steps are the same as for any packet arriving for an established connection.

6) PM 810 fetches both the server and client TCBs from database 824 along with the crawler entry associated with the server-side TCB.

7) As was the case with L4 traffic, PM 810 updates the TCBs and crawler database entries. In addition, because this is an L5 connection, PM 810 determines whether the server has acknowledged data which is currently stored inside an EM buffer. If this is the case, a purge command is sent to EMU 806.

7a) When EMU 806 receives the purge command, it must determine whether there is additional data to be processed. If additional non-header data remains which needs to be processed, EMU 806 will send an L5 post command to PM 810, whereupon the sequence of events illustrated and described in relation to FIG. 35 ensues. If all data has been sent to the server, but another header is available, EMU 806 sends another L5 header to CA 808.

8-10) PM 810 assembles the packet for sending to the client, with appropriately translated ack and sequence numbers. It then forwards it to FS 802 for transmission to the client.

Once an L5 connection has been established at both ends, a client packet which arrives at the system can trigger multiple activities. Assuming an entire server response is received by the client before a new header is sent by the client (which ensures that all data has been received from the current server and allows a clean shutdown of the server-side connection while keeping the client-side connection open), the most complex response required to a client packet occurs in the following circumstances:

The client has received all of the data it will receive from the server for the last request sent.

The client is acknowledging the receipt of the data and the ack#>prev_ack#.

The client is sending a new, complete header with the data.

The client connection is not in deferred ack mode.

The new request will be rebound to a different server.

Figure 38:
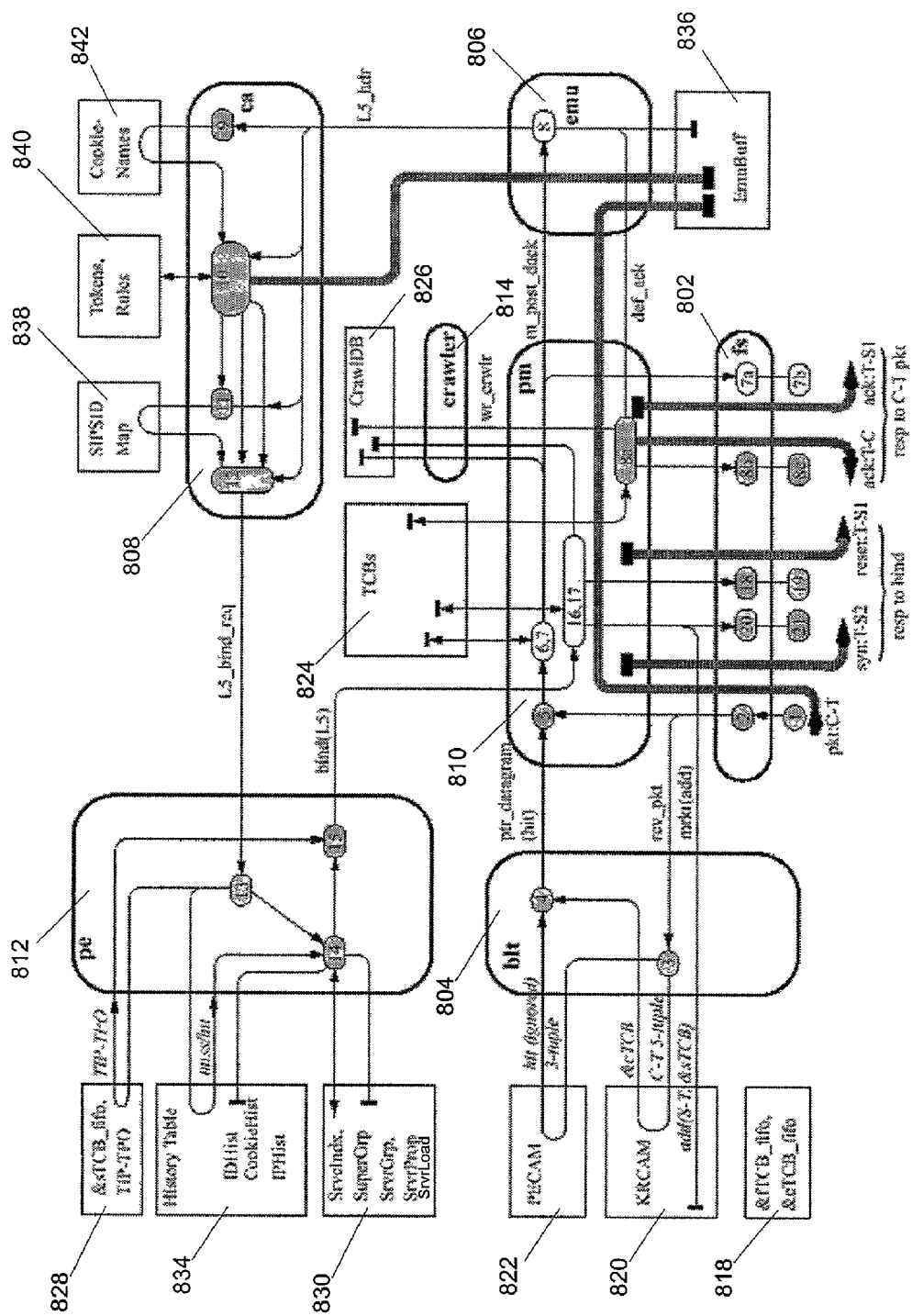
FIG. 38 illustrates the processing of L5 client packets which require re-binding to a different server in the implementation of FIG. 8.

The sequence of activities which ensue will now be described with reference to FIG. 38. This sequence is very similar to the sequence which occurs during the binding of the original server. However, in this figure, to omit clutter, the steps of sending the checksums to FS 802 and performing TCB accesses are consolidated into a single arrow. Again, these steps are numbered using corresponding reference numerals which appear in FIG. 38.

1-5) The first five steps relating to processing the incoming client packet are the same as for any incoming connection.

6-7) At this point the behavior diverges from the previous packet handling behavior. One key reason is that two ack packets must be generated, one for the T-C connection and one for the T-S connection. To avoid having to send out two packets simultaneously, PM 810 places the client into a deferred ack mode, by sending a post with a deferred ack request to EMU 806. PM 810 then assembles the T-S ack, and sends the same to FS 802 for transmission to the client.

7a,b) The T-S ack is sent so that the server is notified that the client has received its data.

8) EMU 806 handles the post and deferred ack request in the normal manner. In response to the deferred ack request, EMU 806 returns a deferred ack to PM 810. Since the client request in this example contained a complete header, EMU 806 will, therefore, forward the header to CA 808.

8a,b,c) PM 810 performs the normal processing associated with a deferred ack and sends an ACK to the client to indicate that the C-T data was received.

9-15) CA 808 and PE 812 perform the standard processing required to process a header, and, responsive thereto, allocate a server. PE 812 then issues an L5 bind request to PM 810.

16-17) Since the client is already bound to a server, PM 810 must terminate the connection with this server to allow the client to be bound to a new server. To accomplish this, PM 810 synthesizes a reset packet and forwards it to the server. Next, PM 810 establishes a connection with the newly bound server. To do this, it constructs a SYN packet and forwards it to FS 802 for transmission to the server.

18-20) FS 802 forwards the reset to the original server, and the syn packet to the newly bound server.

The termination of an L5 connection can be initiated by any one of the following:

The server sends a FIN packet

The client sends a FIN packet

The client sends a new header (this terminates only the T-S connection of the server bound to the client)

The crawler 814 times out the connection and PM 810 decides the connection should be terminated The server sends a RESET packet The client sends a RESET packet In response to any of these events, PM 810 sets corresponding timeout entries for either or both of client-side and server-side L5 connections. The possible timeout values are set at system configuration time, and are illustrated in FIGS. 39A-39B. In response to the expiration of the timeout, the system will proceed to reclaim one or the other of the client-side and server-side resources.

Figure 40:
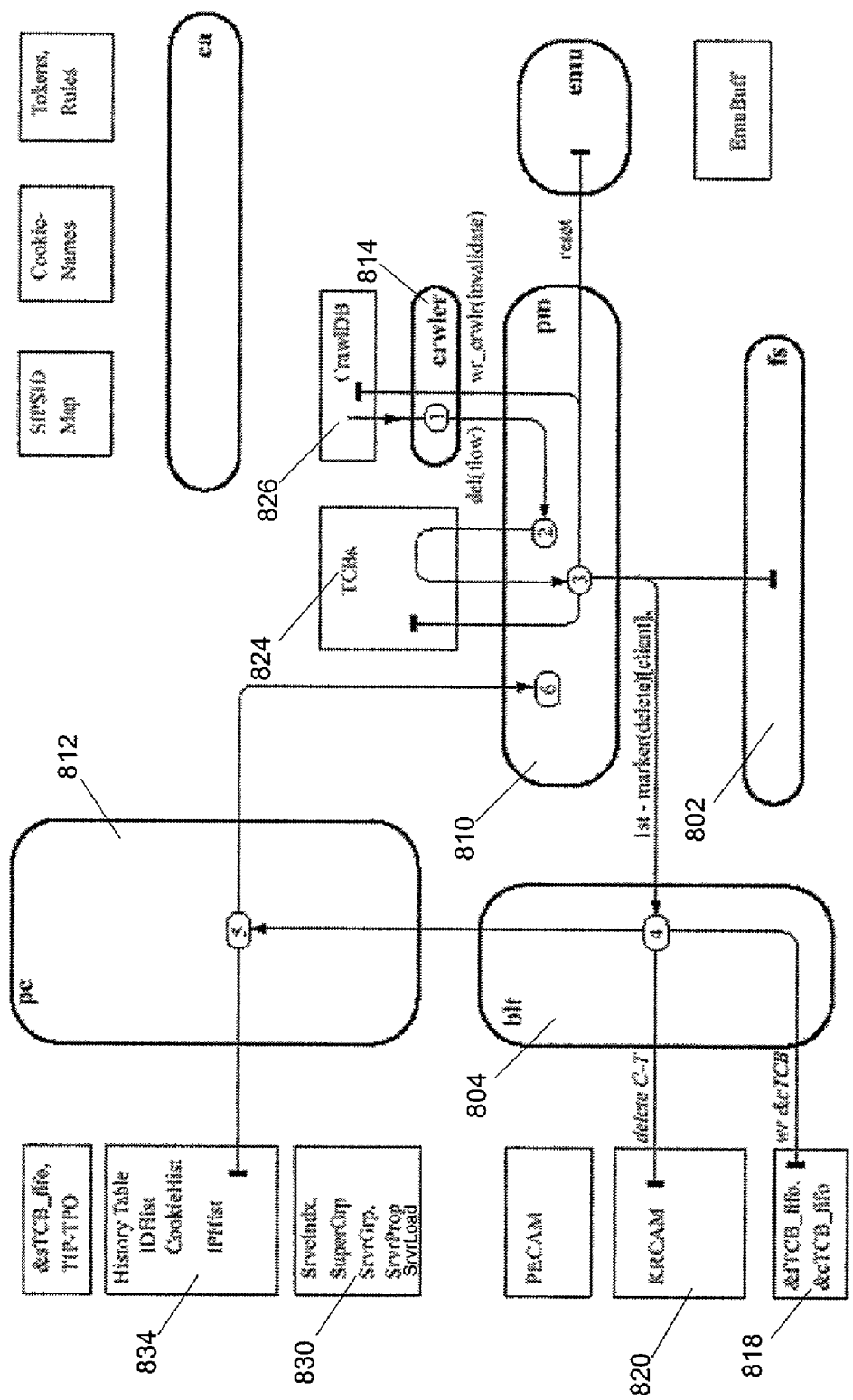
FIG. 40 illustrates the process of reclaiming L5 client-side resources in the implementation of FIG. 8.

Referring to FIG. 40, the process of reclaiming L5 client resources will now be described. Again, the major process steps are described keyed to corresponding reference numerals which appear in FIG. 40.

1) The crawler 814, while trawling through its database, determines that the reclaim_now timer for a client-side TCB has expired. It then sends a delete request to PM 810.

2) PM 810 retrieves the client-side TCB.

3) PM 810 then
   a) invalidates the corresponding entry in the crawler database 826;
   b) resets the EMU buffer; and
   c) sends a clients-side marker(delete) to FS 802.

4) BLT 804 snoops the client-side marker(delete), extracts the 5-tuple, and deletes the corresponding entry in KRCAM 820. BLT 804 also recycles the &cTCB contained in the marker(delete) packet, and forwards the marker(delete) to PE 812.

5) PE 812 forwards the marker(delete) to PM 810. PM 810 thus verifies that the marker(delete) was seen by both BLT 804 and PE 812.

Figure 41:
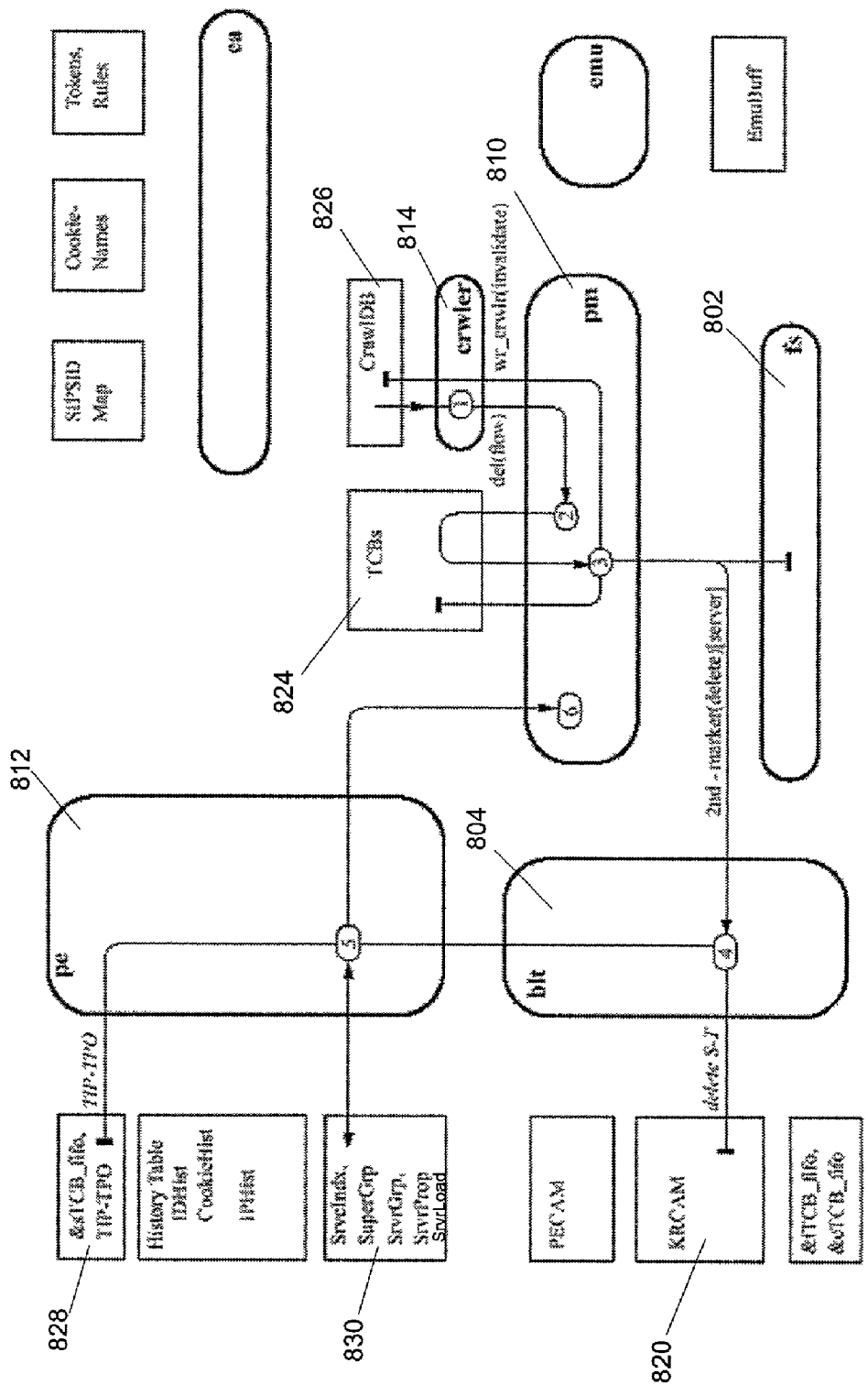
FIG. 41 illustrates the process of reclaiming L5 server-side resources in the implementation of FIG. 8.

Referring to FIG. 41, the process of reclaiming L5 server resources will now be described. Again, the major process steps are described keyed to corresponding reference numerals which appear in FIG. 41.

1) Crawler 826, while trawling through its database 826, determines that the reclaim_now timer for a server-side TCB has expired. It then sends a delete request to PM 810.

2) PM 810 retrieves the server-side TCB.

3) PM 810 then sends a server-side marker(delete) to FS 802.

4) PM 810 verifies that the connection is complete and marks the TCB as invalid. It then sends one marker(delete) packet to BLT 804. (FS 802 will also receive the markers, but will discard them). At the same time this marker is sent, PM 810 invalidates the TCB and crawler entries associated with the connection.

5) BLT 804 snoops the server-side marker(delete), extracts the 5-tuple and deletes the corresponding entry in KRCAM 820. BLT 804 also forwards the marker(delete) to PE 812.

6) When PE 812 receives the server-side market(delete), it updates the SrvrLoad and SrvrProp tables to reflect the reduced load on the server. Also, it recycles the TIP-TPO address pair.

7) Every marker(delete) received by PE 812 is forwarded to PM 810. PM 810 uses this information to verify that the marker(delete) was seen by both BLT 804 and PE 812.

In one example, a polled length transaction bus is employed in the implementation of FIG. 8. The bus is such that arbitration for control of the bus amongst the various agents that have access to it is determined responsive to the length of the data to be transmitted by the agent. Depending on the circumstances, the result may be increased throughput. Consider an example where a target on the bus does not have room for a packet of size N, but has room for several smaller packets of size M. If several M-sized packets are queued behind an N-sized packet, in order to increase throughput, the bus may allow the M-sized packets to bypass the N-sized packet. The target would then be responsible for re-ordering the packets later.

In another example, the system keeps track of the difference between the number of outstanding client requests at a given protocol layer, e.g., layer 4, layer 5, and the number of outstanding server requests at a given protocol layer. If the difference exceeds a prescribed limit, indicating that a resource management problem exists because client requests are not generating a sufficient number of server requests, the system automatically stalls further incoming traffic to allow the establishment of server connections to proceed and the problem to hopefully resolve itself.

In a third example, a housekeeping mode of operation is entered into when system load has increased to the point that requests for new connections cannot be expeditiously serviced by the system. In this mode of operation, the system continues to service existing connections, but rejects requests for new connections. Various methods for implementing this mode are possible, including enabling hysteresis of layer 4 or 5 service levels, implementing a programmable limit on the number of incoming packets which are waiting for service, and implementing a static limit on the number of outgoing packets waiting to be processed. Through appropriate setting of programmed conditions, the mode can be automatically engaged or disengaged.

In a fourth example, the &sTCB_fifo is implemented in SDRAM which is capable of maintaining pointers for 32 IP addresses, and 64K ports for each IP address, or a total of 32×64K (2048K) connections.

Finite State Machine Implementation Example

Referring to FIG. 8, the FS 802, BLT 804, EMU 806, CA 808, PM 810, PE 812, and crawler 814 may each be implemented in hardware as one or more finite state machines. Moreover, the finite state machines may in turn each be implemented in a variety of forms. Some examples of the implementations which are possible include a field programmable gate array (FPGA), application-specific integrated circuit (ASIC), application specific standard product (ASSP), CPLD, or EPLD implementations. Such hardware implementations are advantageous since, compared to pure software implementations, for a moderate cost in terms of loss of flexibility, they avoid the bottlenecks of pure software implementations, have a higher throughput, and a scaleable to applications requiring a much greater number of simultaneous connections.

The control and state registers for one example of finite state machine implementations of each of the foregoing modules are described and illustrated in U.S. Provisional Application No. 60/355,922, previously incorporated herein by reference.

Figure 42:
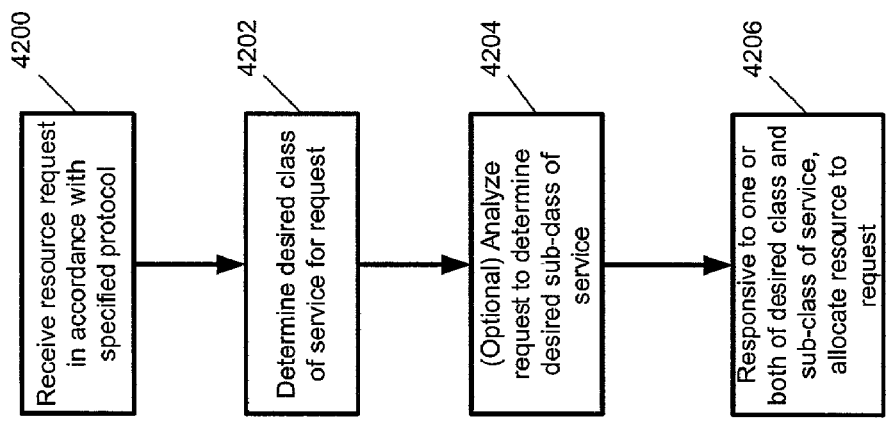
FIG. 42 is a simplified flowchart illustrating an embodiment of a method of overall operation of the implementation of FIG. 8.

Referring to FIG. 42, a simplified flowchart of one embodiment of an overall method of operation according to the invention is illustrated. The method begins with step 4200, where a resource request is received in accordance with a specified protocol. The resource request may or may nor be in the form of a packet. Moreover, the specified protocol may or may not be the TCP/IP protocol.

The method proceeds to step 4202, which comprises determining a desired class of service for the request. The classes of service which are possible may or may not include layer 4, layer 5, layer 6, layer 7, or any combination thereof, classes of service. In one example, the desired class of service is represented by a Base Service Index (BSI). Moreover, one class of service may be determining that a resource has already been allocated to the request, and taking appropriate action in response thereto. For example, if the request is in the form of a packet, if a connection to a server already exists for the packet, then this step may comprises simply routing the packet to the destination called for by the existing connection in accordance with the specified protocol.

After step 4202, optional step 4204 is performed. In optional step 4204, the request is analyzed to determine a desired sub-class of service. In one example, this step comprises analyzing the content of a packet or data grouping associated with the request, and the desired sub-class of service is represented by a Content Analyzer Service Index (CSI). In one example, other information may be determined in this step, such as information relating to the implementation of persistence policies. Examples of such information include server ID derived from a cookie value in the packet or data grouping (used to implement self-identifying stickiness), a hash of a cookie value in the packet or data grouping (used to implement cookie hash stickiness), a cookie ID comprising a hash of a cookie value in the packet or data grouping (used to implement cookie ID based persistence), a SSL session ID comprising a hash of a content or message type field obtain from a https record layer (used to implement SSL session ID based persistence), and a client IP address (used to implement client-based persistence).

The method then proceeds to step 4206, which comprises allocating a resource to the resource request responsive to one or both of the desired class of service, and the desired sub-class of service. In one example, persistence-related information derived in step 4204 is also used to allocate a resource to the resource request.

In one configuration, if a persistence policy is applicable, a resource is allocated to the request based on application of the persistence policy, while, if a persistence policy is inapplicable, a resource is allocated to the request based on application of a load balancing policy.

Examples of the persistence policies which may be applicable include self-identifying stickiness, cookie hash stickiness, cookie ID based persistence, SSL session ID based persistence, and client based persistence.

Examples of the load balancing policies which may be applicable include round robin, weighted round robin, least connections, weighted least connections, utilization percentage, and priority based.

While various embodiments of the invention have been described, it will be apparent to those of ordinary skill in the art that many more embodiments and implementations are possible that are within the scope of this invention. For example, any combination of any of the systems or methods described in this disclosure are possible.

What is claimed is:

1. A system for handling one or more resource requests comprising:
    a protocol engine for receiving a resource request in accordance with a prescribed protocol;
    a classification engine for determining a desired class of service for the resource request;
    an interface engine for checking the resource request for errors, wherein the classification engine and the interface engine concurrently evaluate the resource request;
    an analysis engine for determining a desired sub-class of service for and responsive to the resource request; and
    a policy engine for allocating a resource to the request responsive to one or both of the desired class of service, and the desired sub-class of service;
    wherein the one or more resource requests are in the form of packets;
    wherein the interface engine checks a packet for errors;
    wherein the interface engine, if it detects an error in a packet, flushes the packet from the system before the packet is sent to its desired destination;
    wherein the classification engine derives one or more keys from a packet, and uses the same to determine the desired class of service for the packet; and
    wherein the classification engine uses a first key derived from the packet to access a database to determine if a connection already exists for the packet, and, if so, arranges to have the protocol engine forward the packet to the destination called for by the connection.

2. The system of claim 1 wherein the classification engine uses a second key derived from a packet to determine a service index for the packet.

3. The system of claim 1 wherein the resource allocated by the policy engine is a server.

4. The system of claim 3 wherein the protocol engine binds the server to an entity to create a connection.

5. The system of claim 1 wherein a resource allocated to the request is represented by a connection, which in turn is represented by a pointer having a 1-1 relationship with the connection, and pointing to a control block for the connection.

6. The system of claim 5 wherein a connection can be a client-system connection, a system-server connection, or a client-server connection.

7. The system of claim 5 wherein the control block having a 1-1 relationship with the connection can represent a client-system connection, a system-server connection, or a client-server connection.

8. The system of claim 5 wherein a connection, when created, is assigned a generation count, and a server is bound to the connection only if the generation count for the connection equals an expected value.

9. The system of claim 1 wherein a packet has a packet header that specifies the system as the destination of the packet, and the protocol engine modifies the packet header to specify a client or server as the destination of the packet.

10. The system of claim 1 wherein a packet has a packet header that specifies the system as the destination of the packet, and the protocol engine modifies the packet header to specify a client or server as the destination of the packet; and
    wherein the protocol engine determines the client or server as the destination for the packet from one or more control blocks for a client-server connection that exists for the packet.

11. The system of claim 1 wherein, for a first category of service, the system functions as a proxy for a server in relation to the packet, and, for a second category of service, does not function as a proxy for a server in relation to the packet.

12. The system of claim 1 wherein, for a selected category of service, the system buffers packets received from clients for assembly into larger data groupings, but does not do so in relation to packets received from servers for the selected category of service.

13. The system of claim 12 wherein, for a selected category of service, the system checks for contiguity in the assembly buffer for packets received from clients, but not for packets received from servers for the selected category of service.

14. The system of claim 1 wherein, for a first category of service, the system allocates a server to a packet responsive to content of a data grouping encapsulating the packet, while, for a second category of service, the system allocates a server to a packet responsive to information other than content of a data grouping encapsulating the packet.

15. The system of claim 1 wherein, for a first category of service, the system allocates a server to the packet after analyzing content of a data grouping encapsulating the packet to determine a desired sub-class of service for the packet, while, for a second category of service, the system allocates a server to the packet upon ascertaining the desired class of service for the packet.

16. The system of claim 1 wherein, for a selected category of service, the system acknowledges packets received from clients, but does not do so in relation to packets received from servers for the selected category of service.

17. The system of claim 1 wherein each of the engines are implemented in hardware, or a combination of hardware and software.

18. The system of claim 17 wherein each of the engines are implemented as one or more finite state machines.

19. The system of claim 1 wherein the desired class of service comprises a class of service at a layer in an applicable reference model corresponding to OSI layer four or higher.

20. The system of claim 19 wherein the desired class of service comprises a class of service at a layer in an applicable reference model corresponding to OSI layer six or higher.

21. The system of claim 1 wherein the desired sub-classes of service is based on content.

22. The system of any of claim 11, 14, or 15, wherein the first category of service comprises an OSI layer 5 class of service, and the second category of service comprises an OSI layer 4 class of service.

23. The system of any of claim 12, 13, or 16, wherein the selected category of service comprises an OSI layer 5 category of service.

24. A method for handling one or more resource requests comprising the steps of:
    receiving a resource request in accordance with a prescribed protocol;
    determining a desired class of service for the request;
    checking the resource request for errors while determining the desired class of service for the request;
    analyzing the request, and, responsive thereto, determining a desired sub-class of service for the request; and
    allocating a resource to the request responsive to one or both of the desired class of service and the desired sub-class of service;
    wherein a resource request is in the form of a packet, and the method further comprises
    checking a packet for errors, and, if an error is detected in the packet, flushing the packet before sending the packet to its desired destination;
    determining the desired class of service for a packet through one or more keys derived from the packet; and
    using a first key derived from the packet to access a database ad determine therefrom if a connection for the packet already exists and, if so, forwarding the packet to a destination called for by the connection.

25. The method of claim 24 wherein the resource is a server.

26. The method of claim 25 further comprising binding the server to an entity to give rise to a connection.

27. The method of claim 24 further comprising representing a connection to the resource by a unique pointer which points to a control block for the connection.

28. The method of claim 27 wherein a packet has a packet header, and the method further comprises modifying the packet header to specify a client or server as the destination of the packet.

29. The method of claim 24 wherein a packet has a packet header, and the method further comprises:
    modifying the packet header to specify a client or server as the destination of the packet; and
    determining the client or server as the destination for the packet from one or more control blocks for a client-server connection which exists for the packet.

30. The method of claim 24 further comprising, for a first category of service, functioning as a proxy for a server in relation to the packet, and, for a second category of service, not functioning as a proxy for a server in relation to the packet.

31. The method of claim 29 further comprising, for a selected category of service, buffering packets received from clients for assembly into larger data groupings, but not doing so in relation to packets received from servers for the selected category of service.

32. The method of claim 31 further comprising, for a selected category of service, acknowledging packets received from clients, but not from servers.

33. The method of claim 24 further comprising, for a selected category of service, placing packets received from clients in an assembly buffer, and checking for contiguity in the assembly buffer, but not doing so for packets received from servers for the selected category of service.

34. The method of claim 24 wherein the resource is a server and
    the method further comprises:
    binding the server to an entity to give rise to a connection; and
    assigning to a connection a generation count when the connection is created, and binding a server to the connection only if the generation count for the connection equals an expected value.

35. The method of claim 24 further comprising, for a first category of service, allocating a server to the packet after analyzing the content of a data grouping encapsulating the packet, and, for a second category of service, allocating a server to the packet upon ascertaining the desired class of service for the packet.

36. The method of claim 24 wherein the desired sub-class of service is based on content.

37. The method of claim 29 further comprising, for a first category of service, allocating a server to a packet responsive to the content of a data grouping encapsulating the packet, and, for a second category of service, allocating a server to a packet responsive to information other than the content of a data grouping encapsulating the packet.

38. The method of claim 29 wherein the desired class of service is selected from the group comprising an OSI layer 4 class of service, and an OSI layer 5 class of service.

39. The method of claim 38 wherein group further comprises an OSI layer 6 class of service and an OSI layer 7 class of service.

40. The method of any of claim 30, 37, or 35, wherein the first category of service comprises an OSI layer 5 class of service, and the second category of service comprises an OSI layer 4 class of service.

41. The method of any of claim 31 or 32 wherein the selected category of service comprises an OSI layer 5 class of service.

* * * * *